United States Patent [19]
Nakanishi et al.

[11] Patent Number: 5,488,389
[45] Date of Patent: Jan. 30, 1996

[54] DISPLAY DEVICE

[75] Inventors: Kaoru Nakanishi, Izumisano; Shinji Horino, Nara; Kiyoshi Shiono, Osaka; Hiroshi Tanaka, Higashiosaka; Kunihiro Terada, Tenri, all of Japan

[73] Assignee: Sharp Kabushiki Kaisha, Japan

[21] Appl. No.: 948,297

[22] Filed: Sep. 21, 1992

[30] Foreign Application Priority Data

| Sep. 25, 1991 | [JP] | Japan | 3-245904 |
| Sep. 27, 1991 | [JP] | Japan | 3-249737 |
| Feb. 19, 1992 | [JP] | Japan | 4-032080 |
| May 26, 1992 | [JP] | Japan | 4-133930 |

[51] Int. Cl.$^6$ .......................... G09G 5/00
[52] U.S. Cl. .................. 345/131; 345/190; 348/443; 348/458
[58] Field of Search .................... 340/720, 723, 340/731, 799, 811, 812, 813, 814; 358/11, 140, 141, 183, 241; 345/127–131, 132, 189, 190; 348/443, 458; H04N 3/00, 7/01

[56] References Cited

U.S. PATENT DOCUMENTS

| 3,830,971 | 8/1974 | van de Polder | 348/458 |
| 3,970,776 | 7/1976 | Kinuhata et al. | 348/458 |
| 4,051,531 | 9/1977 | Baldwin | 348/458 |
| 4,057,835 | 11/1977 | Kinuhata et al. | 348/458 |
| 4,276,565 | 6/1981 | Dalton et al. | 348/458 |
| 4,471,381 | 9/1984 | Kasuga et al. | 348/458 |
| 4,598,314 | 7/1986 | Reimers | 348/458 |
| 4,658,293 | 4/1987 | Arai et al. | 358/140 |
| 4,698,676 | 10/1987 | Kubota et al. | 348/458 |
| 4,751,573 | 6/1988 | Kubota | 348/458 |
| 5,031,040 | 7/1991 | Maruyama | 358/140 |
| 5,043,811 | 8/1991 | Yasuhiro | 358/183 |
| 5,049,994 | 9/1991 | Nakamura | 358/140 |
| 5,159,437 | 10/1992 | Lee | 348/443 |
| 5,274,447 | 12/1993 | Nakagaki et al. | 348/443 |

FOREIGN PATENT DOCUMENTS

| 63-245084 | 10/1988 | Japan . |
| 2090505 | 7/1982 | United Kingdom . |

OTHER PUBLICATIONS

Patent Abstracts of Japan, vol. 14, No. 312, Apr. 1990 & JP-A-2100476 (Hitachi) 5 Jul. 1990 (abstract).

*Primary Examiner*—Richard Hjerpe
*Assistant Examiner*—Lun-Yi Lao
*Attorney, Agent, or Firm*—Nixon & Vanderhye

[57] ABSTRACT

To display a more natural display screen without sense of strangeness, when displaying a video signal having a greater number of horizontal scanning lines than the number of horizontal display lines of the display means. The video signal is displayed by thinning at a rate of one out of every plurality of video signal groups. Accordingly, missing of only upper and lower portions of the video signals of the display screen is prevented, and when the video signal is compressed and displayed, a natural display screen without sense of strangeness is presented.

6 Claims, 52 Drawing Sheets

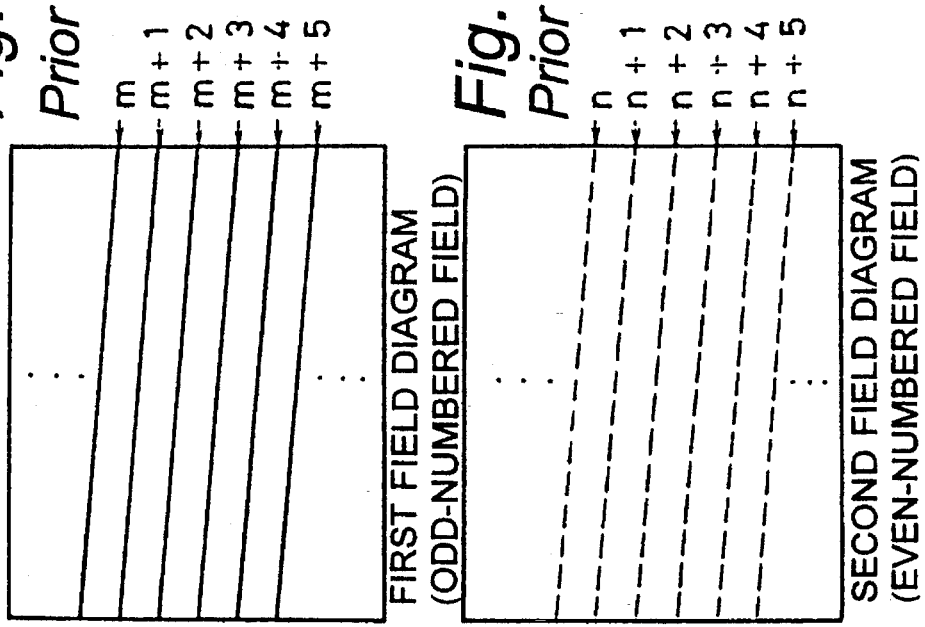
Fig. 3 (2) Prior Art
FIRST FIELD DIAGRAM (ODD-NUMBERED FIELD)
Fig. 3 (3) Prior Art
SECOND FIELD DIAGRAM (EVEN-NUMBERED FIELD)
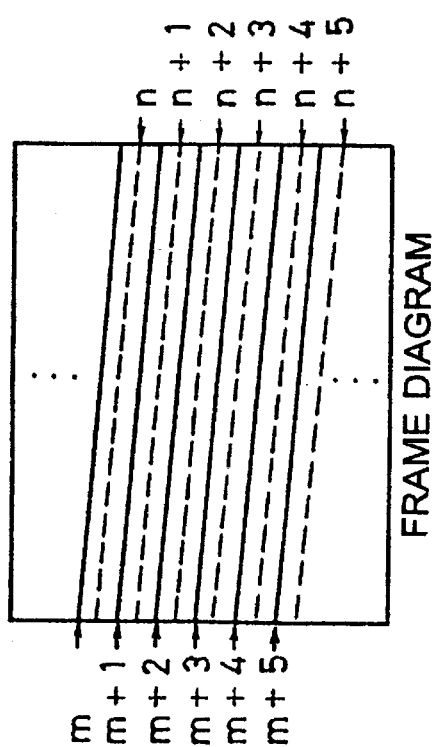
Fig. 3 (1) Prior Art
FRAME DIAGRAM

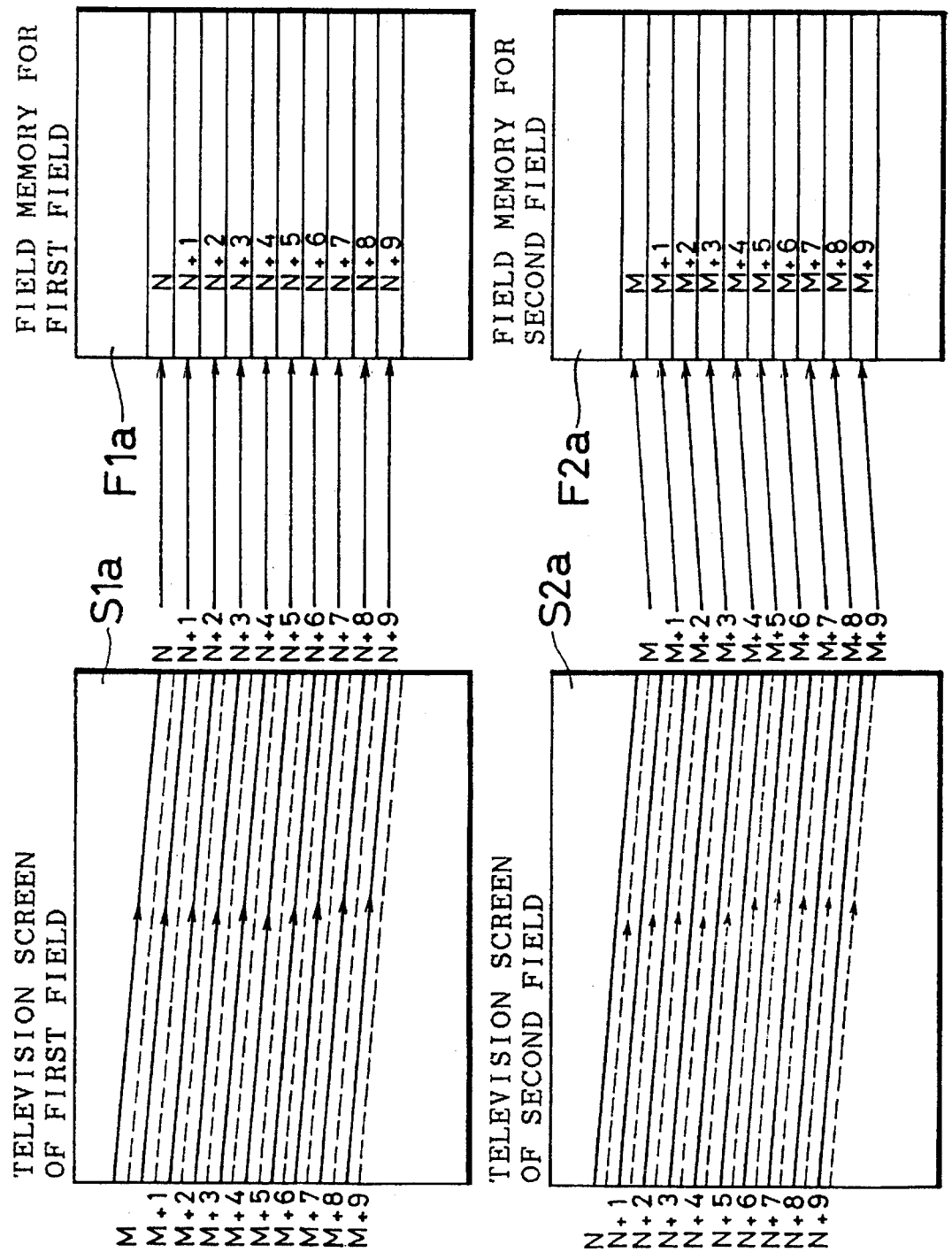
Fig. 5 Prior Art (1)
Fig. 5 Prior Art (2)

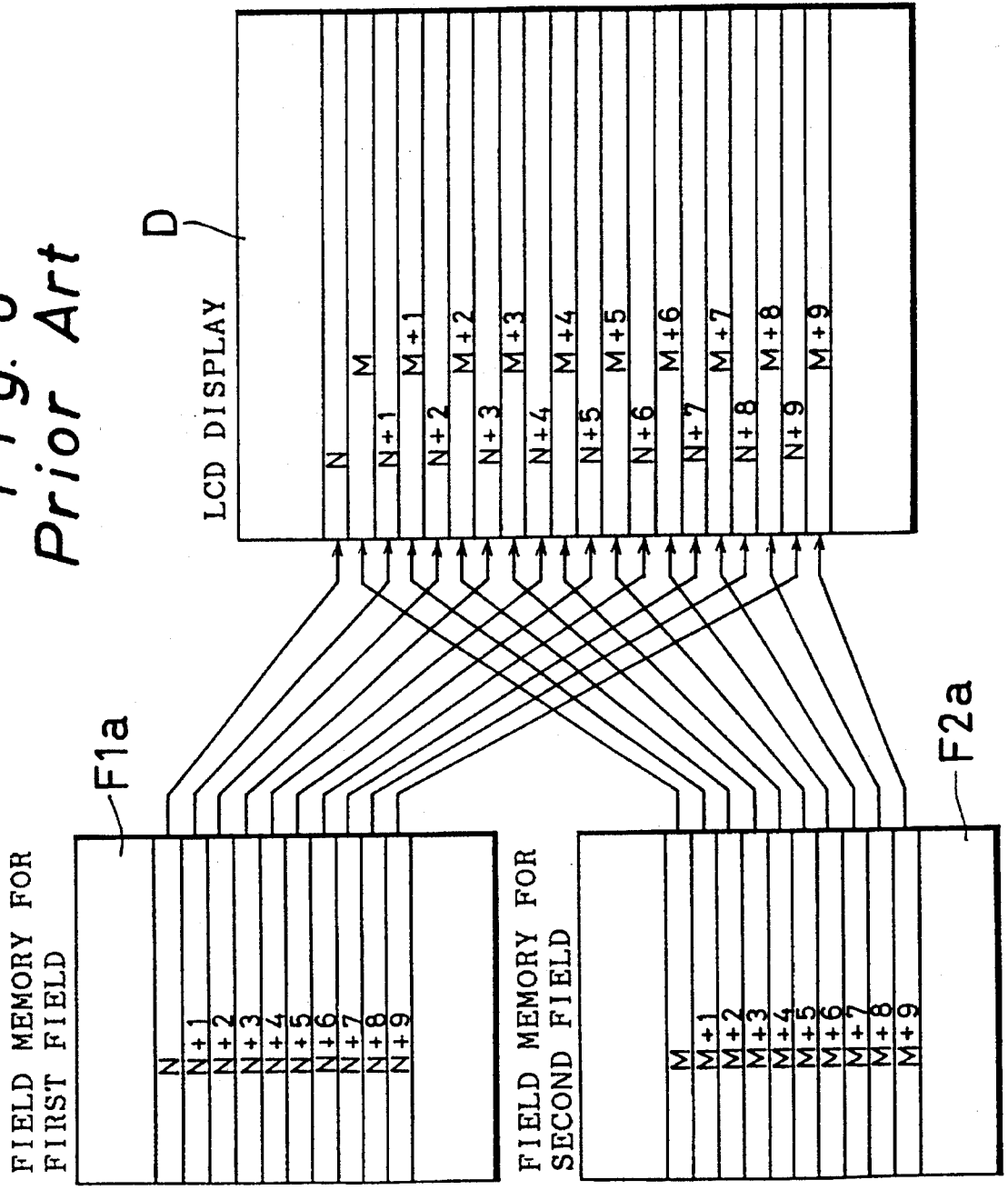

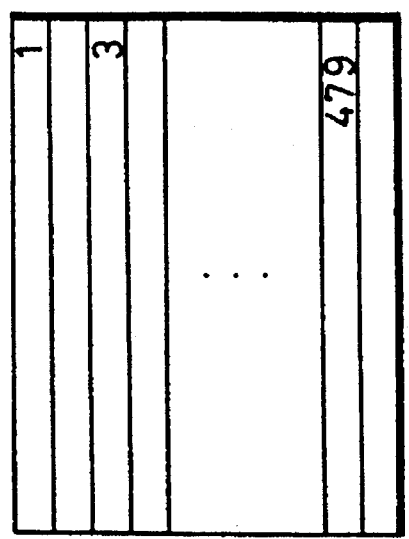
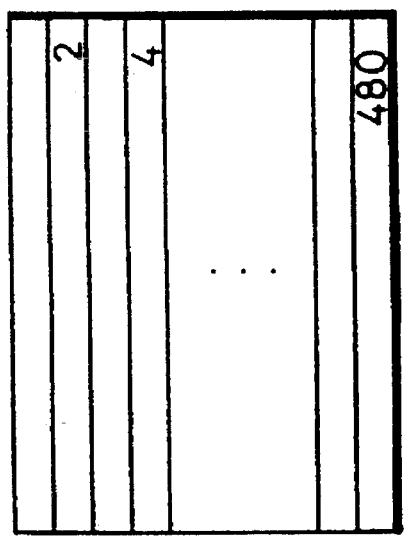
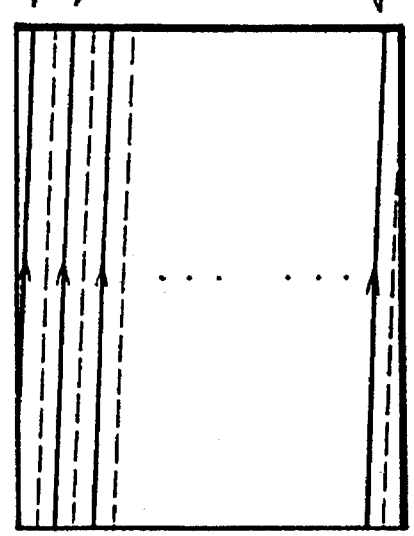
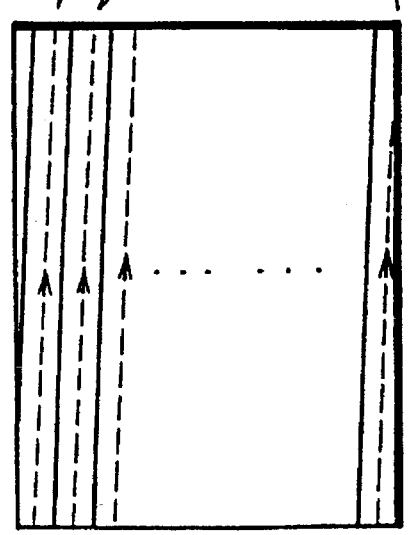
Fig. 7 Prior Art (1)
Fig. 7 Prior Art (2)

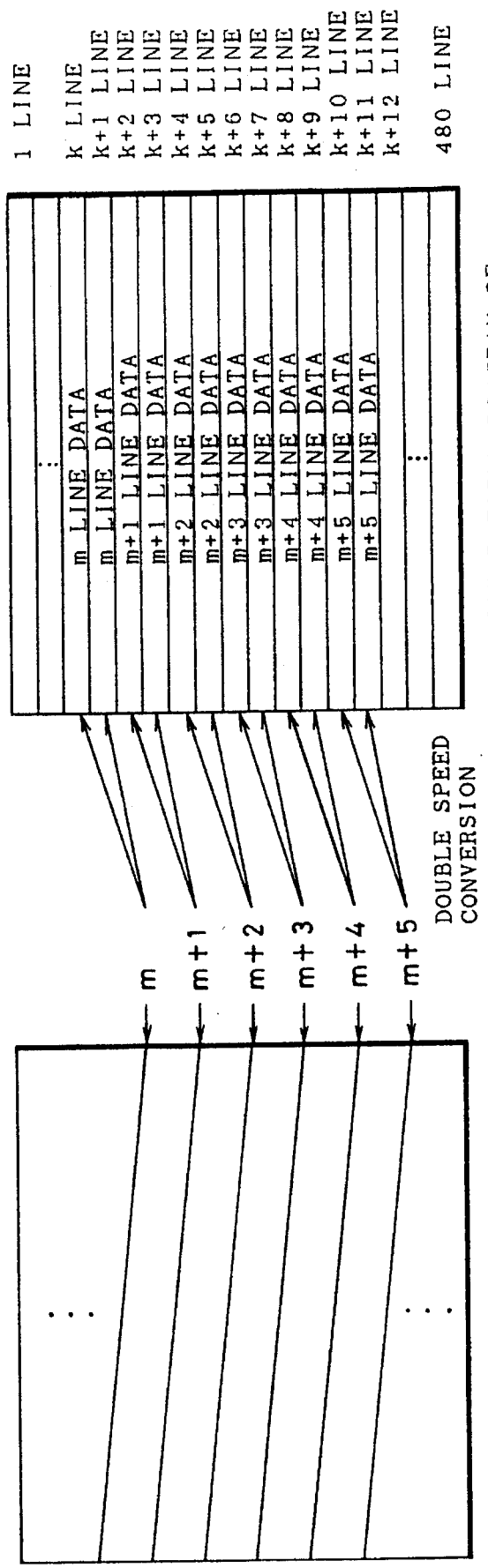
Fig. 8 Prior Art (1)

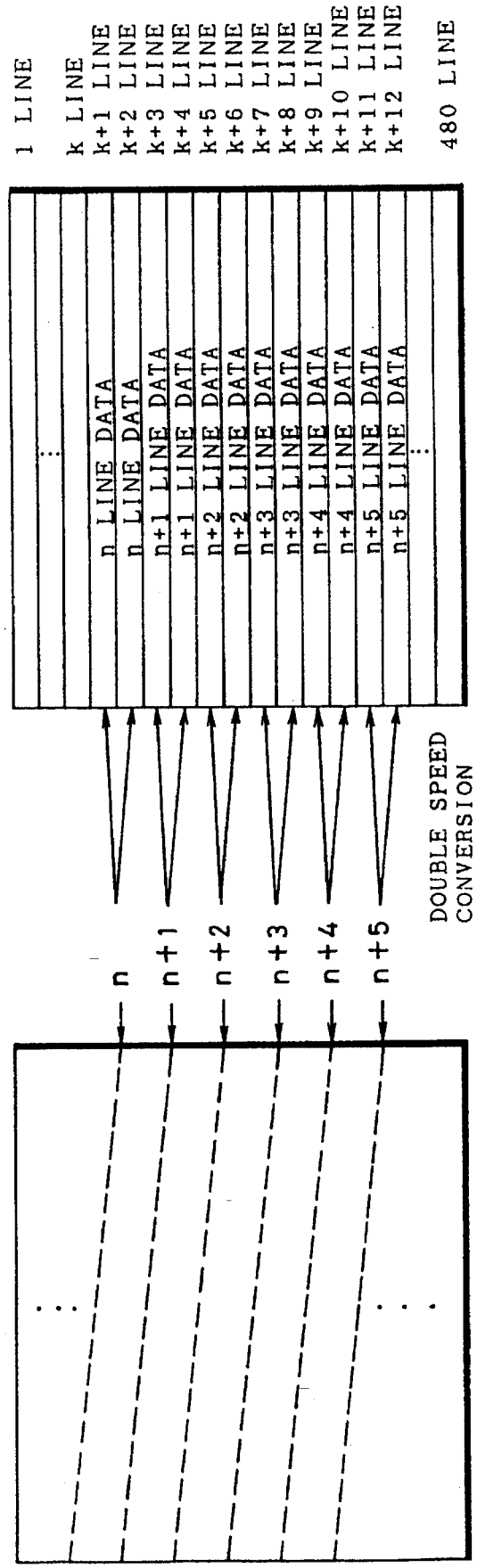
Fig. 8 Prior Art (2)

Fig. 9
Prior Art

FIRST FIELD/SECOND FIELD

| | |
|---|---|
| ⋮ | 1 LINE |
| m LINE DATA | k LINE |
| m LINE DATA / n LINE DATA | k+1 LINE |
| m+1 LINE DATA / n LINE DATA | k+2 LINE |
| m+1 LINE DATA / n+1 LINE DATA | k+3 LINE |
| m+2 LINE DATA / n+1 LINE DATA | k+4 LINE |
| m+2 LINE DATA / n+2 LINE DATA | k+5 LINE |
| m+3 LINE DATA / n+2 LINE DATA | k+6 LINE |
| m+3 LINE DATA / n+3 LINE DATA | k+7 LINE |
| m+4 LINE DATA / n+3 LINE DATA | k+8 LINE |
| m+4 LINE DATA / n+4 LINE DATA | k+9 LINE |
| m+5 LINE DATA / n+4 LINE DATA | k+10 LINE |
| m+5 LINE DATA / n+5 LINE DATA | k+11 LINE |
| n+5 LINE DATA | k+12 LINE |
| ⋮ | 480 LINE |

FRAME DIAGRAM OF LIQUID CRYSTAL DISPLAY

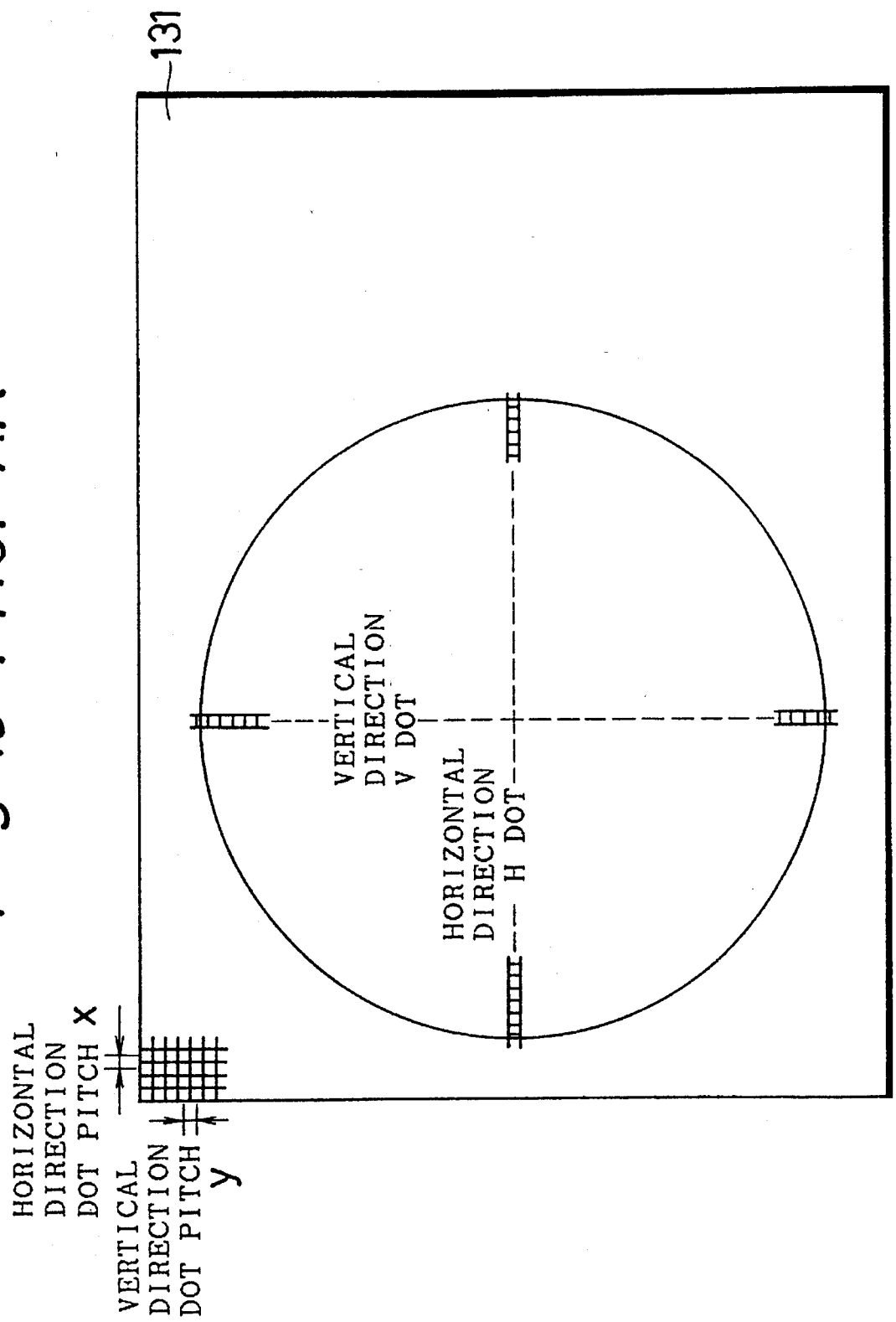

(1) CSYNC (2) VIDEO SIGNAL (3) FIELD MEMORY 3 WRITE CONTROL (FIRST FIELD)

(4) FIELD MEMORY 4 WRITE CONTROL (SECOND FIELD)

(1) CSYNC (2) VIDEO SIGNAL (3) FIELD MEMORY 3 WRITE CONTROL (FIRST FIELD)

(4) FIELD MEMORY 4 WRITE CONTROL (SECOND FIELD)

(1) HSYNC (2) FIELD MEMORY 3 READ CONTROL (FIRST FIELD)

(3) FIELD MEMORY 4 READ CONTROL (SECOND FIELD)

(4) OUTPUT SIGNAL

N LINE THINNING   M+3 LINE THINNING   N+7 LINE THINNING
                                       M+10 LINE THINNING

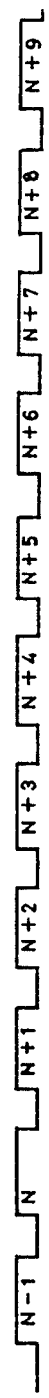
Fig. 22
(1) CSYNC
Fig. 22
(2) VIDEO SIGNAL
Fig. 22
(3) FIELD MEMORY 3 WRITE CONTROL (FIRST FIELD)
Fig. 22
(4) FIELD MEMORY 4 WRITE CONTROL (SECOND FIELD)

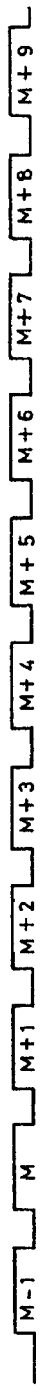
Fig. 23 (1) CSYNC
Fig. 23 (2) VIDEO SIGNAL
Fig. 23 (3) FIELD MEMORY 3 WRITE CONTROL (FIRST FIELD)
Fig. 23 (4) FIELD MEMORY 4 WRITE CONTROL (SECOND FIELD)

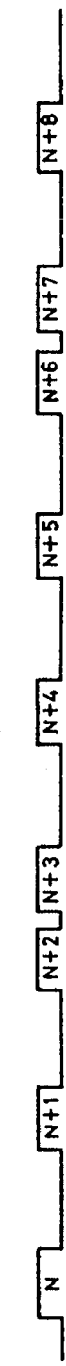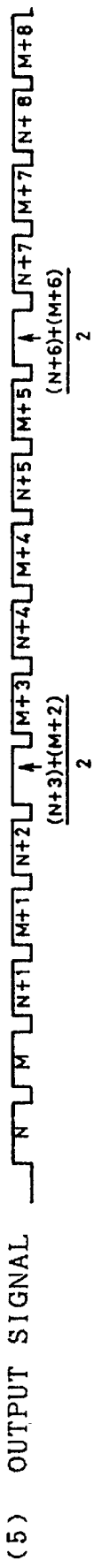
Fig. 24 (1) CSYNC
Fig. 24 (2) HSYNC
Fig. 24 (3) FIELD MEMORY 3 READ CONTROL (FIRST FIELD)
Fig. 24 (4) FIELD MEMORY 4 READ CONTROL (SECOND FIELD)
Fig. 24 (5) OUTPUT SIGNAL
Fig. 24 (6) CALCULATING CONTROL SIGNAL

Fig. 28

(1) FIRST FIELD

| 1 LINE DATA |
|---|
| ⋮ |
| i+1 LINE DATA |
| i+1 LINE DATA |
| i+2 LINE DATA |
| i+2 LINE DATA |
| i+3 LINE DATA |
| i+3 LINE DATA |
| i+4 LINE DATA |
| i+4 LINE DATA |
| i+5 LINE DATA |
| i+5 LINE DATA |
| i+6 LINE DATA |
| i+6 LINE DATA |
| i+7 LINE DATA |
| i+7 LINE DATA |
| ⋮ |
| 280 LINE DATA |

Fig. 28

(2) SECOND FIELD

| 1 LINE DATA |
|---|
| ⋮ |
| j+1 LINE DATA |
| j+1 LINE DATA |
| j+2 LINE DATA |
| j+2 LINE DATA |
| j+3 LINE DATA |
| j+3 LINE DATA |
| j+4 LINE DATA |
| j+4 LINE DATA |
| j+5 LINE DATA |
| j+5 LINE DATA |
| j+6 LINE DATA |
| j+6 LINE DATA |
| j+7 LINE DATA |
| j+7 LINE DATA |
| ⋮ |
| 280 LINE DATA |

THINNING LINE

THINNING LINE

Fig. 28

(3) FIRST FIELD/SECOND FIELD

| | LINE NUMBER OF LIQUID CRYSTAL DISPLAY |
|---|---|
| 1 LINE DATA  / 1 LINE DATA | 1 |
| ⋮ | |
| i+1 LINE DATA | |
| i+1 LINE DATA / j+1 LINE DATA | |
| i+2 LINE DATA / j+1 LINE DATA | |
| i+2 LINE DATA / j+2 LINE DATA | |
| i+3 LINE DATA / j+2 LINE DATA | |
| i+3 LINE DATA / j+3 LINE DATA | |
| i+4 LINE DATA / j+3 LINE DATA | |
| i+4 LINE DATA / j+4 LINE DATA | |
| i+5 LINE DATA / j+4 LINE DATA | |
| i+5 LINE DATA / j+5 LINE DATA | |
| i+6 LINE DATA / j+5 LINE DATA | |
| i+6 LINE DATA / j+6 LINE DATA | |
| i+7 LINE DATA / j+6 LINE DATA | |
| i+7 LINE DATA / j+7 LINE DATA | |
| j+7 LINE DATA | |
| ⋮ | |
| 280 LINE DATA / 280 LINE DATA | 480 |

HERE, $i = j = 7k$, WHERE $k = 0$ to $39$

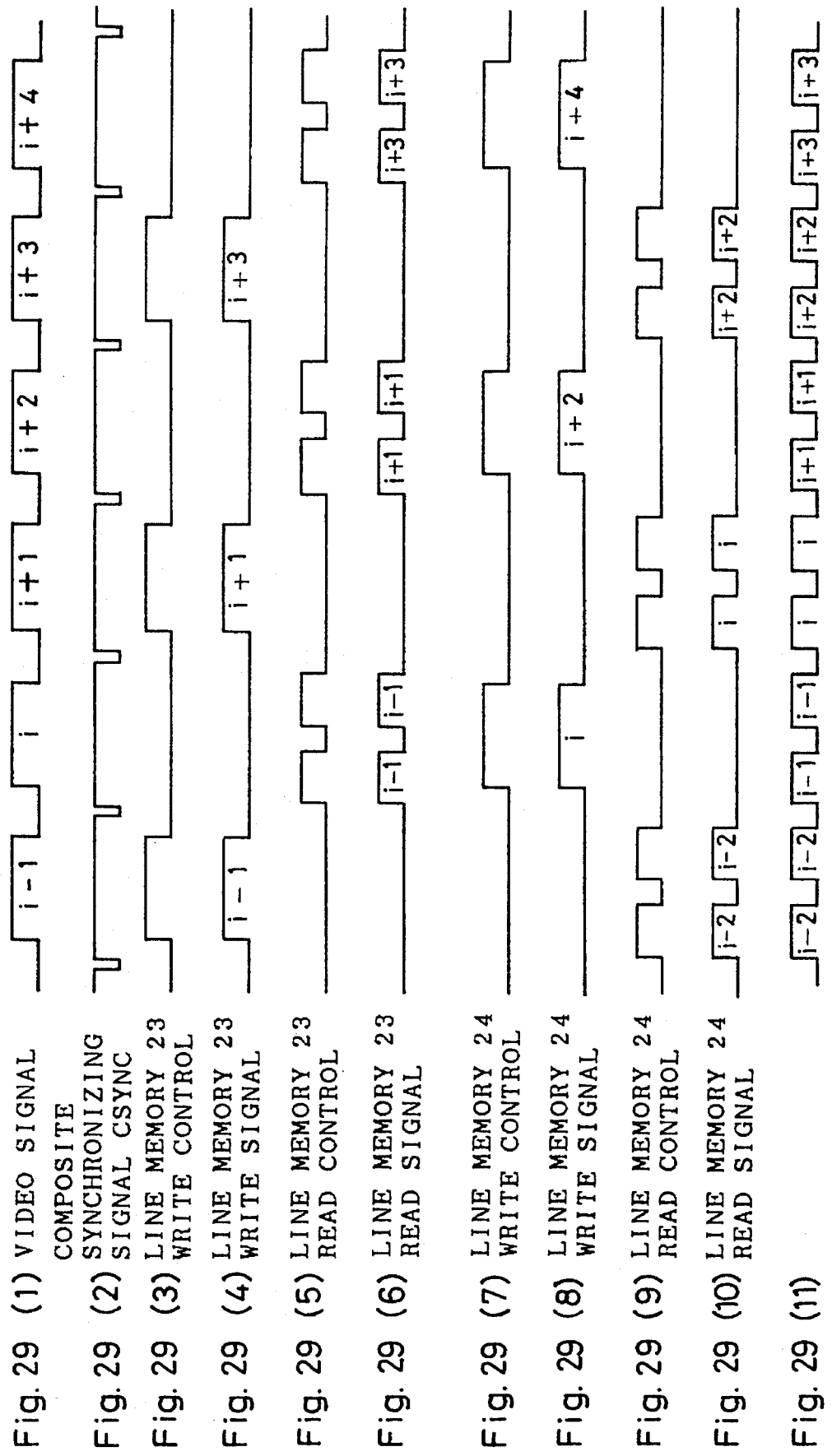

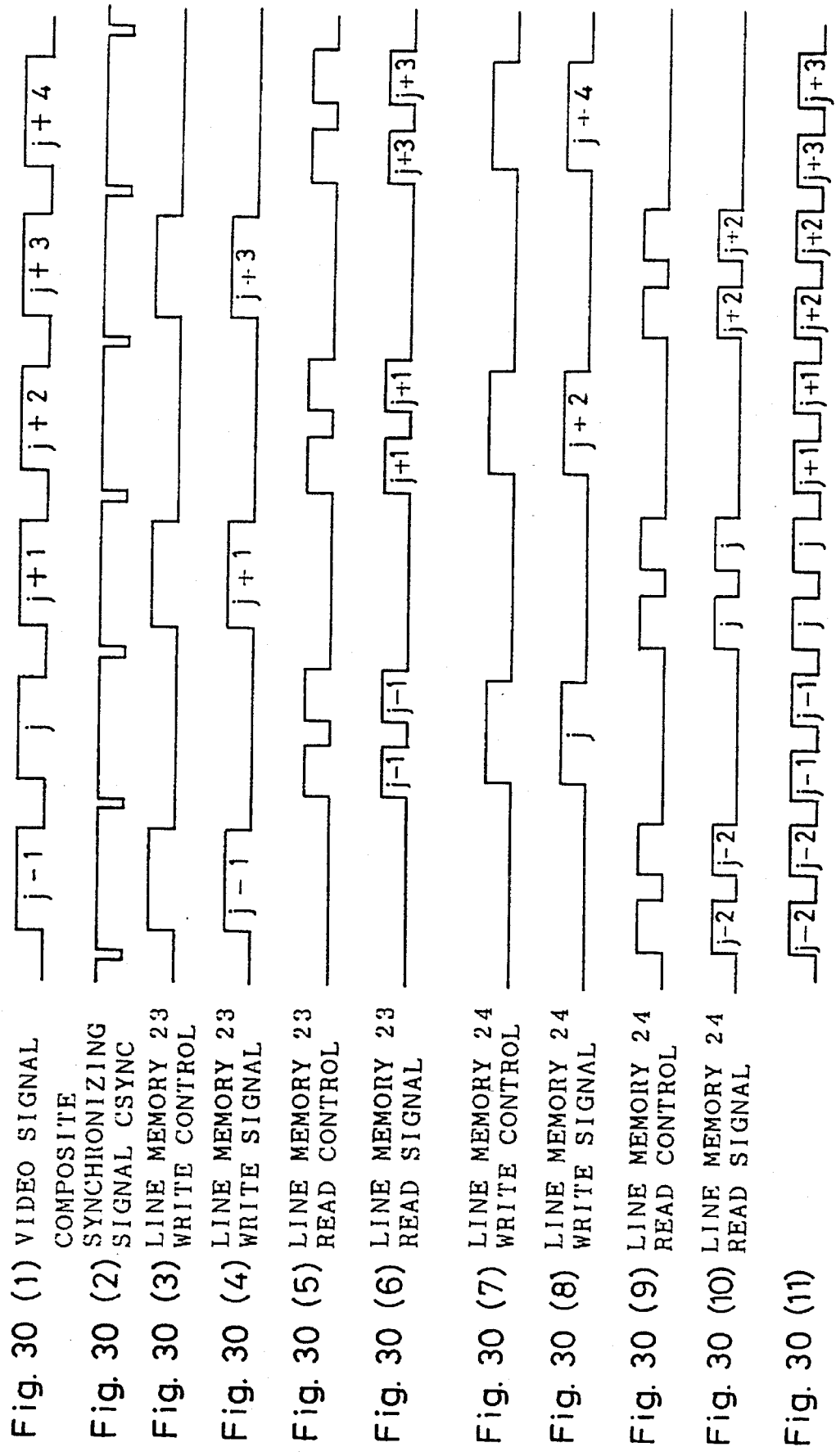

Fig. 31 (1) CSYNC
Fig. 31 (2) RSYNC
Fig. 31 (3) VIDEO SIGNAL

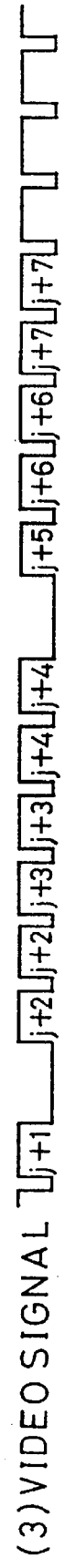
Fig. 32 (1) CSYNC
Fig. 32 (2) RSYNC
Fig. 32 (3) VIDEO SIGNAL

Fig. 33 (1)

| FIRST FIELD/SECOND FIELD |
|---|
| m LINE DATA |
| m LINE DATA / n LINE DATA |
| m+1 LINE DATA / n LINE DATA |
| m+1 LINE DATA / n+1 LINE DATA |
| m+2 LINE DATA / n+1 LINE DATA |
| m+2 LINE DATA / n+2 LINE DATA |
| m+3 LINE DATA / n+2 LINE DATA |
| m+3 LINE DATA / n+3 LINE DATA |
| m+4 LINE DATA / n+3 LINE DATA |
| m+4 LINE DATA / n+4 LINE DATA |
| m+5 LINE DATA / n+4 LINE DATA |
| m+5 LINE DATA / n+5 LINE DATA |
| n+5 LINE DATA |

Fig. 33 (2)

| | FIRST FIELD/SECOND FIELD |
|---|---|
| 1 LINE | |
| k LINE | m LINE DATA |
| k+1 LINE | m+1 LINE DATA / n LINE DATA |
| k+2 LINE | m+1 LINE DATA / n LINE DATA |
| k+3 LINE | m+2 LINE DATA / n+1 LINE DATA |
| k+4 LINE | m+2 LINE DATA / n+1 LINE DATA |
| k+5 LINE | m+3 LINE DATA / n+2 LINE DATA |
| k+6 LINE | m+3 LINE DATA / n+2 LINE DATA |
| k+7 LINE | m+4 LINE DATA / n+3 LINE DATA |
| k+8 LINE | m+4 LINE DATA / n+3 LINE DATA |
| k+9 LINE | m+5 LINE DATA / n+4 LINE DATA |
| k+10 LINE | m+5 LINE DATA / n+4 LINE DATA |
| k+11 LINE | n+5 LINE DATA |
| k+12 LINE | |
| 480 LINE | |

Fig. 34 (1)

FIRST FIELD/SECOND FIELD

| m LINE DATA |
| m LINE DATA / n LINE DATA |
| m+1 LINE DATA / n LINE DATA |
| m+1 LINE DATA / n+1 LINE DATA |
| m+2 LINE DATA / n+1 LINE DATA |
| m+2 LINE DATA / n+2 LINE DATA |
| m+3 LINE DATA / n+2 LINE DATA |
| m+3 LINE DATA / n+3 LINE DATA |
| m+4 LINE DATA / n+3 LINE DATA |
| m+4 LINE DATA / n+4 LINE DATA |
| m+5 LINE DATA / n+4 LINE DATA |
| m+5 LINE DATA / n+5 LINE DATA |

Fig. 34 (2)

FIRST FIELD/SECOND FIELD

| m LINE DATA |
| m LINE DATA / n LINE DATA |
| m+1 LINE DATA / n LINE DATA |
| m+1 LINE DATA / n+1 LINE DATA |
| m+2 LINE DATA / n+1 LINE DATA |
| m+2 LINE DATA / n+2 LINE DATA |
| m+3 LINE DATA / n+2 LINE DATA |
| m+3 LINE DATA / n+3 LINE DATA |
| m+4 LINE DATA / n+3 LINE DATA |
| m+4 LINE DATA / n+4 LINE DATA |
| m+5 LINE DATA / n+4 LINE DATA |
| n+5 LINE DATA |

1 LINE
k LINE
k+1 LINE
k+2 LINE
k+3 LINE
k+4 LINE
k+5 LINE
k+6 LINE
k+7 LINE
k+8 LINE
k+9 LINE
k+10 LINE
k+11 LINE
k+12 LINE

480 LINE

Fig. 35
(1) FIRST FIELD

| 1 LINE DATA |
|---|
| ⋮ |
| i+1 LINE DATA |
| i+1 LINE DATA |
| i+2 LINE DATA |
| i+2 LINE DATA |
| i+3 LINE DATA |
| i+3 LINE DATA |
| i+4 LINE DATA |
| i+4 LINE DATA |
| i+5 LINE DATA |
| i+5 LINE DATA |
| i+6 LINE DATA |
| i+6 LINE DATA |
| i+7 LINE DATA |
| i+7 LINE DATA |
| ⋮ |
| 280 LINE DATA |

Fig. 35
(2) SECOND FIELD

| 1 LINE DATA |
|---|
| ⋮ |
| j+1 LINE DATA |
| j+1 LINE DATA |
| j+2 LINE DATA |
| j+2 LINE DATA |
| j+3 LINE DATA |
| j+3 LINE DATA |
| j+4 LINE DATA |
| j+4 LINE DATA |
| j+5 LINE DATA |
| j+5 LINE DATA |
| j+6 LINE DATA |
| j+6 LINE DATA |
| j+7 LINE DATA |
| j+7 LINE DATA |
| ⋮ |
| 280 LINE DATA |

←THINNING LINE→
←THINNING LINE→

Fig. 35
(3) FIRST FIELD/SECOND FIELD

| | LINE NUMBER OF LIQUID CRYSTAL DISPLAY |
|---|---|
| 1 LINE DATA  /  1 LINE DATA | 1 |
| ⋮ | |
| i+1 LINE DATA | |
| i+1 LINE DATA  /  j+1 LINE DATA | |
| i+2 LINE DATA  /  j+2 LINE DATA | |
| i+3 LINE DATA  /  j+2 LINE DATA | |
| i+3 LINE DATA  /  j+3 LINE DATA | |
| i+4 LINE DATA  /  j+3 LINE DATA | |
| i+4 LINE DATA  /  j+4 LINE DATA | |
| i+5 LINE DATA  /  j+5 LINE DATA | |
| i+6 LINE DATA  /  j+5 LINE DATA | |
| i+6 LINE DATA  /  j+6 LINE DATA | |
| i+7 LINE DATA  /  j+6 LINE DATA | |
| i+7 LINE DATA  /  j+7 LINE DATA | |
| j+7 LINE DATA | |
| ⋮ | |
| 280 LINE DATA  /  280 LINE DATA | 480 |

HERE, $i = j = 7k$,
WHERE $k = 0$ to $39$

Fig. 36
(1) FIRST FIELD

| 1 LINE DATA |
|---|
| ⋮ |
| i+1 LINE DATA |
| i+1 LINE DATA |
| i+2 LINE DATA |
| i+2 LINE DATA |
| i+3 LINE DATA |
| i+3 LINE DATA |
| i+4 LINE DATA |
| i+4 LINE DATA |
| i+5 LINE DATA |
| i+5 LINE DATA |
| i+6 LINE DATA |
| i+6 LINE DATA |
| i+7 LINE DATA |
| i+7 LINE DATA |
| ⋮ |
| 280 LINE DATA |

Fig. 36
(2) SECOND FIELD

| 1 LINE DATA |
|---|
| ⋮ |
| j+1 LINE DATA |
| j+1 LINE DATA |
| j+2 LINE DATA |
| j+2 LINE DATA |
| j+3 LINE DATA |
| j+3 LINE DATA |
| j+4 LINE DATA |
| j+4 LINE DATA |
| j+5 LINE DATA |
| j+5 LINE DATA |
| j+6 LINE DATA |
| j+6 LINE DATA |
| j+7 LINE DATA |
| j+7 LINE DATA |
| ⋮ |
| 280 LINE DATA |

THINNING LINE ↔ (between i+1 / i+2 rows and j+1 rows)
THINNING LINE ↔ (between i+5 rows and j+4/j+5 rows)

Fig. 36
(3) FIRST FIELD/SECOND FIELD

| Data | Line Number of Liquid Crystal Display |
|---|---|
| 1 LINE DATA / 1 LINE DATA | 1 |
| ⋮ | |
| i+1 LINE DATA | |
| i+1 LINE DATA / j+1 LINE DATA | |
| i+2 LINE DATA / j+1 LINE DATA | |
| i+3 LINE DATA / j+2 LINE DATA | |
| i+3 LINE DATA / j+3 LINE DATA | |
| i+4 LINE DATA / j+3 LINE DATA | |
| i+4 LINE DATA / j+4 LINE DATA | |
| i+5 LINE DATA / j+4 LINE DATA | |
| i+6 LINE DATA / j+5 LINE DATA | |
| i+6 LINE DATA / j+6 LINE DATA | |
| i+7 LINE DATA / j+6 LINE DATA | |
| i+7 LINE DATA / j+7 LINE DATA | |
| j+7 LINE DATA | |
| ⋮ | |
| 280 LINE DATA / 280 LINE DATA | 480 |

HERE, $i = j = 7k$,
WHERE $k = 0$ to $39$

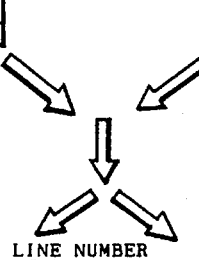

Fig. 46 (1) CSYNC 
Fig. 46 (2) VIDEO SIGNAL 
Fig. 46 (3) FIELD MEMORY WRITE CONTROL 
Fig. 47 (1) HSYNC 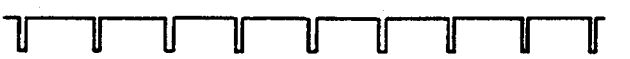
Fig. 47 (2) FIELD MEMORY READ CONTROL 
Fig. 47 (3) FIELD MEMORY READ DATA 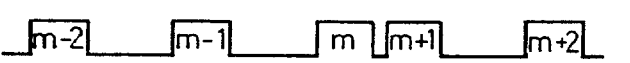
Fig. 47 (4) LINE MEMORY WRITE CONTROL 
Fig. 47 (5) LINE MEMORY READ CONTROL 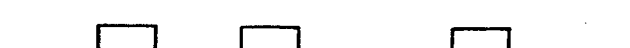
Fig. 47 (6) LINE MEMORY READ DATA 
Fig. 47 (7) SELECT SIGNAL SEL 
Fig. 47 (8) OUTPUT SIGNAL 
2 LINE DISPLAY    2 LINE DISPLAY    2 LINE DISPLAY    2 LINE DISPLAY
1 LINE DISPLAY

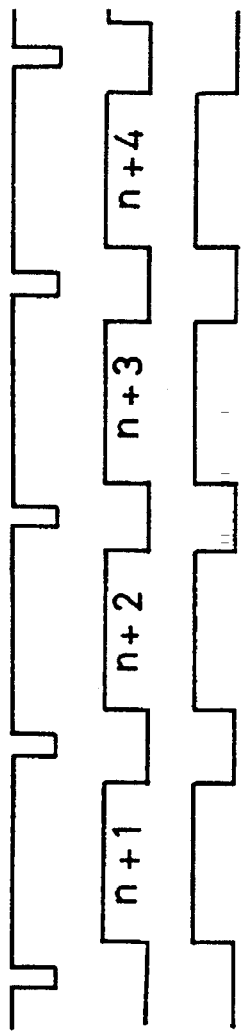

Fig. 52 (1) HSYNC

Fig. 52 (2) FIELD MEMORY 53 READ CONTROL

Fig. 52 (3) FIELD MEMORY 53 READ SIGNAL

Fig. 52 (4) LINE MEMORY 54 WRITE CONTROL

Fig. 52 (5) LINE MEMORY 54 WRITE SIGNAL

Fig. 52 (6) LINE MEMORY 54 READ CONTROL

Fig. 52 (7) LINE MEMROY 54 READ SIGNAL

Fig. 52 (8) SELECT SIGNAL

Fig. 52 (9) OUTPUT SIGNAL

DISPLAY DEVICE

BACKGROUND OF THE INVENTION

1. Field of the Invention

The present invention relates to a display device for displaying video signals by thinning depending on the number of horizontal display lines of display means, when displaying interlaced video signals by converting into non-interlaced video signals.

2. Description of the Related Art

Hither to, in a liquid crystal display device of a relatively large size having a display screen of, for example, lateral 640 dots×vertical 480 lines, when displaying video signals of NTSC (National Television System Committee) method or PAL (Phase Alternation by Line) method, first the interlaced video signals are converted into non-interlaced video signals, and are then displayed.

FIG. 1 is a diagram showing the composition of a video signal of NTSC method. The video signal of NTSC method, when non-interlaced, comprises 525 horizontal scanning lines in one vertical period, and effective data is available in 483 of these horizontal scanning lines. One horizontal scanning period is 63.56 μsec, and 52.75 μsec thereof is for video signal. The ratio of one screen is lateral:vertical= 4:3.

FIG. 2 is a diagram showing the composition of a video signal of PAL method. When non-interlaced, the PAL method video signal comprises 625 horizontal scanning lines in one vertical period, and effective data is available in 575 of these horizontal scanning lines. One horizontal scanning period is 54 μsec, and 52 μsec thereof is for the video signal. The ratio of one screen is lateral:vertical=4:3.

Here is explained a method of converting interlaced video signals into non-interlaced video signals. For example, video signals of one screen by the NTSC interlacing method are composed of 525 horizontal scanning lines as shown in FIG. 1, and are divided into a first field (odd-number field) composed of 262.5 horizontal scanning lines of the odd numbers, and a second field (even-number field) composed of 262.5 horizontal scanning lines of the even numbers, as shown in FIGS. 3(1), 3(2) and 3(3).

As shown in FIG. 4, every 1/60 sec, the first field and second field are displayed alternately, and the scanning lines of second field get into the scanning lines of the first field, and one complete screen (one frame) is composed of two fields. Therefore, 30 screens are displayed in a second. To display the video signals of such interlacing method in a liquid crystal display device, it is necessary to convert into video signals of non-interlacing method. As such method of converting non-interlacing method, 1. the field interpolating method of using field memory, and 2. the line interpolating method of using line memory are known.

FIGS. 5(1), 5(2) and FIG. 6 are diagrams for explaining the non-interlacing converting method by the field interpolating method using field memory. As shown in FIGS. 5(1) and 5(2), first field video signal S1a and second field video signal S2a are respectively written into field memory F1a for first field and field memory F2a for second field. In succession, as shown in FIG. 6, at a double speed of writing, video signals are alternately read out in one horizontal line from the field memories F1a, F2a, and are given to the liquid crystal display device Da to be displayed.

FIGS. 7(1) and 7(2) is a diagram explaining the non-interlacing converting method by line interpolating method using line memory. In the line interpolating method, the video signals of one horizontal line are written into the line memory and are read out at a double speed of writing (double speed conversion), so that two display lines are displayed by video signals of one horizontal line in the liquid crystal display device Da. Therefore, one screen (one frame) is displayed is displayed in the first field (odd-number field), and one screen (one frame) is displayed in the second field (even-number field).

FIGS. 8(1), 8(2) and FIG. 9 are diagrams for practically explaining the non-interlacing converting method by the above double speed conversion. In double speed conversion, as shown in FIGS. 8(1)–(2), video signals of every horizontal line of the first and second fields are read out twice each at a double speed of writing, and are displayed in continuous two display lines. For example, in the first field, data of line m are displayed n line k and line k+1, and in the second field, data of line in are displayed in line k+1 and line k+2. Therefore, as shown in FIG. 9, data of lines m to m+5 are displayed in lines k to k+11, and data of lines n to n+5 are displayed in lines k+1 to k+12.

Here, when displaying the video signals of the NTSC method in a liquid crystal display device having a display screen of lateral 640 dots×vertical 480 lines, in both first field and second field, the effective data (video signals) are for 241.5 lines, and the total of 1.5 lines of the beginning and end thereof is overscanned and is set as non-display region, while the video signals of the remaining 240 lines are converted into video signals of the non-interlacing method by the field interpolating method, thereby displaying by converting into video signals of 240×2= 480 lines.

When displaying the video signals of PAL method in a liquid crystal display device having a display screen of lateral 640 dots×vertical 480 lines as mentioned above, the video signals of the PAL method include effective data (video signals) of 575 lines, and all video signals cannot be displayed completely. Therefore, video signals of 575–480=95 lines are thinned in display. In this thinned display, usually, since the central part on the screen is displayed by priority, and the upper and lower parts of the screen are not displayed, and lack of data (video signal) occurs.

To prevent lack of data in a considerably wide range of upper and lower parts, it was proposed to display by thinning at a specific rate by removing one line out of every N line video signals. In such thinned display, however, if the thinning rate N is determined only for the purpose of matching the number of horizontal scanning lines of video signals with the number of horizontal display lines of the display means, without considering the rate of roundness, the image may be distorted vertically or laterally, and the display quality is lowered. Meanwhile, the value of the rate N at which the rate of roundness is 100% is not generally an integer.

FIG. 10 is a diagram for explaining the definition of rate of roundness. The rate of roundness is the ratio of the diameter in the vertical direction to the diameter in the horizontal direction when a circle is displayed on a display device. As shown in FIG. 10, of a circuit displayed in a display device 131 of which pixel pitch is X in the horizontal direction and y in the vertical direction, supposing the number of dots of the diameter in the horizontal direction to be H and the number of dots of the diameter in the vertical direction to be V, the rate of roundness is expressed in Formula 1.

$$\text{Rate of roundness} = \frac{V \times y}{H \times x} \times 100 (\%) \quad (1)$$

Here is assumed a liquid crystal display device of a relatively large size of lateral 640 dots×vertical 480 lines composed corresponding to the video signals of the NTSC system, for example. According to the composition diagram of video signal of NTSC method in FIG. 1, the sampling period necessary for setting the rate of roundness to 100% must be, when the pixel pitches are equal in the horizontal direction and vertical direction, must be as follows.

$$52.75 \times 10^{-6} \times \frac{3}{4} \times \frac{1}{483} = 81.91 \text{ (nsec)} \quad (2)$$

Generally, in order to obtain a sampling clock in a liquid crystal display device, using a PLL (phase locked loop) circuit, a clock of an integer multiple of one horizontal scanning period is created. In this case, the doubling ratio is as follows.

$$\frac{63.56 \times 10^{-6}}{81.91 \times 10^{-9}} = 776 \quad (3)$$

Therefore, the rate of roundness when the video signal of NTSC method is displayed in this liquid crystal display device is $$\frac{483}{52.75 \times 10^{-6} \times \frac{3}{4} / \frac{63.56 \times 10^{-6}}{776}} \times 100 = 99.997 (\%) \quad (4)$$

When video signal of PAL method enters the same liquid crystal display device, the period of the produced sampling clock is, according to one horizontal scanning period, as follows.

$$\frac{64 \times 10^{-6}}{776} = 82.474 \text{ (nsec)} \quad (5)$$

Hence, the data for the portion of one horizontal display line is $$\frac{52 \times 10^{-6}}{82.474 \times 10^{-9}} = 630.5 \text{ (dot)} \quad (6)$$

Therefore, to realize the display of 100% roundness, the 575 effective horizontal scanning lines must be compressed to 473 lines.

$$630.5 \times \frac{3}{4} = 472.875 \approx 473 \text{ (lines)} \quad (7)$$

When thinning the horizontal display lines at a rate of one line in every N lines according to the conventional method, the compression rate is 20% when N=5, or 16.67% when N=6.

The target compression rate is $$\frac{575 - 473}{575} \times 100 = 17.74 (\%) \quad (8)$$

and, accordingly, if thinned at a rate of one out of every five lines, the compression rate is too large, and the image is extended laterally, or when thinned at a rate of one out of every six lines, the compression rate is too small, and the image is extended vertically. Therefore, the thinning rate for achieving 100% roundness is $$5 < N < 6 \quad (9)$$

SUMMARY OF THE INVENTION

It is hence a primary object of the invention to present a display device capable of realizing a more natural display screen, by decreasing the effects of thinning on the entire display screen, when displaying the video signals by thinning.

The invention presents a display device for display video signals of one screen composed of a predetermined number of horizontal scanning lines, by converting the video signals of interlacing method for transmitting by dividing into a first field composed of odd-numbered horizontal scanning lines and a second field composed of even-numbered horizontal scanning lines into video signals of non-interlacing method, comprising:

display means having horizontal display lines fewer than the number of horizontal scanning lines for composing one screen, a first field memory for storing video signals in the first field, a second field memory for storing video signals in the second field, and display control means for sequentially reading out video signals of one horizontal scanning line alternately from the first and second field memories and applying to the display means after writing of video signals for one screen into the memory is over, without writing the video signals of the selected horizontal scanning lines to be thinned into the memory, when writing the video signals of the given first and second field into the first and second field memories, by selecting the horizontal scanning lines to be thinned, out of the horizontal scanning lines for composing one screen, at a rate of every plurality of horizontal scanning line groups.

The invention also presents a display device for display video signals of one screen composed of a predetermined number of horizontal scanning lines, by converting the video signals of interlacing method for transmitting by dividing into a first field composed of odd-numbered horizontal scanning lines and a second field composed of even-numbered horizontal scanning lines into video signals of non-interlacing method, comprising:

display means having horizontal display lines fewer than the number of horizontal scanning lines for composing one screen, a first field memory for storing video signals in the first field, a second field memory for storing video signals in the second field, and display control means for selecting horizontal scanning lines to be thinned out of horizontal scanning lines for composing one screen, at a rate of one out of every plurality of horizontal scanning line groups, writing the video signals of given first and second fields into first and second field memories respectively, reading out the video signals of the horizontal scanning lines to be thinned selected above, and either one of the video signals of the horizontal scanning signals before and after them, operating as specified, and applying to the display means, when sequentially reading out the video signals of one horizontal scanning line alternately from the first and second field memories after writing the video signals of one screen portion into the memory, and giving to the display means.

According to the invention, of the horizontal scanning lines for composing one screen, the horizontal scanning lines to be thinned are selected at a rate of one of every plurality of horizontal scanning line groups. The given first and second field video signals are respectively written into the first and second field memories. At this time, the video signals of the selected horizontal scanning lines to be thinned are not written into the field memory. When writing of the video signals for one screen portion into the memory is over, the video signal of one horizontal scanning line is alternately read out from the first and second field memories sequentially and given to the display means so as to be displayed. Therefore, unlike the conventional thinning, only the upper end and lower end of the screen are not cut off, so that a more natural display screen without sense of strangeness is realized.

For example, if the video signal has 575 horizontal scanning lines and the display means has 480 horizontal display lines, when thinning the horizontal scanning lines at a rate of one out of every six lines, the video signals are thinned by about 95 lines≈575/6, and therefore the video signal has 575−95=480 lines, and the entire video signal can be displayed.

When thinning the horizontal scanning lines at a rate of every odd number of horizontal scanning line groups, since the horizontal scanning lines to be thinned appear alternately in every field, the thinning state of fields is averaged, and a more natural display is possible. For example, supposing the horizontal scanning lines of video signal to be 575 and the horizontal display lines of display means to be 480, when thinning the horizontal scanning lines at a rate of one out of every seven lines, the video signal is thinned by about 82 lines=575/7. Therefore, the video signal has 575−82=493 lines, and by overscanning upper and lower 13 lines to be undisplayed region, the entire video signal can be displayed.

Further according to the invention, of the horizontal scanning lines for composing one screen, the horizontal scanning lines to be thinned are selected at a rate of one out of every plurality of horizontal scanning line groups. The given first and second field video signals are written into the first and second field memories. When writing of video signals of one screen portion into the field memory is over, the video signal of one horizontal scanning line is sequentially read out alternately from the first and second field memories, and given to the display means. At this time, the video signal of the selected horizontal scanning line to be thinned, and either one of the video signals of the horizontal scanning lines before and after it are read out simultaneously, operated as specified, and given to the display means.

In this way, without missing of upper end and lower end portions of the screen as in the conventional thinned display, a very natural display screen without sense of strangeness is realized. Besides, the thinned video signal is not completely omitted, but it is operated as specified together with either one of the video signals before and after it, and given to the display means as video signal of one line. Therefore, the quantity of information of the original video signal is not omitted but is sufficiently utilized, and the display screen is created, and a more reliable display may be realized.

Thus, according to the invention, of the horizontal scanning lines for composing one screen, the horizontal scanning lines to be thinned are selected at a rate of one out of every plurality of horizontal scanning line groups, and the video signals of the selected horizontal scanning lines to be thinned are not written in field memory. After writing of video signals for one screen into memory is over, the video signal of one horizontal scanning line is alternately read out from the first and second field memories, and given to the display means to be displayed. Therefore, unlike the conventional thinned display, only the upper end and lower end portions of the screen are not cut off, and a more natural display screen without sense of strangeness may be realized.

When thinning the horizontal scanning lines at a rate of one out of every odd number of horizontal scanning line groups, the horizontal scanning lines to be thinned appear alternately in each field, and therefore the state of thinning among fields is averaged, and a more natural display is possible.

According to the invention, moreover, of the horizontal scanning lines composing one screen, the horizontal scanning lines to be thinned are selected at a rate of one out of every plurality of horizontal scanning line groups, and the selected horizontal scanning lines to be thinned and either one of the video signals of the horizontal scanning lines before or after thereof are read out simultaneously, operated as specified, and given to the display means. In this way, without missing part in the upper end and lower end of the screen as in the conventional thinned display, a more natural display screen without sense of strangeness is realized.

The thinned video signals are not completely omitted, but are operated as specified together with either one of the video signals before and after, and given to the display means as video signal of one line. Therefore, the quantity of information of the original video signal is not omitted but is sufficiently utilized to make up a display screen, so that a more reliable display may be realized.

The invention further presents a display device for display video signals of one screen composed of a predetermined number of horizontal scanning lines, by converting the video signals of interlacing method for transmitting by dividing into a first field composed of odd-numbered horizontal scanning lines and a second field composed of even-numbered horizontal scanning lines into video signals of non-interlacing method, comprising:

display means having horizontal display lines fewer than the number of horizontal scanning lines for composing one screen, a memory for storing the video signals for the portion of one line, and memory control means for writing the video signals into the memory in synchronism with the horizontal synchronizing signal given together with the video signals of interlacing method, reading out the same video signal twice consecutively in synchronism with the read-out signal of the double frequency of the horizontal synchronizing signal, and applying to the display means, wherein the memory control means selects the video signals to be thinned in every predetermined plural video signal groups when reading out the video signal, thins by reading out only once the video signal to be thinned, and thins the video signal to be displayed in the same display line in the first field and second field.

According to the invention, of the horizontal scanning lines for composing one field, the horizontal scanning lines to be thinned are selected at every plurality of horizontal scanning line groups. The given first and second field video signals are sequentially written into the memory in synchronism with the horizontal synchronizing signal given together with the video signal. When reading out the video signal, the same video signal is read out twice consecutively in synchronous with the read-out signal of double frequency of the horizontal synchronizing signal and given to the display means to be displayed. That is, by doubling the number of lines of video signals in one field, one frame (one screen) is displayed spuriously.

At this time, when reading out the video signal of the selected horizontal scanning line, it is thinned by reading out only once the video signal. That is, without two-line display by so-called double speed conversion at a rate of one out of every N lines, one-line display is effected. In other words, according to N video signals, (2N–1) horizontal display lines are displayed, instead of display of 2N horizontal display lines. This display action is repeated M time, and M video signals are thinned, thereby preventing from missing of only specific portions of video signal such as upper and lower end.

At the time of thinned display, it is designed to thin the video signal to be displayed in the same display line in the first field and second field. That is, in FIG. 9, for example, when the m+2-th video signal of the first field, and the n+1-th video signal and n+2-th video signal of the second field correspond to each other, if the m+2-th video signal is thinned in the first field, either the n+1-th or n+2-th video signal is thinned in the second field. As a result, the interlacing condition is maintained, and it is possible to prevent flickering of screen due to deviation of display position of video signal to be thinned between the first and second fields.

Thus, according to the invention, of the horizontal scanning lines for composing one field, the horizontal scanning lines to be thinned are selected in every plurality of horizontal scanning line groups, and when reading out the video signals of the selected horizontal scanning lines, thinning is effected by reading out the video signal only once. That is, instead of two-line display by so-called double speed conversion at a rate of one out of every N lines, one-line display is effected. In other words, instead of display of 2N horizontal display lines according to N video signals, (2N–1) horizontal display lines are displayed. By repeating this display action M times, M video signals can be thinned, thereby preventing missing of only specific parts of the video signal such as upper and lower ends.

At the time of thinned display, by thinning the video signal to be displayed in the same display line in the first field and second field, the interlacing condition is maintained. As a result, flickering of screen due to deviation of display position of video signal to be thinned between the first and second fields is prevented.

The invention moreover presents a display device for display video signals of one screen composed of a predetermined number of horizontal scanning lines, by converting the video signals of interlacing method for transmitting by dividing into a first field composed of odd-numbered horizontal scanning lines and a second field composed of even-numbered horizontal scanning lines into video signals of non-interlacing method, comprising:

display means having horizontal display lines fewer than the number of horizontal scanning lines for composing one screen, a line memory for storing video signals for the portion of one horizontal scanning line, and memory control means for writing the video signal in the line memory in synchronism with the horizontal synchronizing signal given together with the video signal of interlacing method, reading out the video signal twice consecutively from the line memory in synchronism with the read-out signal of the double frequency of the horizontal synchronizing signal and giving to the display means, selecting the video signal to be thinned in every predetermined consecutive number of video signal groups, and thinning by reading out the video signal to be thinned only once from the line memory.

Still more, the invention presents a display device for display video signals of one screen composed of a predetermined number of horizontal scanning lines, by converting the video signals of interlacing method for transmitting by dividing into a first field composed of odd-numbered horizontal scanning lines and a second field composed of even-numbered horizontal scanning lines into video signals of non-interlacing method, comprising:

display means having horizontal display lines fewer than the number of horizontal scanning lines for composing one screen, a line memory for storing video signals for the portion of one horizontal scanning line, a field memory for storing video signals for the portion of one field, and memory control means for writing the video signal into the field memory in synchronism with the horizontal synchronizing signal given together with the video signal of interlacing method, reading out the video signal only once from the field memory in synchronism with the read-out signal of the double frequency of the horizontal synchronizing signal, giving it to the display means, writing it into the line memory, reading out the video signal only once in synchronism with the read-out signal from the line memory and giving it to the display means, selecting the video signal to be thinned in every consecutive predetermined number of video signal groups at this time, and thinning by not reading out the video signal to be thinned from the line memory.

According to the invention, of the horizontal scanning lines for composing one field, the horizontal scanning line to be thinned is selected in every consecutive plural number of horizontal scanning line groups. The given video signals for the portion of one horizontal scanning line of the first and second fields are sequentially written into the line memory in synchronism with the horizontal synchronizing signal given together with the video signal. When reading out the video signal, the same video signal is read out from the line memory twice each consecutively in synchronism with the read-out signal of the double frequency of the horizontal synchronizing signal, and given to the display means and displayed. That is, the number of lines of video signal of one field is doubled, and one frame (one screen) is displayed spuriously.

At this time, when readingout the video signal of the selected horizontal scanning line, thinning is effected by reading out the video signal only once from the line memory. That is, instead of two-line display by so-called double speed conversion at a rate of one out of every N lines, one-line display is effected. In other words, instead of display of 2N horizontal display lines according to N video signals, (2N–1) horizontal display lines are displayed. By repeating this display action M times, M video signals can be thinned, thereby preventing missing of only specific parts of the video signal such as upper and lower ends.

Further according to the invention, of the horizontal scanning lines for composing one field, the horizontal scanning line to be thinned is selected in every consecutive plurality of horizontal scanning line groups. The given first and second field video signals are once written into the field memory in synchronism with the horizontal synchronizing signal given together with the video signal. From the field memory, the video signals for the portion of one line are once read out in synchronism with the read-out signal of the double frequency of the horizontal synchronizing signal, and given to the display mans, and written into the line memory. In succession, in synchronism with the read-out signal, the video signal is once read out from the line memory, and given to the display means. That is, the same video signal is given to two consecutive horizontal display lines of the display means, and the number of lines of video signals of one field is double, and one frame (one screen) is displayed spuriously.

At this time, when reading out the video signal from the line memory of the selected horizontal scanning line, thinning is effected by not reading out the video signal. That is, instead of two-line display by so-called double speed conversion at a rate of one out of every N lines, one-line display is effected. In other words, instead of display of 2N horizontal display lines according to N video signals, (2N−1) horizontal display lines are displayed. By repeating this display action M times, M video signals can be thinned, thereby preventing missing of only specific parts of the video signal such as upper and lower ends.

As described herein, in the invention, of the horizontal scanning lines for composing one field, the horizontal scanning line to be thinned is selected in every plurality of horizontal scanning line groups, and when reading out the selected horizontal scanning line from the line memory of video signals, thinning is effected by readingout the video signal once. That is, instead of two-line display by so-called double speed conversion at a rate of one out of every N lines, one-line display is effected. In other words, instead of display of 2N horizontal display lines according to N video signals, (2N−1) horizontal display lines are displayed. By repeating this display action M times, M video signals can be thinned, thereby preventing missing of only specific parts of the video signal such as upper and lower ends.

Also according to the invention, of the horizontal scanning lines for composing one field, the horizontal scanning line to be thinned is selected in every consecutive plurality of horizontal scanning line groups, and when reading out the video signal of the selected horizontal scanning line, the video signal is read out once only from the field memory, or the thinning is effected by not reading out from the line memory. That is, instead of two-line display by so-called double speed conversion at a rate of one out of every N lines, one-line display is effected. In other words, instead of display of 2N horizontal display lines according to N video signals, (2N−1) horizontal display lines are displayed. By repeating this display action M times, M video signals can be thinned, thereby preventing missing of only specific parts of the video signal such as upper and lower ends.

Furthermore, the video signals for the portion of one field are once written into the field, and then, as required, the video signal for displaying two lines is read out through the line memory. Therefore, in two-line display and one-line display, the read-out timing of video signal is identical, and there is no deviation of timing. Therefore, for the display means, if the number of horizontal scanning lines for composing one screen is different, they can be displayed as completely identical signals.

The invention further relates to a display device for displaying video signals composed of a predetermined number of horizontal scanning lines, wherein when displaying a video signal having a greater number of horizontal scanning lines than the video signal composed of the predetermined number of horizontal scanning lines, one out of every consecutive plural number of horizontal scanning line groups is thinned to be displayed, and the rate of this thinning is combined in plural types.

According to the invention, in the display device for displaying video signals composed of a predetermined number of horizontal scanning lines, when displaying a video signal having a greater number of horizontal scanning lines than the video signal composed of the predetermined number of horizontal scanning lines, one out of every consecutive plural number of horizontal scanning line groups is thinned to be displayed. At this time, the rate of this thinning is combined in plural types. For example, thinning of one out of every five and thinning of one out of every six are executed alternately. As a result, as compared with the case of thinning at a specific rate, a more appropriate compression rate of video signal may be realized, and the rate of roundness of image may be enhanced.

Thus, according to the invention, when displaying a video signal having a greater number of horizontal scanning lines than the video signal composed of the predetermined number of horizontal scanning line, the video signal is displayed by thinning one out of every consecutive plural horizontal scanning line groups, and the rate of thinning is combined in plural types, and, for example, thinning of one out of every five and thinning of one out of every six are executed alternately. As a result, an optimum compression rate of video signal is realized, and the rate of roundness of image is enhanced. Hence, when displaying by thinning video signals, effects of thinning on the entire display screen are reduced, and a more natural display screen may be realized.

BRIEF DESCRIPTION OF THE DRAWINGS

Other and further objects, features, and advantages of the invention will be more explicit from the following detailed description taken with reference to the drawings wherein:

FIGS. 3(1), 3(2) and 3(3) are diagrams for explaining the method of converting the video signal of interlacing method into non-interlacing method.

FIGS. 5(1) and 5(2) are diagrams for explaining the field interpolating method using field memory.

FIG. 6 is a diagram for explaining the field interpolating method using field memory.

FIGS. 7(1) and 7(2) are diagrams for explaining the line interpolating method using line memory.

FIGS. 8(1) and 8(2) are diagrams for explaining the method of converting the video signal of interlacing method into non-interlacing method by double speed conversion.

FIG. 9 is a diagram showing the frame composition in non-interlacing conversion by double speed conversion.

FIG. 10 is a diagram for explaining the definition of rate of roundness in a display device.

FIGS. 22(1)–(4) are timing charts for explaining the writing action of video signal in the display device 11.

FIGS. 23(1)–(4) are timing charts for explaining the writing action of video signal in the display device 11.

FIGS. 24(1)–(6) are timing charts for explaining the reading action of video signal in the display device 11.

FIGS. 28(1)–(3) are diagrams showing the data composition of display screen of the display device 21.

FIGS. 29(1)–(11) are timing charts for explaining the writing action of video signal of first field in the display device 21.

FIGS. 30(1)–(11) are timing charts for explaining the writing action of video signal of second field in the display device 21.

FIGS. 31(1)–(3) are timing charts for explaining the reading action of video signal of first field in the display device 21.

FIGS. 32(1)–(3) are timing charts for explaining the reading action of video signal of second field in the display device 21.

FIGS. 33(1)–(2) are diagrams for explaining a comparison example to the invention.

FIGS. 34(1)–(2) are diagrams for explaining a comparison example to the invention.

FIGS. 35(1)–(3) are diagrams for explaining a fourth embodiment of the invention.

FIGS. 36(1)–(4) are diagrams for explaining a fifth embodiment of the invention.

FIGS. 37(1)–(4) are diagrams for explaining a sixth embodiment of the invention.

FIGS. 46(1)–(3) are timing charts for explaining the writing action of video signal in the display device 41.

FIGS. 47(1)–(8) are timing charts for explaining the reading action of video signal in the display device 41.

FIGS. 51(1)–(3) are timing charts for explaining the action of the display device 51.

FIGS. 52(1)–(9) are timing charts for explaining the action of the display device 51.

DETAILED DESCRIPTION OF THE PREFERRED EMBODIMENTS

Figure 1:
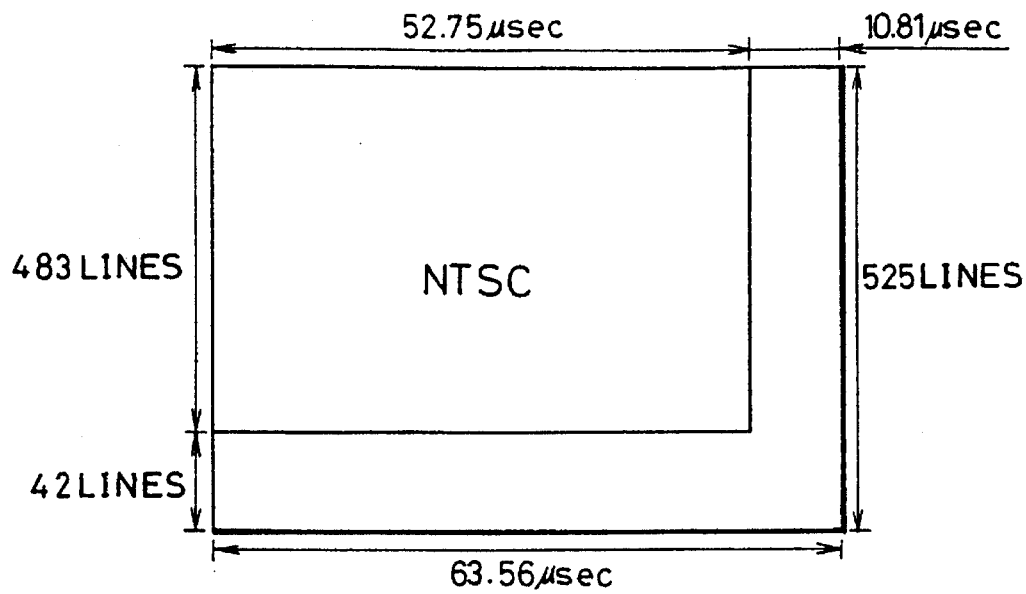
FIG. 1 is a diagram showing a composition of video signal of NTSC method.
Figure 2:
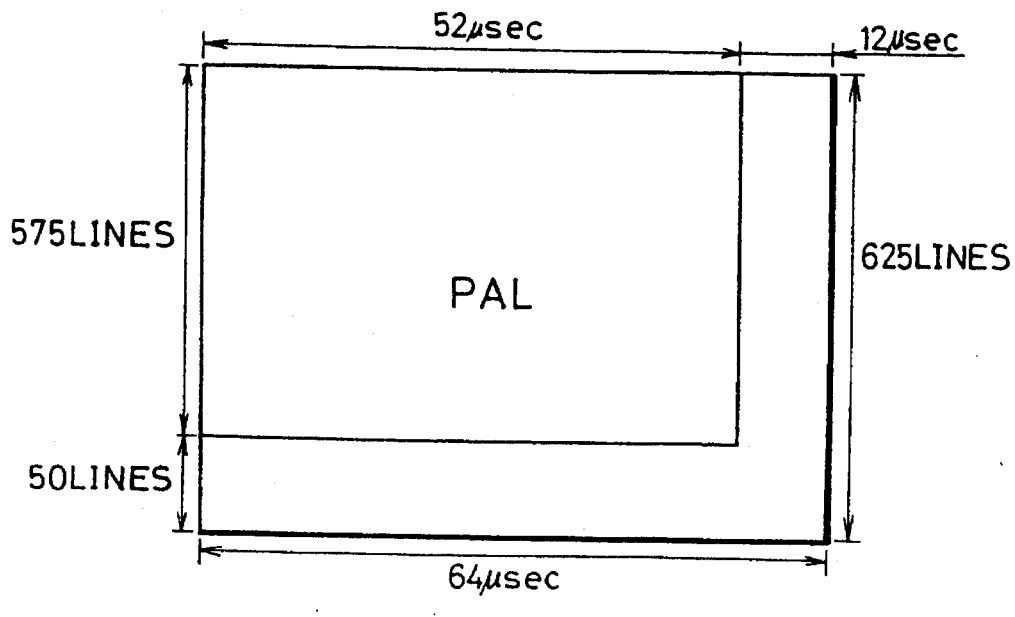
FIG. 2 is a diagram showing a composition of video signal of PAL method.
Figure 4:
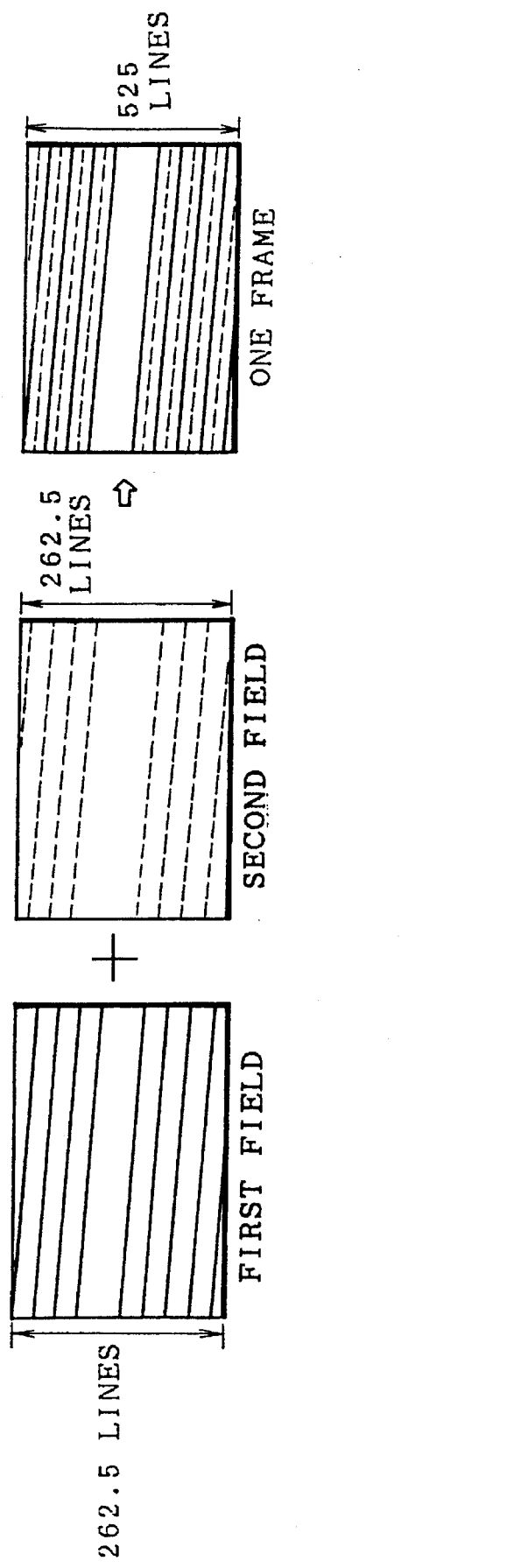
FIG. 4 is a diagram showing interlaced scanning of NTSC method.

Now referring to the drawing, preferred embodiments of the invention are described below.

Figure 11:
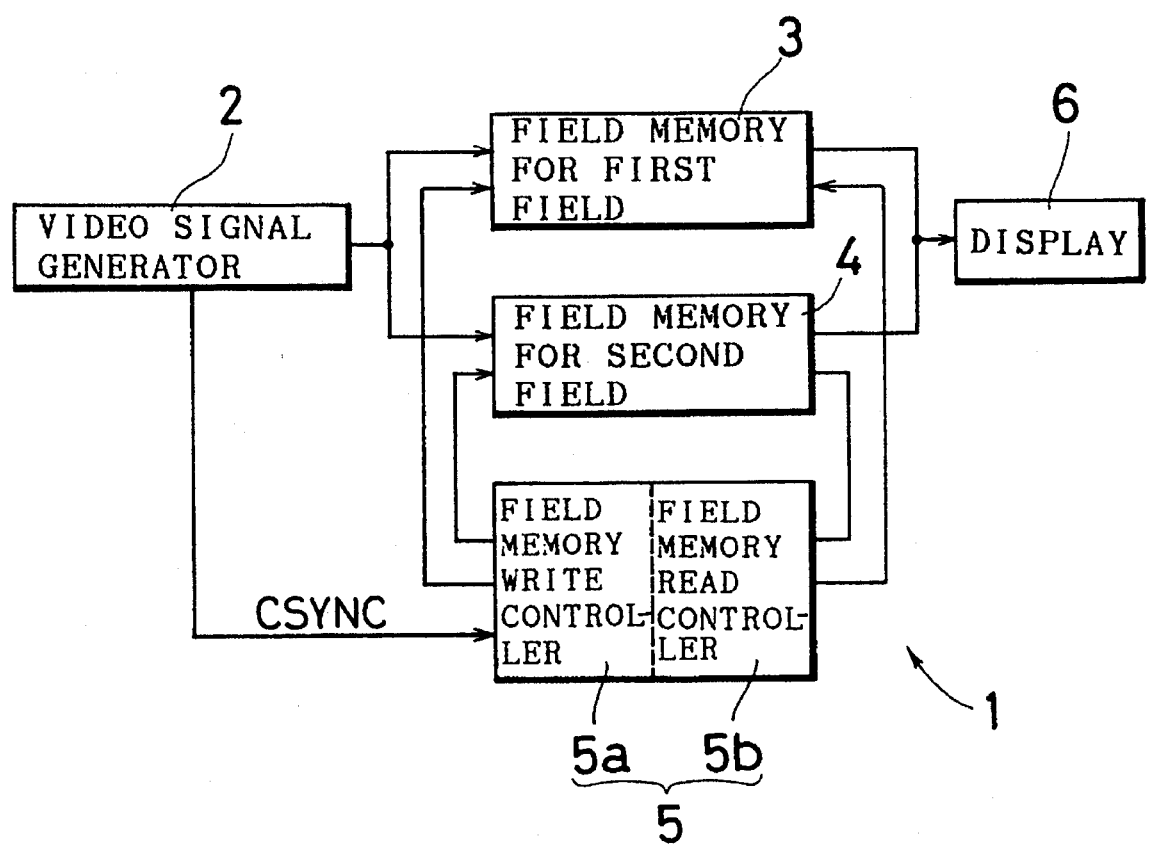
FIG. 11 is a block diagram showing a basic configuration of a display device 1 in a first embodiment of the invention.

FIG. 11 is a block diagram showing a basic configuration of a display device 1 in a first embodiment of the invention. The display device I displays by converting the video signal of interlacing method from video signal generator 2 realized, for example, by a video tape recorder, into a video signal of non-interlacing method.

The display device 1 comprises a field memory 3 for first field for storing the video signal of the first field, that is, the video signal of the odd-numbered horizontal scanning line, a field memory 4 for second field for storing the video signal of the second field, that is, the video signal of the even-numbered horizontal scanning line, controller 5 for controlling the writing and reading of video signals to the field memories 3, 4, and display means 6 realized by a liquid crystal display device or the like having a display screen of lateral 640 dots×vertical 480 lines.

The display device I displays the video signal of the interlacing method in the display means 6 by converting into a video signal of non-interlacing method by the field interpolating method using the field memory. For example, when the video signal of NTSC method is given from the video signal generator 2, both the first field and the second field possess 241.5 lines of video signals, and the video signal of the total of 1.5 lines of the beginning and end is overscanned to be set as non-display region, while the video signals of the remaining 240 lines are written into the field memories 3, 4, and the video signals of one horizontal line are read out alternately from the field memories 3, 4 at a double speed of writing, and are given to the display means 6. As a result, the video signals of 240×2=480 lines are given to the display means 6, and the image of one screen combining the video signals of the first field and second field is displayed in the display screen of the display means 6.

In this embodiment, the case of displaying the video signal having a greater number of horizontal scanning lines than the number of horizontal display lines of the display means 6 in the display device 1 is explained. In this example, the case of displaying the video signal of PAL system is shown.

In the PAL system video signal, one screen is composed of 575 horizontal scanning lines, and it is necessary to thin 575−480=95 lines of video signal in order to display in the display means 6. In the display device 1, display is made by thinning at a rate of one out of every predetermined number of horizontal scanning lines. Hence, the upper end and lower end of the screen will not be cut off as in the conventional converting method by field interpolating method.

Figure 12:
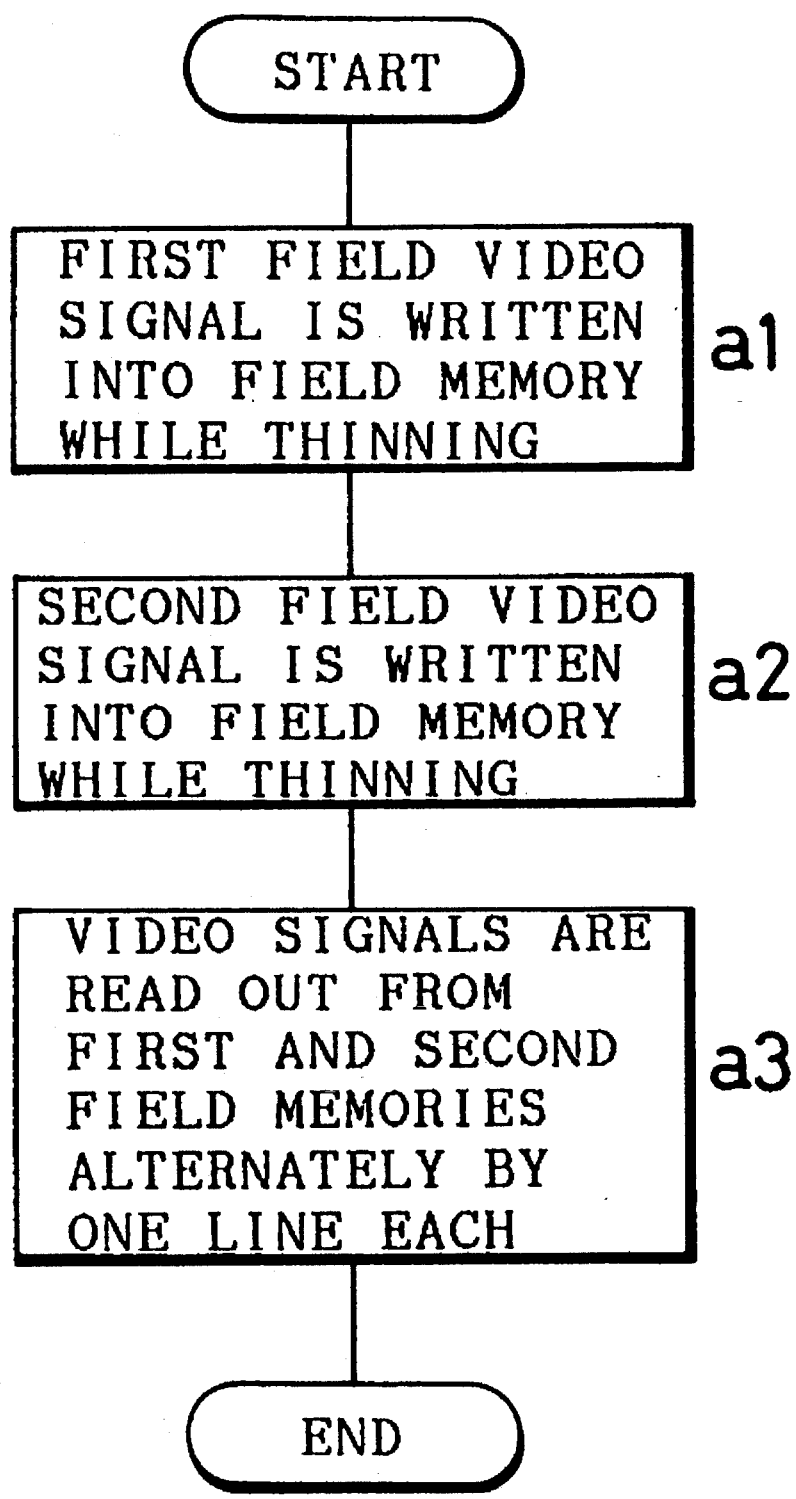
FIG. 12 is a flow chart for explaining the action of the display device 1.
Figure 13:
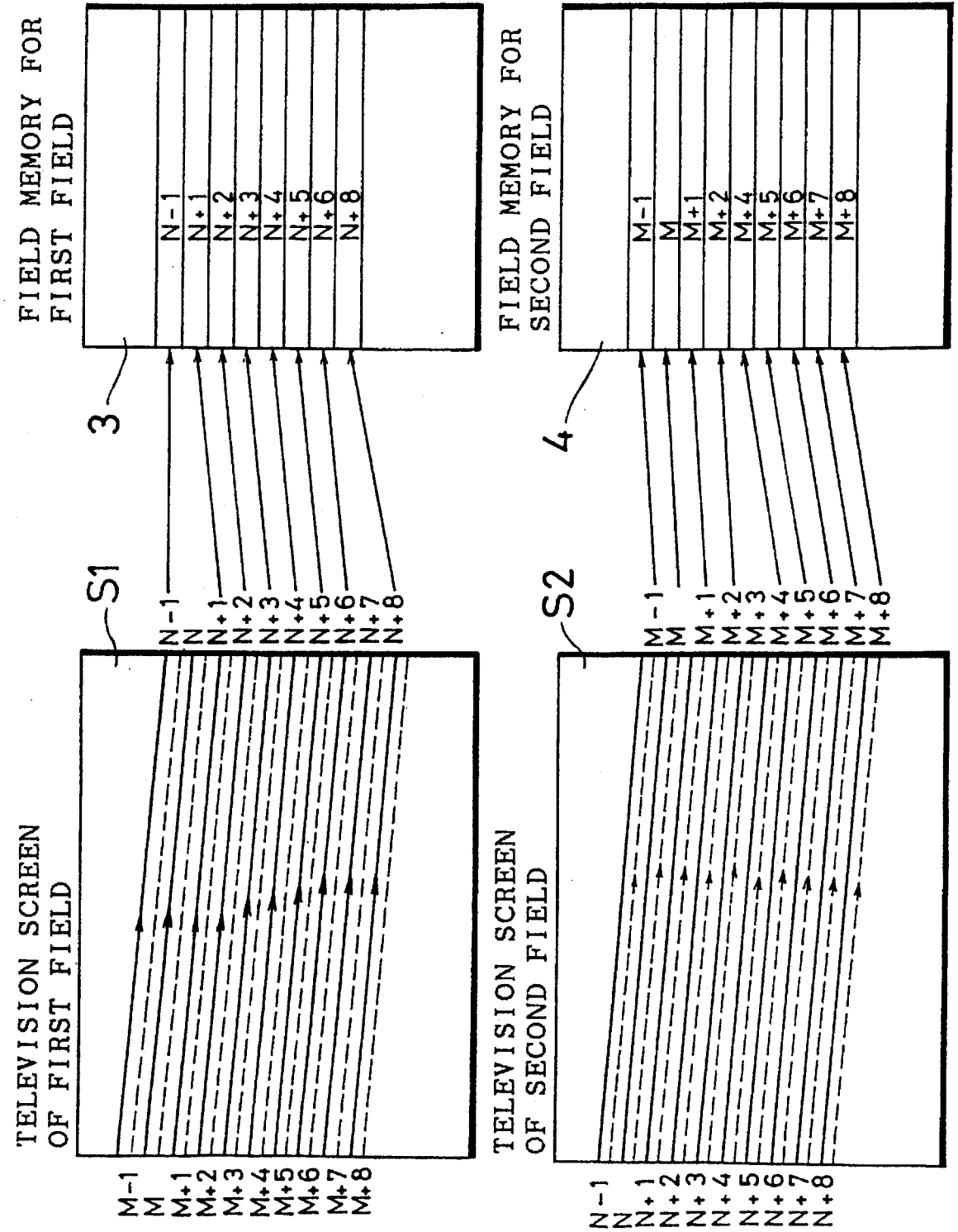
FIGS. 13(1) and 13(2) are diagrams for explaining the action of writing video signal into memory in the display device 1.
Figure 14:
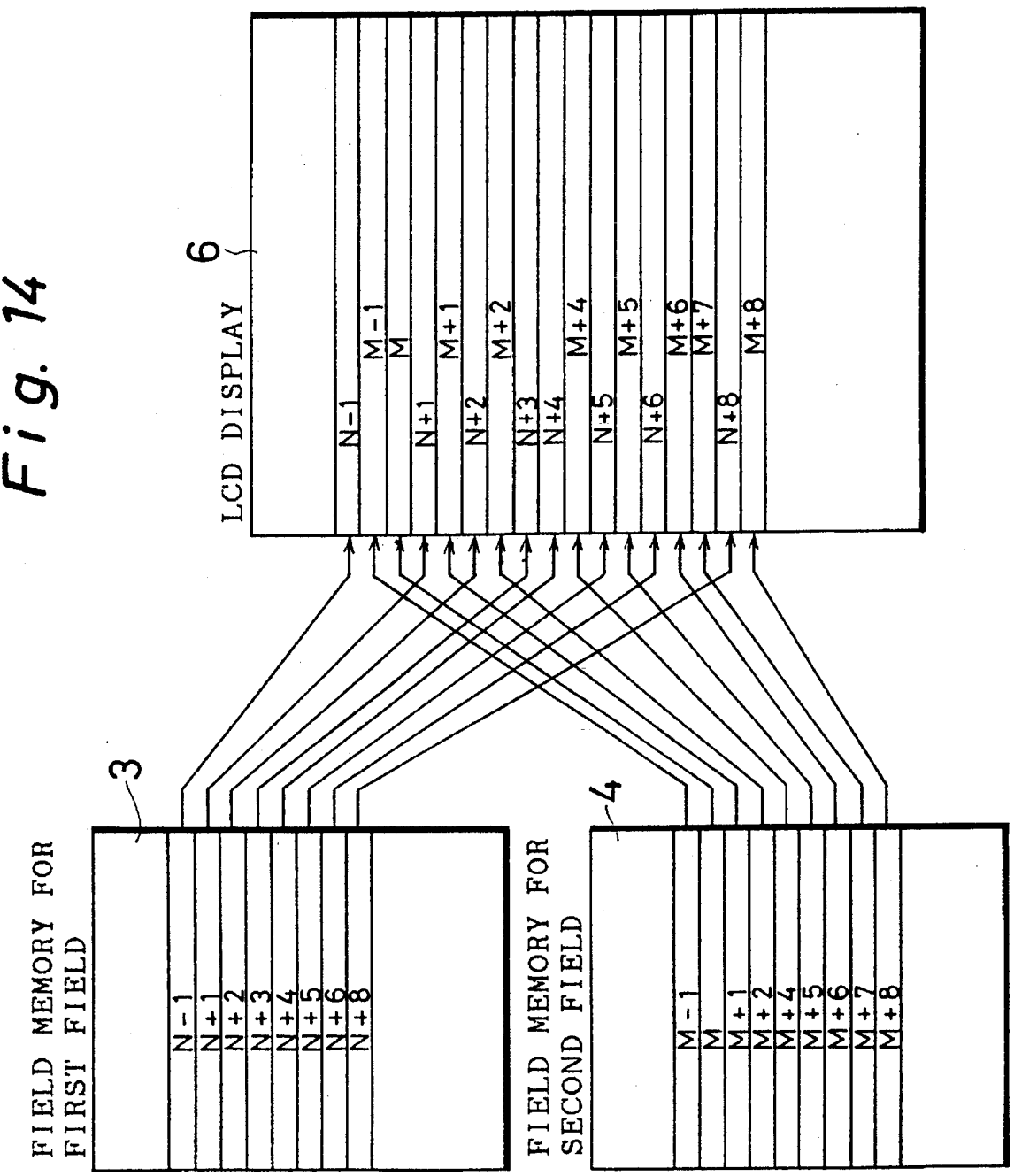
FIG. 14 is a diagram for explaining the action of reading video signal out of memory in the display device 1.

FIG. 12 is a flow chart for explaining the action of the display device 1, and FIGS. 13(1)–(2) and FIG. 14 are diagrams for explaining the action of the display device 1. This embodiment relates to a case of displaying 575 lines of video signals by thinning at a rate of one out of seven lines. That is, of the video signal shown in Table 1, the video signals enclosed by parentheses are thinned in display.

TABLE 1

| | | | | | | | | | | | |
|---|---|---|---|---|---|---|---|---|---|---|---|
| First field | ... | N−1 | (N) | N+1 | N+2 | N+3 | N+4 | N+5 | N+6 | (N+7) | N+8 | ... |
| Second field | ... | M−1 | M | M+1 | M+2 | (M+3) | M+4 | M+5 | M+6 | M+7 | M+8 | ... |

In this case, the N-th, M+3-th, and N+7-th video signals are thinned.

In step a1, a field memory write controller 5a causes the video signal S1 of the first field given from the video signal generator 2 to be synchronized with the composite synchronizing signal CSYNC given from the video signal generator 2, and writes into the field memory 3 for first field while thinning. That is, as shown in FIG. 13(1), the N-th and N+7-th video signals are not written in the field memory 3.

In step a2, the field memory write controller 5a causes the video signal S2 of the second field given from the video signal generator 2 to be synchronized with the composite synchronizing signal CSYNC given from the video signal generating means 2, and write into the field memory 4 for second field while decimating. That is, as shown in FIG. 13(2), the M+3-th video signal is not written into the field memory 4.

At step a3, a field memory read control part 5b reads out video signals by one line each alternately from the field memories 3, 4 and applies to the display means 6, in synchronism with the synchronous signal HSYNC of the double frequency of the horizontal synchronous signal CSYNC. At this time, at the timing of reading out the video signal omitted in writing, the video signal is read out continuously from the field memory reading out the video signal at the preceding timing.

More specifically, as shown in FIG. 14, when reading out the M−1-th video signal from the field memory 4, next, according to the principle, the N-th video signal should be read out from the field memory 3, but since the N-th video signal has been omitted and not written in the field memory 3, the M-th video signal is read out successively from the field memory 4. By reading out the video signals in this manner, the sequence of video signals is not changed.

Figure 15:
FIGS. 15(1)–(4) are timing charts for explaining the writing action of video signal in the display device 1.
Figure 15:
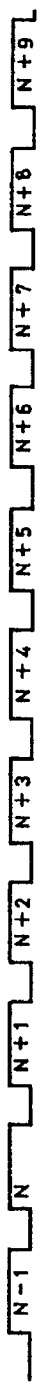
Figure 15:
Figure 15:

FIGS. 15(1)–(4) are timing charts for explaining the writing action of video signal into the field memory 3 in step a1. In synchronism with the composite synchronizing signal CSYNC shown in FIG. 15(1), the video signal of the first field shown in FIG. 15(2) is given to the display device sequentially by one line each. The field memory write controller 5a gives the field memory write control signal which is at high level only in the period of sending out the video signal to the field memory 3, in synchronous with the composite synchronizing signal CSYNC, and writes the video signal into the field memory 3.

In the period when the field memory write control signal is at low level, the video signal is not written. Therefore, in the period of receiving the N-th video signal and N+7-th video signal to be thinned, the field memory write control signal is at low level. At this time, the field memory write control signal is always at low level to the field memory 4.

Figure 16:
FIGS. 16(1)–(4) are timing charts for explaining the writing action of video signal in the display device 1.
Figure 16:
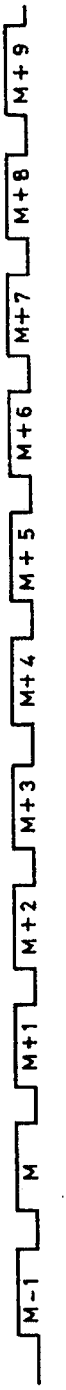
Figure 16:
Figure 16:

FIGS. 16(1)–(4) are timing charts for explaining the writing action of the video signal into the field memory 4 in step a2. In synchronism with the composite synchronizing signal CSYNC shown in FIG. 16(1), the video signal of the second field shown in FIG. 16(2) is given to the display device 1 sequentially by one line each. The field memory write controller 5a, in synchronism with the composite synchronizing signal CSYNC, given the field memory write control signal which is at high level only in the period for sending out the video signal, to the field memory 4, and writes the video signal in the field memory 4.

In the period of low level of the field memory write control signal, the video signal is not written. Therefore, in the period of receiving the M+3-th video signal to be thinned, the field memory write control signal is at low level. At this time, the field memory write control signal to the field memory 3 is always at low level.

Figure 17:
FIGS. 17(1)–(4) are timing charts for explaining the reading action of video signal in the display device 1.
Figure 17:
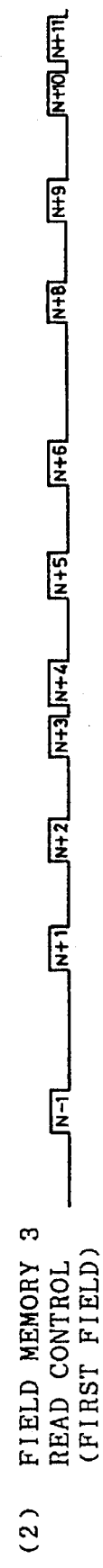
Figure 17:
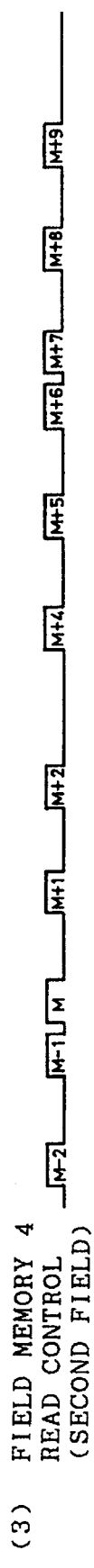
Figure 17:
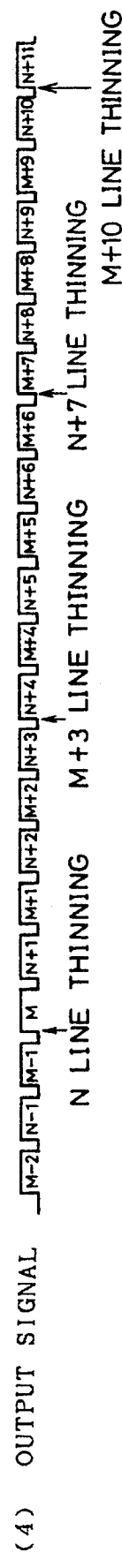

FIGS. 17(1)–(4) are timing charts for explaining the reading action of video signals from the field memories 3, 4 in step a3. The field memory read controller 5b, as shown in FIG. 17(1), in synchronism with the horizontal synchronizing signal HSYNC for reading in the period of ½ of the composite synchronizing signal CSYNC, gives field memory read control signals of high level alternately to the field memories 3, 4, and reads out the video signals, as shown in FIG. 17(2) and FIG. 17(3).

At this time, in the timing of reading out the omitted video signal not written in the memory, a read control signal is given successively to the field memory reading out the video signal immediately before, and the video signal is read out. For example, as shown in FIG. 17(3), after reading out the M−1-th video signal from the field memory 4, it is the turn for reading out the video signal from the field memory 3, but since the N-th video signal to be read out has not been written, the field memory 4 continues to give the read control signal, and reads out the M-th video signal.

Such reading action is executed similarly also right after reading out the M+3-th video signal, right after reading out the M+6-th video signal, and right after reading out the N+10-th video signal. By such reading control, the video signals of one line each are given to the display means 6 in the sequence shown in FIG. 17(4).

By this operation, about 82 lines≈575/7 of video signals can be omitted from the PAL system video signals having 575 horizontal scanning lines, and 575−82=493 lines are displayed. Here, by overscanning the 13 lines each of upper and lower end to set as non-display region, missing of upper and lower ends on display screen may be minimized, and the PAL system video signals may be displayed in the NTSC video display device. Moreover, since the horizontal scanning lines are thinned by every one out of odd-numbered horizontal scanning line groups, the number of horizontal scanning lines thinned is equal in all fields, so that a natural display screen without sense of strangeness may be realized.

In this embodiment, the seventh one of the seven video signal groups is omitted, but any one of the first to sixth video signals may be omitted. However, the video signal to be omitted must be selected commonly in all video signal groups.

Figure 18:
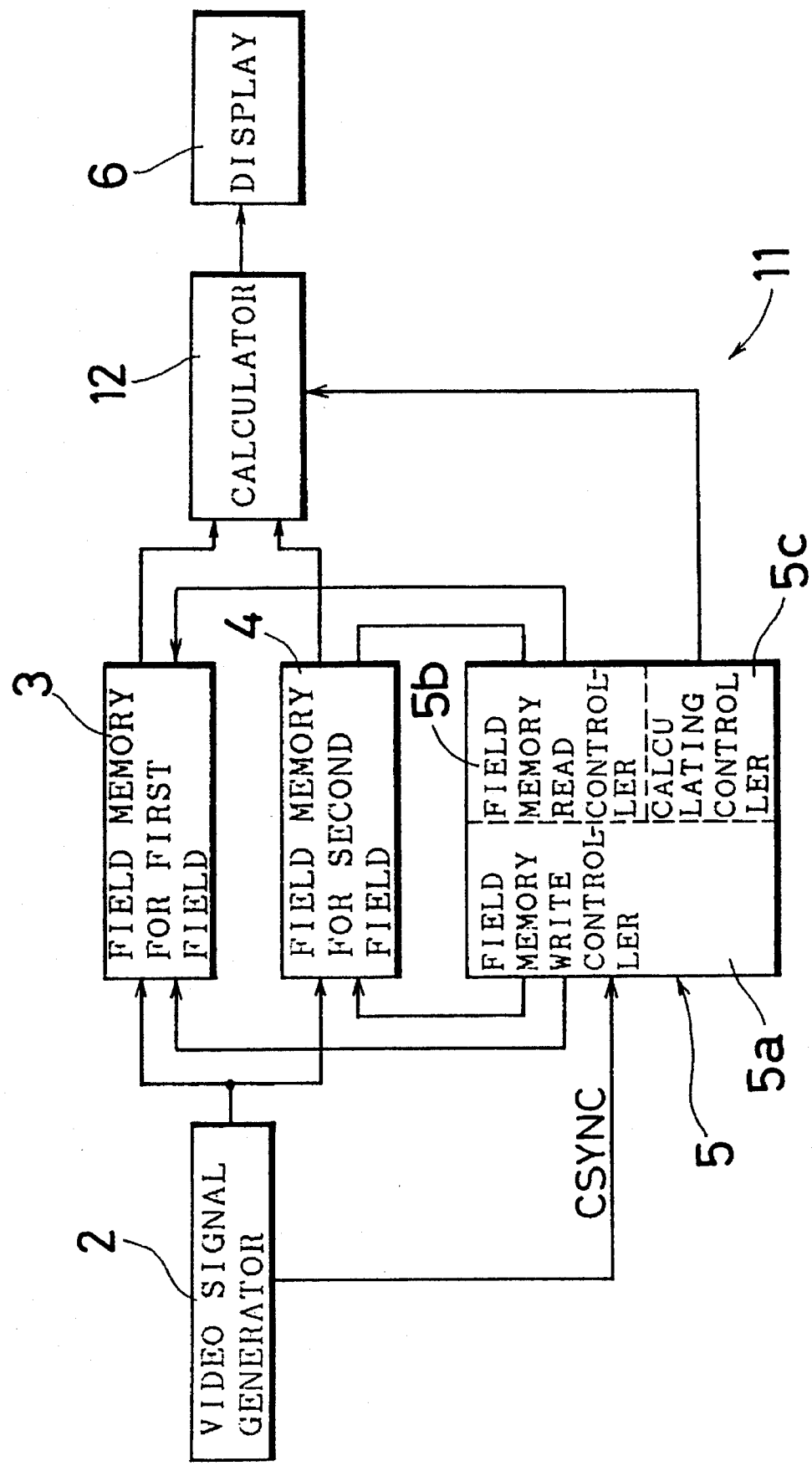
FIG. 18 is a block diagram showing a basic configuration of a display device 11 in a second embodiment of the invention.

FIG. 18 is a block diagram showing a basic configuration of a display device 11 in a second embodiment of the invention. The display device 11 in this embodiment is similar to the display device 1 shown in FIG. 11, and the same parts are identified with same reference numbers. A main feature of the display device 11 is that calculator 12 is installed between the field memories 3, 4 and the display means 6. Furthermore, calculating controller 5c is provided in the controller 5, and the calculator 12 is controlled by the calculating controller 5c.

In the foregoing display device 1, since the video signal is displayed by thinning at a rate of one out of every plurality of video signal groups, the thinned video signal is completely dropped out of the display screen. In the display device 11 of the embodiment, on the other hand, predetermined arithmetic processing is done between the video signal selected to be thinned and either one of the video signals before and after it, and a new video signal is created and displayed.

Accordingly, the video signal selected to be thinned is not completely omitted, and the lack of video signal is minimized, and therefore, the video signal having a greater number of horizontal scanning lines than the number of horizontal display lines of the display means 6, for example, that of PAL system, may be displayed in a compressed form more naturally without any sense of strangeness.

Figure 19:
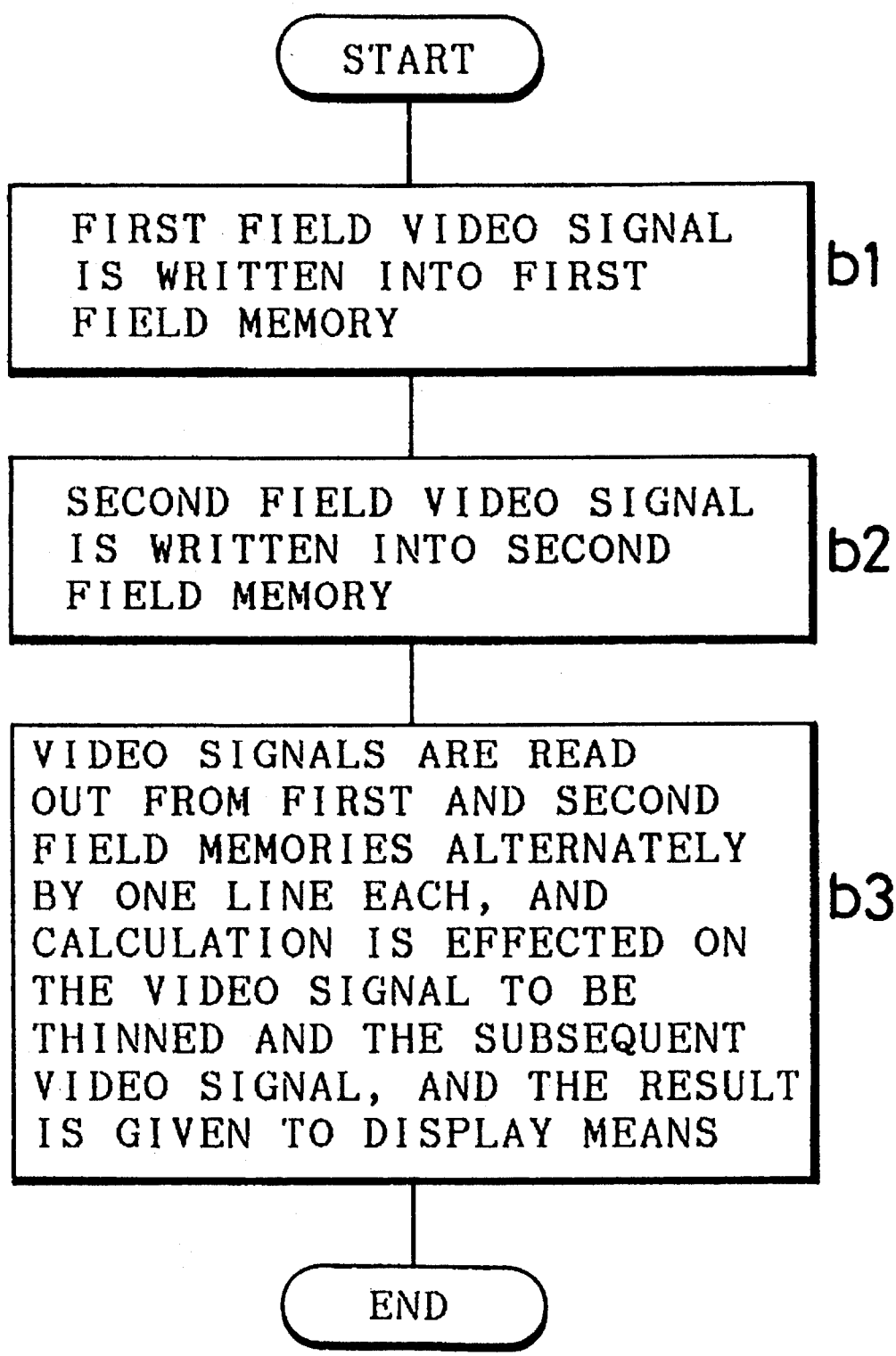
FIG. 19 is a flow chart for explaining the action of the display device 11.
Figure 20:
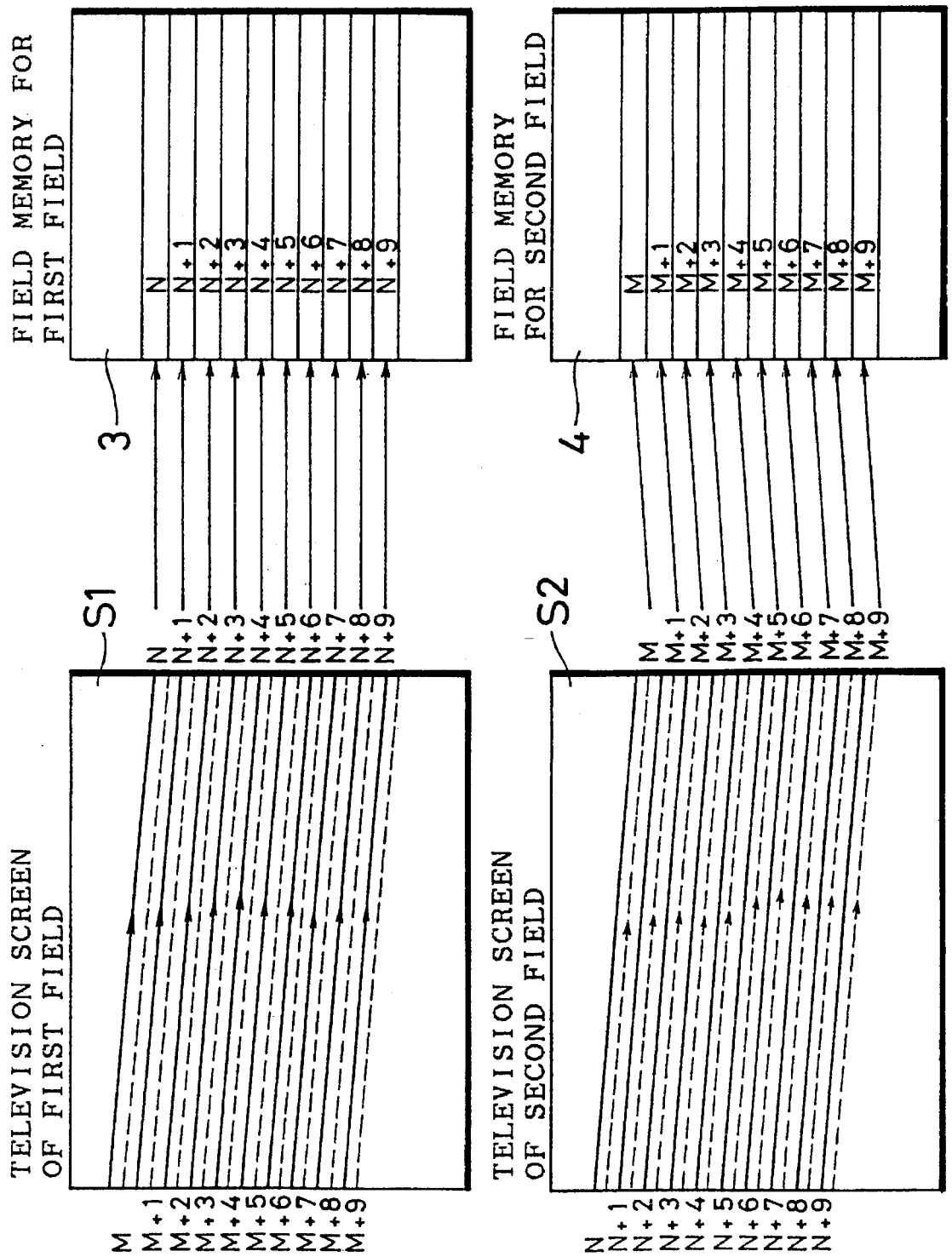
FIGS. 20(1)–(2) are diagrams for explaining the writing action of video signal in the display device 11.
Figure 21:
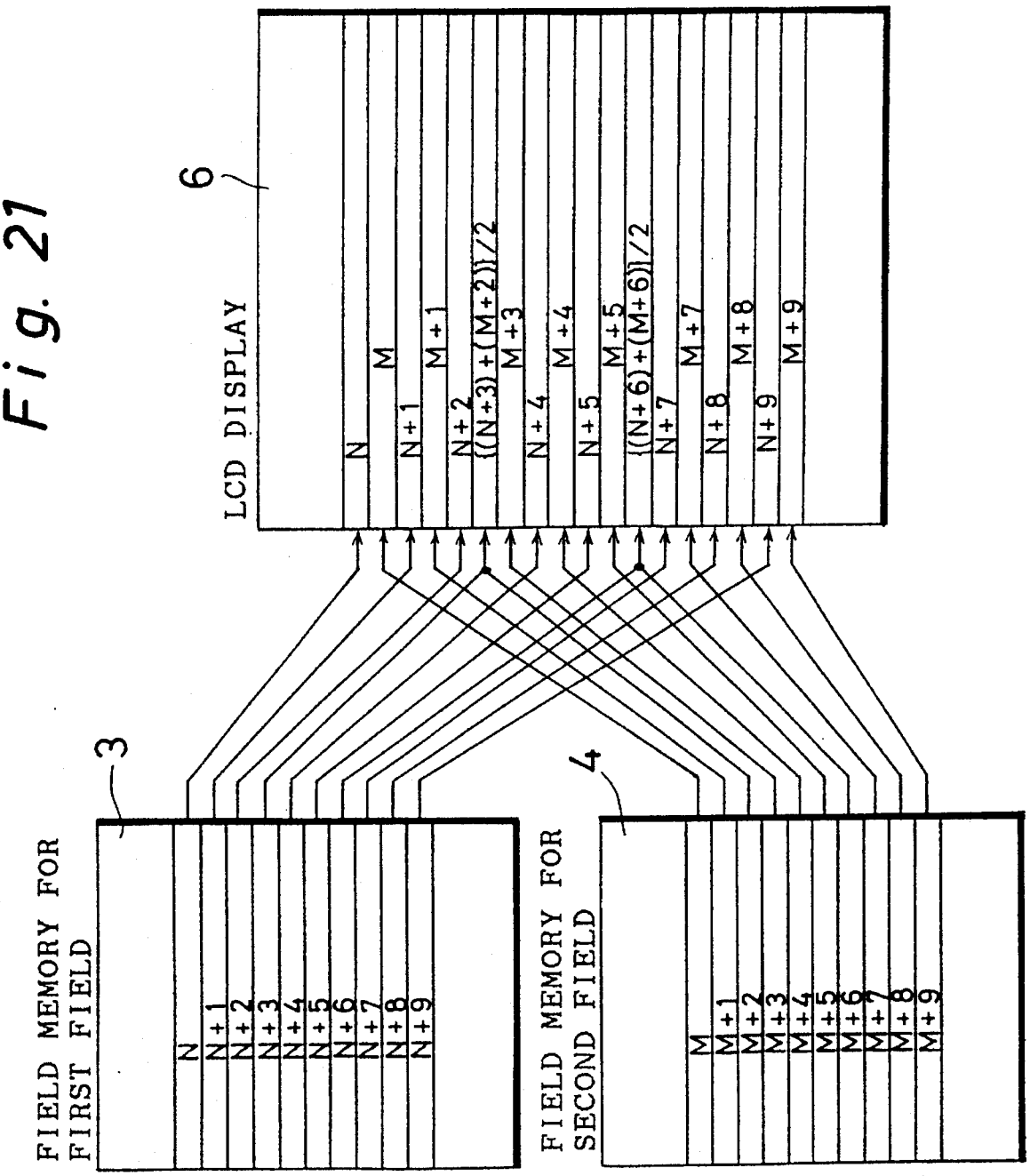
FIG. 21 is a diagram for explaining the reading action of video signal in the display device 11.

FIG. 19 is a flow chart for explaining the basic action of the display device 11, and FIGS. 20(1)–(2) and FIG. 21 are diagrams for explaining the action of the display device 11. In step b1, as shown in FIG. 20(1), the video signal S1 of the first field given from the video signal generator 2 is written into the field memory 3 for the first field by one line each.

In step b2, as shown in FIG. 20(2), the video signal S2 of the second field given from the video signal generator 2 is written into the field memory 4 for second field by one line each.

In step b3, video signals are read out by one line each alternately from the first and second field memories 3, 4 and given to the display means 6, and a predetermined operation (in this embodiment, to calculate the average of two video signals) is executed between the selected video signal to be thinned and the subsequent video signal, and the result is given to the display means 6.

That is, as shown in FIG. 21, for example, when displaying the video signals by thinning at a rate of one out of every seven video signals, the M+2-th video signal to be thinned and the N+3-th video signal just before it are read out simultaneously, and the average of two video signals is taken, and a new video signal is created and applied to the display means 6. A similar operation is done between the N+6-th video signal and M+6-th video signal.

In this way, when displaying by compressing, for example, seven video signals to six video signals the seventh video signal is not completely omitted, but the mean of the sixth and seventh video signals is taken, and a new video signal is created to be used as the sixth video signal, and therefore the video signal is not completely eliminated in the display screen, and the data missing is minimized, and a more natural display screen without sense of strangeness is realized.

FIGS. 22(1)–(4) are timing charts for explaining the operation of the display device 11 in step b1. From the video signal generator 2, the video signal of the first field is given as shown in FIG. 22(2), in synchronism with the composite synchronizing signal CSYNC as shown in FIG. 22(1). The field memory write controller 5a gives a write control signal of high level to the field memory 3 for first field, in synchronism with the composite synchronizing signal CSYNC. This high level period is selected to be equal to the period of sending out the video signal. In the memory 3, the video signal is written only for the period when the write control signal of high level is given.

In this embodiment, since all video signals of the first field are written into the memory, the write control signals are all at high level in the period of sending out the video signal. At this time, the write control signal to the field memory 4 is always at low level as shown in FIG. 22(4).

FIGS. 23(1)–(4) are timing charts for explaining the action of the display device 11 in step b2. From the video signal generator 2, the video signal of the second field is given as shown in FIG. 23(2), in synchronism with the composite synchronizing signal CSNC as shown in FIG. 23(1). The field memory write controller 5a gives the write control signal of high level to the field memory 4 for second field, in synchronism with the composite synchronizing signal CSYNC. This high level period is selected equal to the period of sending out the video signal. In the memory 4, the video signal is written only for the period when the write control signal of high level is given.

In this embodiment, in order to write all video signals of the second field into the memory, the write control signals are all at high level in the period of sending out the video signal. At this time, the write control signal to the field memory 3 is always at low level as shown in FIG. 23(4).

FIGS. 24(1)–(6) are timing charts for explaining the action of display device 11 in step b3. When reading out the video signal from the field memory, the field memory read controller 5b gives the read control signal of high level alternately to the field memories 3, 4, in synchronism with the synchronous signal HSYCN for reading out in the period of ½ of the composite synchronizing signal SCYNC given from the video signal generator 2, and the video signal is read out and given to the display means 6.

At this time, when reading out the M+2-th video signal or the sixth video signal from the field memory 4, the read-out control signal of high level is simultaneously given to the field memory 3, and the N+3-th video signal is read out as the seventh video signal. Furthermore, by giving the arithmetic control signal of high level to the calculator 12 by the calculating controller 5c, the two video signals are operated as specified, and the result is sent to the display means 6. A similar operation is done when reading out the M+5-th video signal and N+6-th video signal. Hence, the seven video signals can be compressed and displayed as six video signals.

Thus, according to the embodiment, the video signal to be thinned is not completely eliminated, but is operated as specified together with either one of the video signals before and after it, and a new video signal is created and displayed, and therefore the data missing is minimized, and the video signal is displayed more naturally in a form of compressing the video signal without sense of strangeness.

In the embodiment, of the seven video signal groups, a new video signal is created by using the sixth and seventh signals, but any two consecutive video signals may be combined. However, the video signals to be used in each video signal group should be selected commonly.

Figure 25:
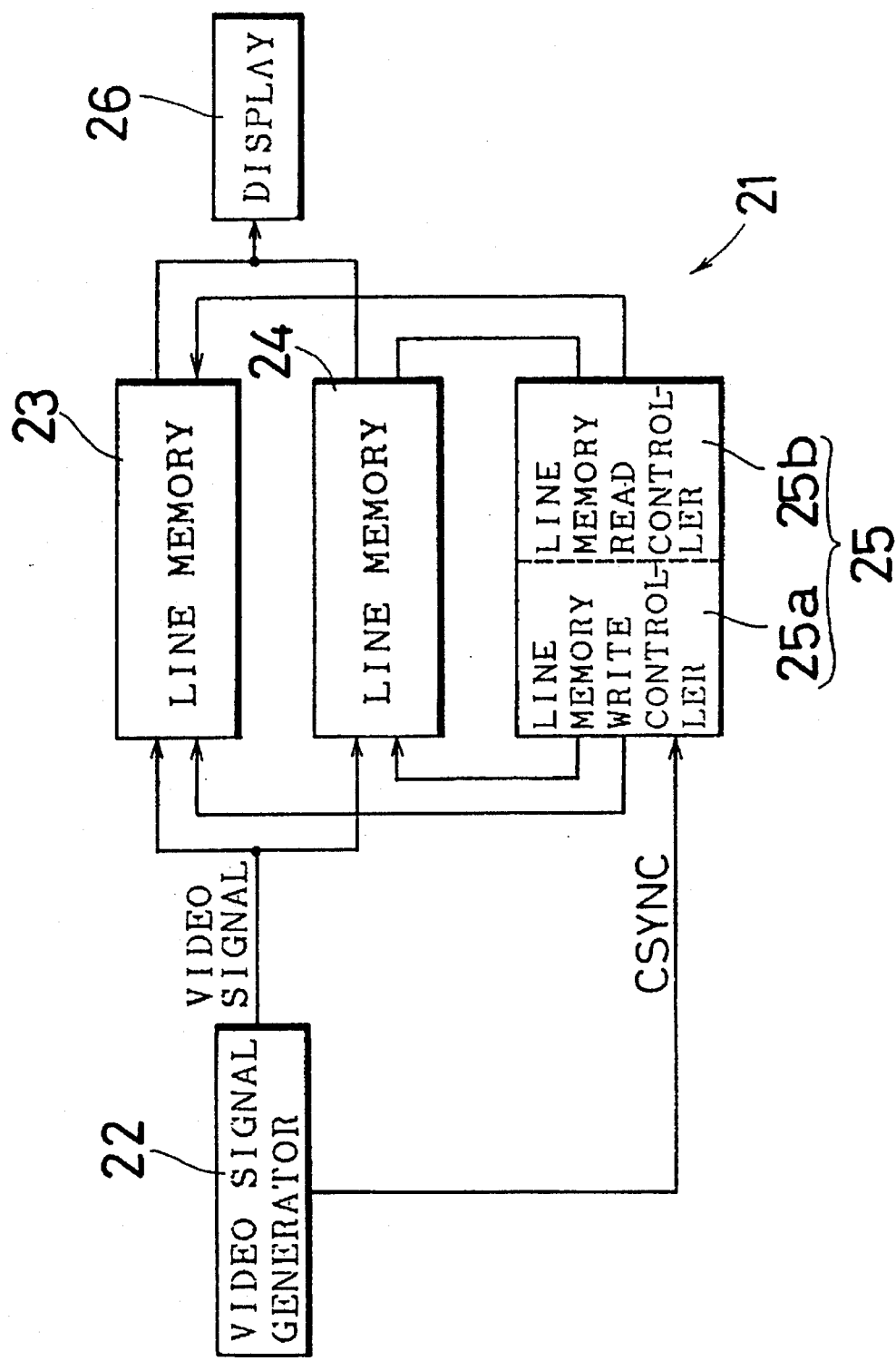
FIG. 25 is a block diagram showing a basic configuration of a display device 21 in a third embodiment of the invention.

FIG. 25 is a block diagram showing a basic configuration of a display device 21 in a third embodiment of the invention. The display device 21 displays the video signal of interlacing method from video signal generator 22 realized, for example, by a video tape recorder, by converting into a video signal of non-interlacing method.

The display device 21 comprises line memories 23, 24 for storing video signals for the portion of one line, controller 25 for controlling writing and reading of video signals to the line memories 23, 24, and display means 26 realized by, for example, a liquid crystal display device having a display screen of lateral 640 dots×vertical 480 lines.

The display device 21 displays the video signal of interlacing method in the display means 26 by converting into a video signal of non-interlacing method by so-called double speed conversion. For example, when a video signal of NTSC method is given from the video signal generator 22, there are 241.5 video signals in both first field and second field, and the video signals are overscrupulous in the total of 1.5 lines of the beginning and end thereof to be set as non-display region, while the remaining 240 video signals are alternately written into the line memories 23, 24. After the video signals are written in the line memories 24, when reading out the video signals, the video signals of one scanning line are consecutively read out twice each from the line memories 24, 23 at a double speed of writing, and are given to the display means 26. As a result, 240×2= 480 video signals are given to the display means 26, and the image signal of the first field is displayed on the display screen of the display means 26 as one screen. When the video signal of the second field is written into the line memories 23, 24, a similar operation is done, and the video signal of the second field is displayed as one screen on the display screen of the display means 26.

This embodiment is to explain a case of displaying the video signals having a greater number of horizontal scanning lines than the number of horizontal display lines of the display means 26 in the display device 21. In this example, a case of displaying PAL system video signals is shown.

The PAL system video signal comprises 625/2=312.5 horizontal scanning lines per field, and video signals as effective data are available in 575/2=287.5 horizontal scanning lines. Here, overscanning the 7.5 video signals to be set as non-display region, the case of displaying the remaining 280 video signals is assumed.

When 280 video signals are converted at double speed to be 560 video signals, since the display means 6 has 480 horizontal display lines, it is necessary to thinned 560–480=80 video signals. That is, without converting the 80 video signals at double speed, the remaining 280–80=200 video signals are converted at double speed to obtain 400 video signals, and 480 video signals are produced in total, which can be displayed in the display means 26.

At this time, while converting 280/80=3.5 video signals at double speed, one video signal is thinned, but actually five out of seven video signals are converted at double speed, and the other two video signals are displayed without double speed conversion. Besides, considering the linearity in the vertical direction of the display screen, it is better to thinned uniformly in the first and second fields, and considering a set of seven video signals in this case, for example, the second and fifth video signals are thinned out of seven video signals in the first field, and in the second field the video signals corresponding to the video signal thinned in the first field are thinned.

Figure 26:
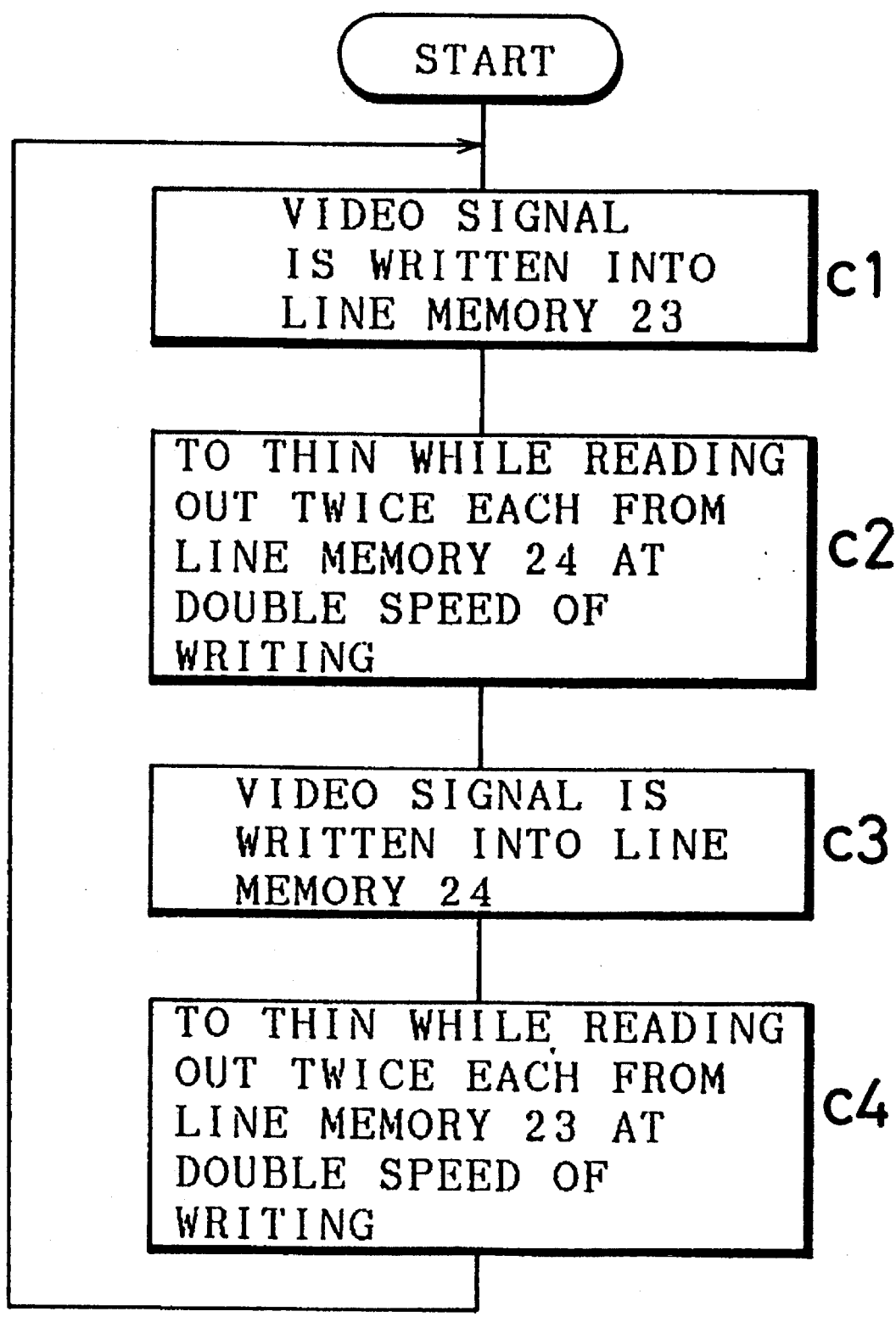
FIG. 26 is a flow chart for explaining the action of the display device 21.
Figure 27:
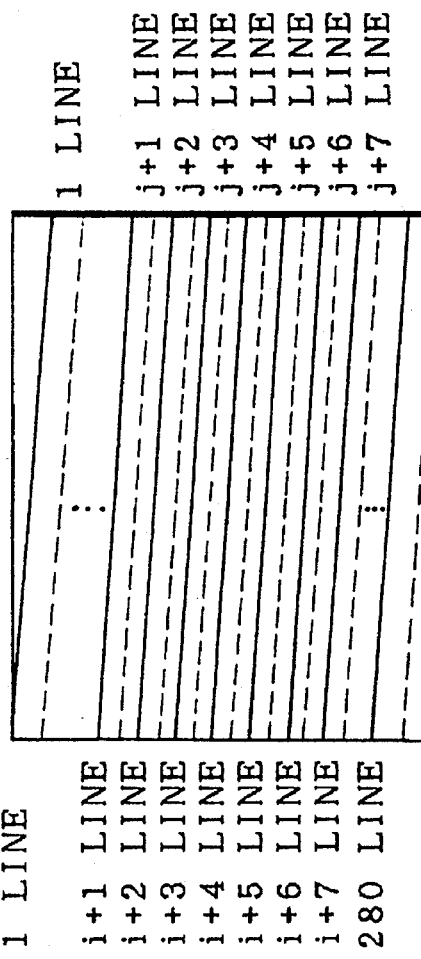
FIGS. 27(1)–(3) are diagrams for explaining the action of the display device 21.
Figure 27:
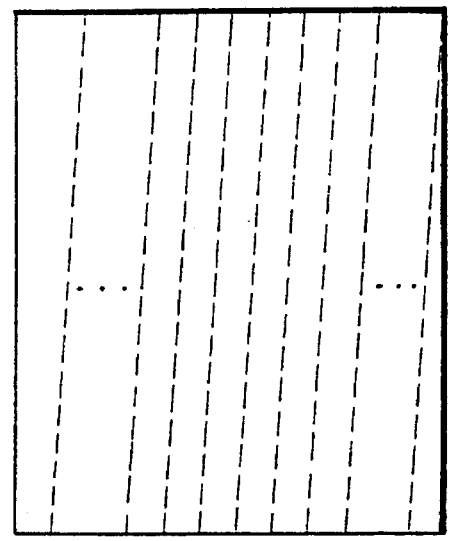
Figure 27:
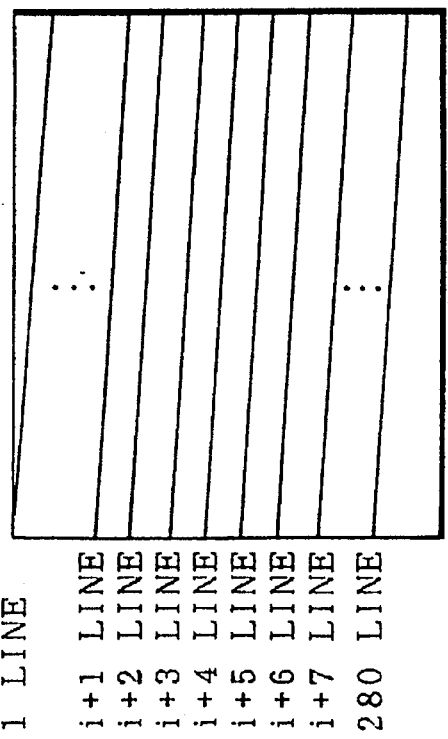

FIG. 26 is a flow chart for explaining the action of the display device 21, and FIGS. 27(1)–(3) and FIGS. 28(1)–(3) are diagrams for explaining the operation of the display device 21. In this embodiment, in one field, two out of seven video signals are thinned and displayed. Therefore, 12 horizontal display lines are displayed by seven video signals. Here, as shown in FIGS. 27(1)–(3), an example is explained, relating to the i+1-th to i+7-th video signals (also called line data) of the first field, and line j+1 to j+7 video signals of the second field.

In step c1, the video signals for the portion of one line given from the video signal generator 22 are written into the line memory 23. In step c2, at double speed of writing video signals, reading out twice each from the line memory 24, the signals are thinned while converting at double speed. In steps c1, c2, the operation is done in the same horizontal period in terms of the time.

In step c3, the video signals for the portion of one line given from the video signal generator 22 are written into the line memory 24. In step c4, reading out twice each from the line memory 23 at double speed of writing video signals, the signal are thinned while converting at double speed. In steps c3, c4, the operation is done in the same horizontal period in terms of the time.

That is, as shown in FIGS. 28(1)–(3), in the first field, only by reading once the i+2 data and i+5 line data, 14 line data are thinned into 12 line data. At this time, the line data to be thinned in the second field are selected from the line data thinned in the first field. In other words, the line data to be displayed in the same display line if not thinned is selected. Therefore, as shown in FIGS. 28(1)–(3), the data corresponding to i+2 line data of the first field is available in two types in the second field, that is, j+1 line data and j+2 line data, and therefore either one line data, or j+1 line data in this embodiment is thinned. Similarly, the data corresponding to i+5 line data in the first field is j+4 line data and j+5 line data in the second field, and either line data, or j+5 line data in this embodiment is thinned.

FIGS. 29(1)–(11) are timing charts for explaining the action of display means 21 when the video signal of the first field is given. From the video signal generator 22, in synchronism with the composite synchronizing signal CSYNC show in FIG. 29(2), the video signal of the first field is given as shown in FIG. 29(1). The line memory write controller 25a applies write control signals of high level alternately to the line memories 23, 24 as shown in FIG. 29(3), (7), in synchronism with the composite synchronizing signal CSYNC. This high level period is selected equal to the send-out period of video signal. In the line memories 23, 24, video signals are written only for the period when the write control signal of high level is applied. Here, since the video signals of the first field are all written into the line memories 23, 24 sequentially, all write control signals are at high level in the send-out period of video signals.

Therefore, as shown in FIG. 29(4), (8), the video signals are alternately written into line memories 23, 24. In the line memory in which write control signal is not given, as shown in FIG. 29(5), (9), read control signals are given twice each, and the same video signal is read out twice as shown in FIG. 29(6), (10). Hence, the video signals are converted at double speed as shown in FIG. 29(11).

FIGS. 30(1)–(11) are timing charts for explaining the action of the display device 21 when video signals of the second field are given. From the video signal generator 22, in synchronism with the composite synchronizing signal CSYNC shown in FIG. 30(2), the video signal of the second field is given as shown in FIG. 30(1). The line memory write controller 25a gives write control signals of high level alternately to the line memories 23, 24 as shown in FIGS.

30(3), (7), in synchronism with the composite horizontal synchronizing signal CSYNC. This high level period is selected equal to the send-out period of the video signal. In the line memories 23, 24, the video signals are written only for the period when the write control signal of high level is given. Here, since all video signals of the second field are sequentially written into the line memories, 23, 24, the write control signals are all at high level in the send-out period of the video signals.

Therefore, as shown in FIGS. 30(4), (8), the video signals are alternately written into the line memories, 23, 24. In the line memory In which write control signal is not given, as shown in FIGS. 30(5), (9), the read-out control signal is given twice each, and the same video signal is read out twice as shown in FIGS. 30(6), (10). Hence, as shown in FIG. 30(11), the video signals are converted at double speed.

FIGS. 31(1)–(3) are timing charts for explaining the action of the display device 21 when the video signal of the first field is given. When reading out the video signal, the line memory read controller 25b gives the read control signal of high level to the line memories 23, 24 in synchronism with the synchronizing signal for reading out RSYNC of ½ period created on the basis of the composite synchronizing signal CSYNC given from the video signal generator 22, and reads out the video signal and give to the display means 26. The video signal is read out basically by reading out twice consecutively at double speed of writing one video signal, and converted at double speed for two-line data.

At this time, when reading out i+2 line data and i+5 line data selected as the line data to be thinned, without converting at double speed, the line data are thinned by reading out only once and given to the display means 26 as one line data.

FIGS. 32(1)–(3) are timing charts for explaining the action of the display device 21 when the video signals of the second field are given. When reading out the video signals, the line memory read controller 25b gives the read control signal of high level to the line memories 23, 24 in synchronism with the synchronizing signal for reading out RSYNC of ½ period created on the basis of the composite synchronizing signal CSYNC given from the video signal generator means 22, and reads out the video signal, and gives to the display means 26. The video signal is read out basically by reading out twice consecutively at double speed of writing one line data, same as above, and converted at double speed to have two line data.

At this time, when reading out the line data corresponding to the line data not converted at double speed when reading out the line data of the first field, without converting at double speed, by reading out once and giving to the display means 26 as one line data, the line data is thinned. In this embodiment, the j+1 line data and j+5 line data are decimated.

FIGS. 33(1)–(2) and FIGS. 34(1)–(2) are diagrams for explaining reference examples to the invention. In the invention, the corresponding line data are thinned in the first field and second field, while in the reference examples, the line data are thinned irregularly in the first field and second field.

In FIGS. 33(1)–(2), of the line data of one frame shown in FIG. 33(1), in the first field, m line data and m+2 line data are thinned, and in the second field n+3 line data and n+5 line data are thinned, and therefore, the frame composition in each field becomes as shown in FIG. 33(2). In this example, there is a deviation in the corresponding relation of line data on lines k+1, k+2, k+4, k+6, k+8, k+9.

Similarly, in FIGS. 34(1)–(2), of the line data of one frame shown in FIGS. 34(1)–(2), in the first field, m+1 line data and m+4 line data are thinned, and in the second field, n+2 line data and n+2 line data are thinned, and the frame composition in each frame becomes as shown in FIG. 34(2). Here, there is a deviation in the corresponding relation of line data on lines k+3, k+4, k+8, k+9.

In this way, when the line data are thinned irregularly in the first field and second field, flickering occurs in the screen displayed because of the deviation in the corresponding relation of the line data. By contrast, in the invention, since corresponding line data are thinned in the first field and second field, such flickering of screen may be prevented.

Thus, according to the embodiment, since the video signals are thinned in every consecutive plurality of video signal groups, only the upper and lower portions of the screen will not be missing in the video signals, and more natural screen without sense of strangeness may be displayed. Besides, since the corresponding video signals are thinned in the first field and second field, flickering of screen is not caused, and a favorable display screen is realized.

FIGS. 35(1)–(3) are diagrams for explaining a fourth embodiment of the invention. In the third embodiment, if there are two types of corresponding line data when selecting the line data to be thinned, which line data is to be thinned is selected irregularly. By contrast, in the second embodiment, if there are two types of line data in the second field corresponding to the line data to be thinned in the first field, it is intended to thin the line data of the first line given in terms of the time.

More specifically, as shown in FIGS. 35(1)–(3), when thinning the i+2 line data in the first field, there are two types of corresponding line data in the second field, that is, j+1 line data and j+2 line data. Since the j+1 line data is given before the j+2 line data in time, the j+1 line data is thinned in this case. In the second field, there are two types of corresponding data, that is, j+4 line data and j+5 line data. In this case, the j+4 line data is thinned. In this embodiment, too, the same effect as the preceding third embodiment is obtained.

FIGS. 36(1)–(3) are diagrams for explaining a fifth embodiment of the invention. It is a feature of this embodiment that the second line data given later in the time is thinned if there are two line data in the second field corresponding to the line data to be thinned selected in the first field.

That is, as shown in FIGS. 36(1)–(3), when thinning i+2 line data in the first field, there are two types corresponding to the i+2 line data in the second field, that is, j+1 line data and j+2 line data. Since the j+2 line data is given later than then j+1 line data, the j+2 line data is thinned in this embodiment. Similarly, when thinned i+5 line data in the first field, j+4 line data and j+5 line data correspond to the i+5 line data in the second field. Since the j+5 line data is given later than the j+4 line data, the j+5 line data is thinned in this case. In this embodiment, too, the same effects as in the foregoing embodiment are obtained.

FIGS. 37(1)–(4) are diagrams for explaining a sixth embodiment of the invention. It is a feature of the embodiment that the combination of line data to be thinned is varied between frame group A and subsequent frame group B, by forming a frame group in a set of display screen of one frame on the basis of video signals of the first field and display screen of one frame on the basis of video signal of the subsequent second field. An example of combination of thinning line data is shown in Table 2.

TABLE 2

|  | Frame group A | | Frame group B | |
| --- | --- | --- | --- | --- |
| First field | i+2 | i+5 | i+2 | i+5 |
| Second field | j+1 | j+4 | j+2 | j+5 |

If the data corresponding to the line data to be thinned selected in the first field involves two types in the second field, the first line and second line are thinned alternately in each field. In this embodiment, the same effects as in the preceding embodiments are brought about.

Figure 38:
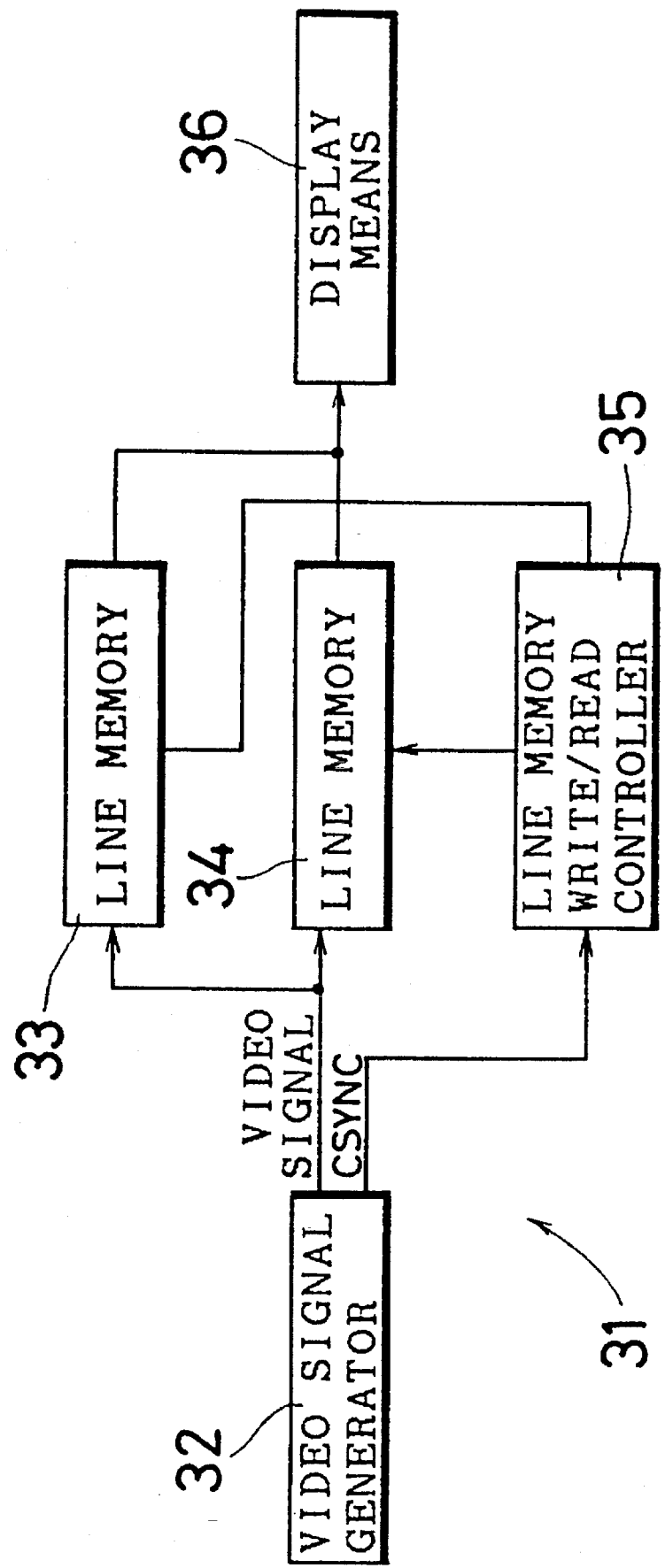
FIG. 38 is a block diagram showing a configuration of a display device 31 in a seventh embodiment of the invention.

FIG. 38 is a block diagram showing a basic configuration of a display device 31 in a seventh embodiment of the invention. The display device 31 displays the video signal of interlacing method from video signal generator 32 realized by, for example, video tape recorder, by converting into a video signal of non-interlacing method.

The display device 31 comprises line memories 33, 34 for storing video signals for the portion of one line each, line memory write/read controller 35 for controlling writing and reading of video signals to the line memories 33, 34, and display means 36 realized by a liquid crystal display device or the like having a display screen of lateral 640 dots× vertical 480 lines.

The video signal from the video signal generator 32 is delivered in digital signal. However, in the case of analog signal, an A/D (analog/digital) converter, not shown, is connected between the video signal generator 32 and line memories 33, 34, and it is digitized. The display means 36 is display means such as liquid crystal display device that can be driven by a digital signal. However, in the case of display means driven by analog signal, a D/A (digital/analog) converter, not shown, is connected between the line memories 33, 34 and display means 36.

The display device 31 displays the video signal of interlacing method in the display means 36 by converting into video signal of non-interlacing method by so-called double speed conversion. For example, when a video signal of NTSC method is given from the video signal generator 32, in both first field and second field, there are 241.5 video signals, and a total of 1.5 video signals of the beginning and end are overscanned to be set as non-display region, while the remaining 240 video signals are alternately written into the line memories 33, 34.

After the video signals are written into the line memories 33, 34, when reading out the video signals, the video signals of one horizontal scanning line are read out twice each consecutively from the line memories 34, 33 at double speed of writing, and are given to the display means 36. As a result, 240×2=480 video signals are given to the display means 36, and the video signals of the first field are displayed as one screen on the display screen of the display means 36. When the video signals of the second field are sequentially written in the line memories 33, 34, the same action as above is effected, and the video signals of the second field are displayed as one screen on the display screen of the display means 36.

In this embodiment, it is intended to display the video signals having a greater number of horizontal scanning lines than the number of horizontal display lines of the display means 36 in the display device 31. In this example, the PAL system video signals are displayed.

The PAL system video signal have 625/2=312.5 horizontal scanning lines per field, and video signals as effective data are present in 575/2=287.5 horizontal scanning lines. In this case, 25.5 lines are overscanned to be set as non-display region, and the remaining 262 video signals are displayed.

When the 262 video signals are converted at double speed to obtain 524 video signals, the number of horizontal display lines of the display means 36 is 480, and therefore it is necessary to thin 524−480=44 video signals. That is, without converting the 44 video signals at double speed, the remaining 262−44=218 video signals are converted at double speed to make up 436 video signals, thereby totaling to 480 video signals, which are displayed in the display means 36.

At this time, while converting 262/44≈5.95, or about 6 video signals at double speed, one video signal is thinned. Considering the linearity of the vertical direction of the display screen, it is favorable to thin uniformly in the first and second fields, and hence considering a set of six video signals in each field, for example, the first video signal is thinned out of the six video signals in the first field, and the video signal corresponding to the video signal thinned in the first field is thinned in the second field. That is, the video signals displayed in the same horizontal display line are thinned.

Figure 39:
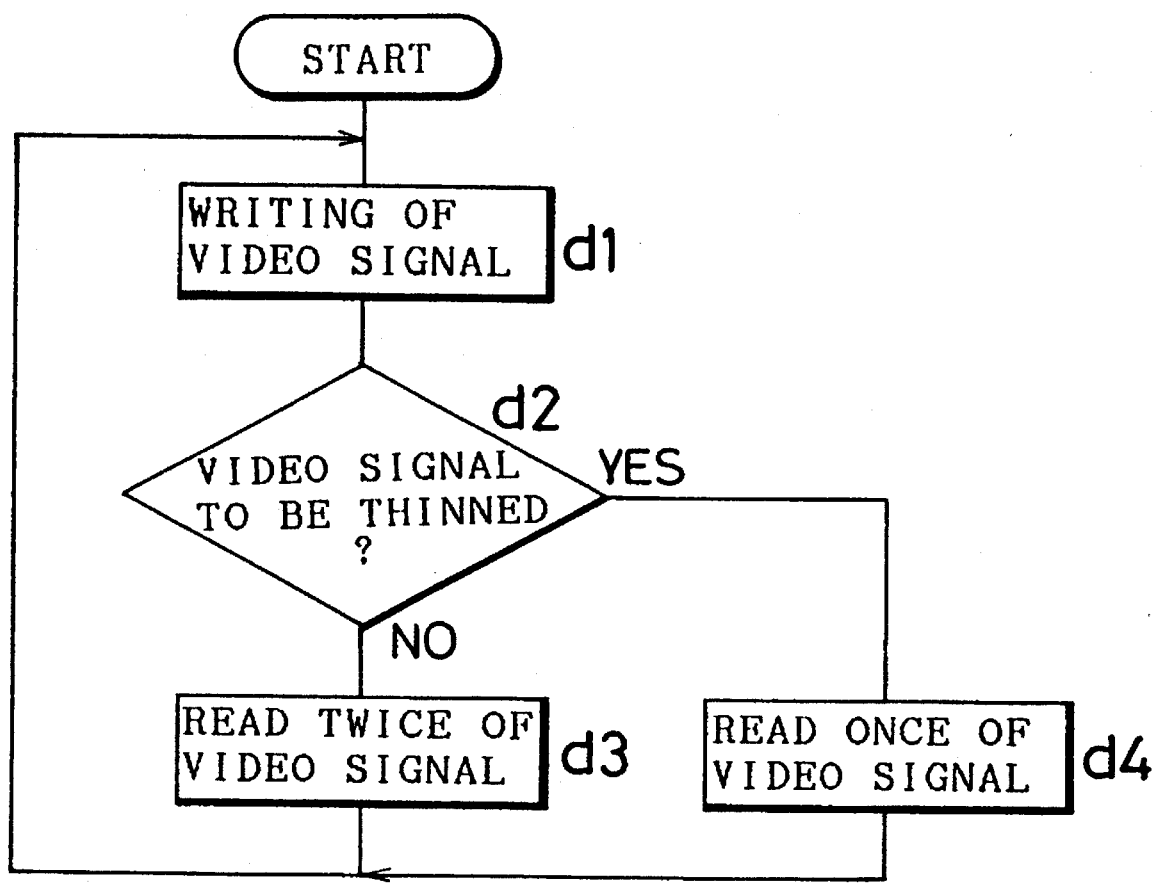
FIG. 39 is a flow chart for explaining the action of the display device 31.

FIG. 39 is a flow chart for explaining the action of the display device 31. In step d1, the video signals for the portion of one line given from the video signal generator 32 are written into the line memory 33 (4). In step d2, it is judged if the video signal written in the line memory 33 (34) is the video signal to be thinned or not.

If not the video signal to be thinned, the operation advances to step d3, where the video signals are read out from the line memories 33, 34 twice each at a double speed of writing of video signals from the line memories 33, 34, and are given to the display means.

In the case of the video signal to be thinned, skipping to step d4, the video signal is read out only once from the line memories 33, 34 at a double speed of writing video signal, and given to the display means 36. By repeating such action, one screen is displayed by the video signals of one field.

Figure 40:
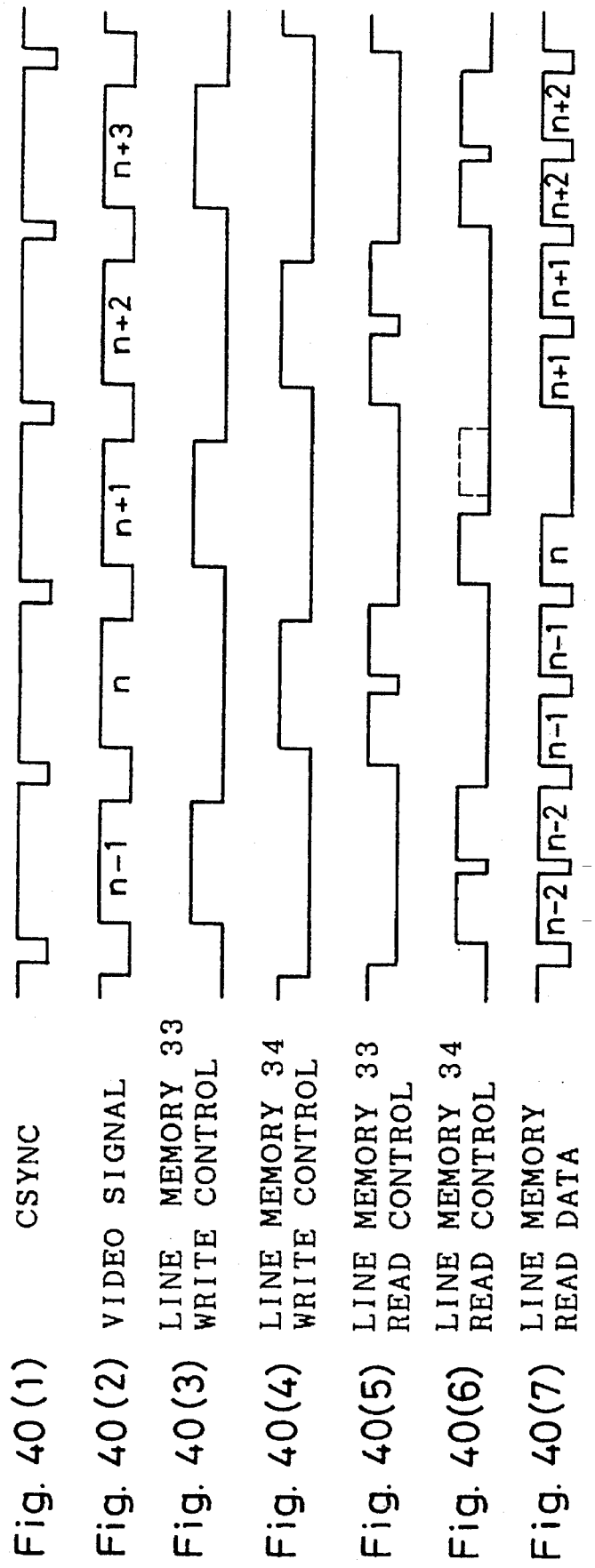
FIGS. 40(1)–(7) are timing charts showing the action of the display device 31.
Figure 41:
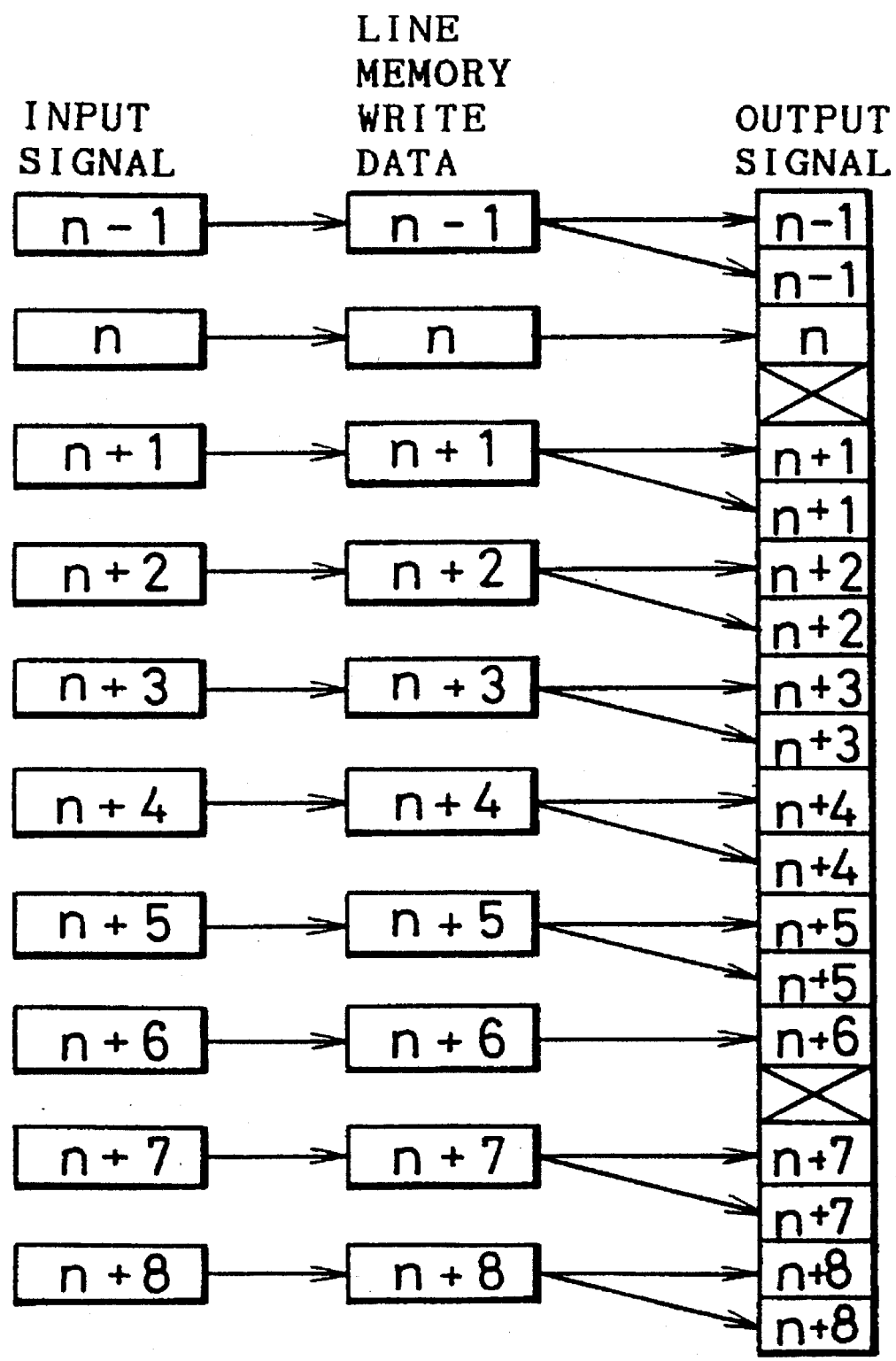
FIG. 41 is a diagram for explaining the action of the display device 31.

FIGS. 40(1)–(7) are timing charts for explaining the action of the display device 31, and FIG. 41 is a diagram for explaining the action of the display device 31. From the video signal generator 32, in synchronism with the composite synchronizing signal CSYNC shown in FIG. 40(1), video signals are given in one line each as shown in FIG. 40(2). The line memory write/read controller 35 gives write control signals of high level alternately to the line memories 33, 34 as shown in FIG. 40(3) and FIG. 40(4), in synchronism with the composite synchronizing signal CSYNC. This high level period is selected equal to the send-out period of video signal. In the line memories 33, 34, the video signals are written only #or the period when the write control signal of high level is given. That is, all video signals of one field are sequentially written into the line memories 33, 34.

In succession, when reading out, the line memory write/read controller 35 gives the read control signals twice each alternately to the line memories 33, 34 at a double speed of the write control signal as shown in FIG. 40(5) and FIG. 40(6), and the same video signal is read out twice each as shown in FIG. 40(7), and given to the display means 36. In this way, double speed conversion of video signal is effected.

Here, when reading out the video signal of line n, for example, selected to be thinned, the line memory write/read controller 35 gives the read control signal once to the line memory, and reads out the video signal only once to make one-line display. When reading out other video signals, meanwhile, they are read out twice each to effect so-called two-line display.

Thus, as shown in FIG. 41, at a rate of once in every N times, the two-line display by double speed conversion is stopped, and one-line display is effected. That is, the N pieces of data to be displayed in 2N pieces by line interpolating method are displayed in 2N−1 pieces. By repeating this M times, M video signals are omitted.

For example, in the PAL system, supposing there are 287.5 data in both odd-numbered field and even-numbered field, a total of 25.5 lines of the beginning and end are overscanned to be set as non-display region, and the remaining 262 lines are converted into non-interlacing type by line interpolating method in the condition of N=6, M=44, and the display of 2N=12 is indicated by 2N−1=11, and by repeating 44 times, the 480 video signals are displayed. As a result, excluding the overscan, 262×2=524 data are displayed in 480 lines, and therefore the data missing in the upper and lower portions in the prior art is minimized, and a natural screen without feel of strangeness is displayed. Moreover, by properly selecting the values of N, M, the rate of overscan can be changed. By executing such line interpolating method, the video signal of PAL system can be displayed in the NTSC type liquid crystal display device.

Figure 42:
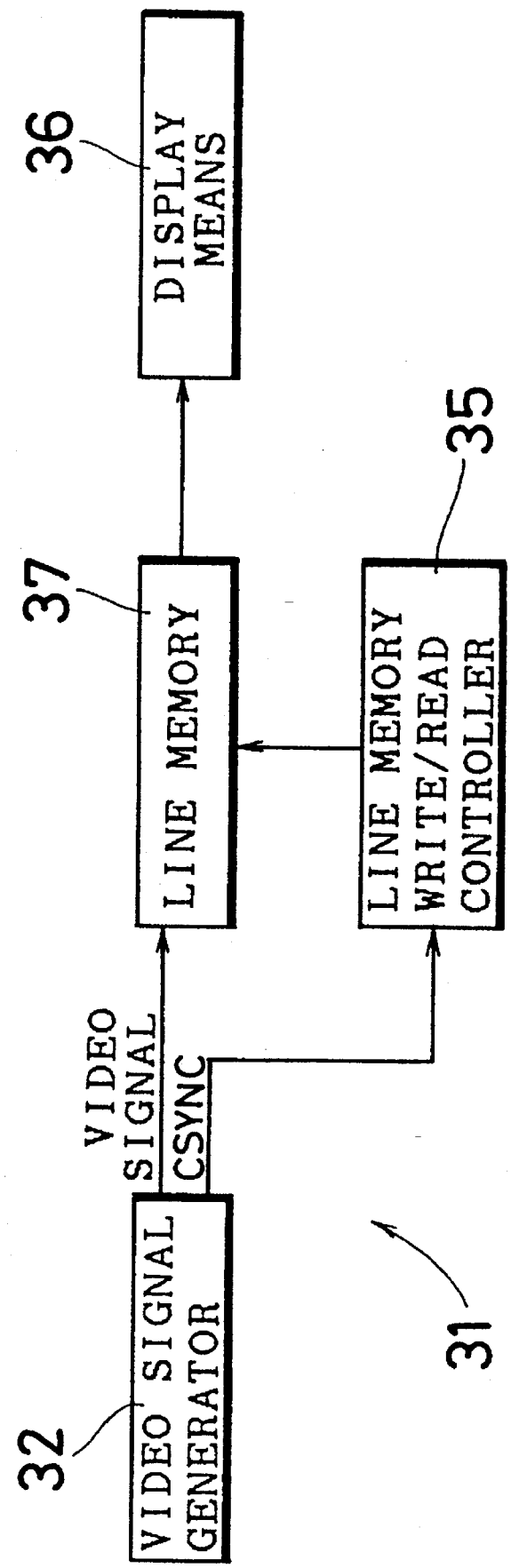
FIG. 42 is a block diagram showing other configuration example of the display device 31.

As the line memories 33, 34, using the dual port type line memory capable of reading and writing independently, it is possible to operate with one line memory only, and the block diagram becomes as shown in FIG. 42. In FIG. 42, instead of the line memories 33, 34, the dual port type line memory 37 is used, and the basic operation is same as shown in FIG. 38.

Figure 43:
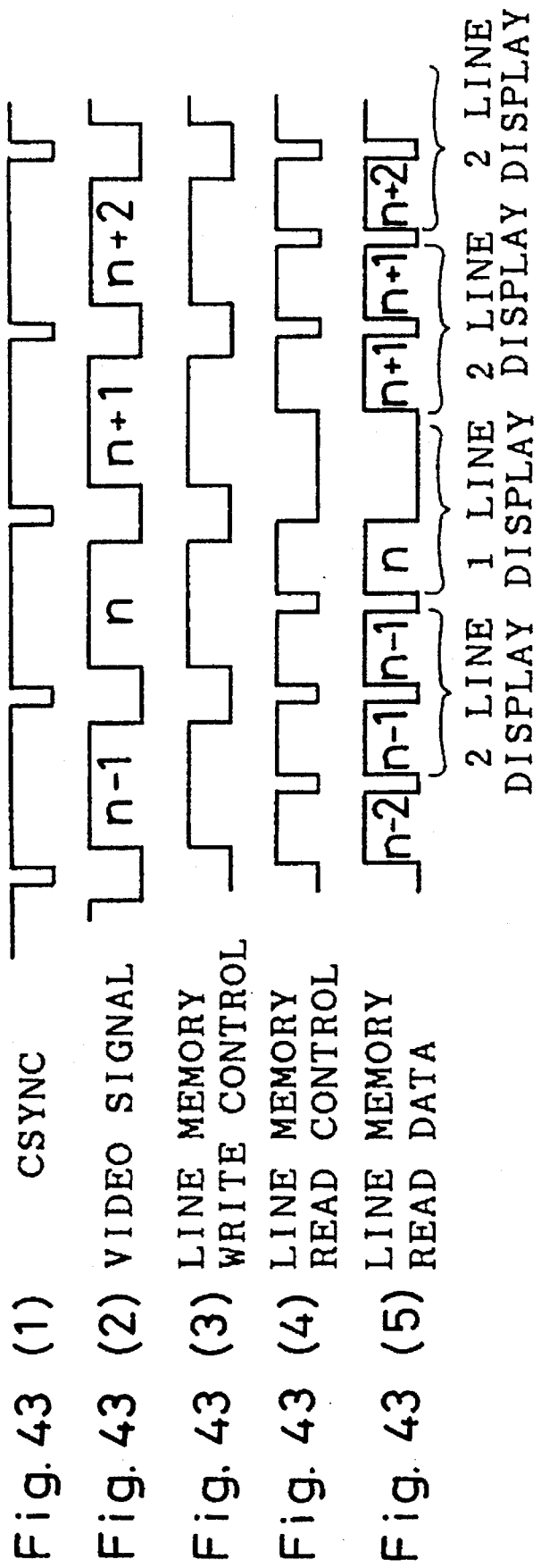
FIGS. 43(1)–(5) are timing charts showing the action of the configuration shown in FIG. 42.

FIGS. 43(1)–(5) are timing charts for explaining the action in FIG. 42. In this case, since writing and reading in the line memory are done simultaneously, the operation is continuous as shown in the line memory write control signal in FIG. 43(3), and line memory read control signal in FIG. 43(4).

Figure 44:
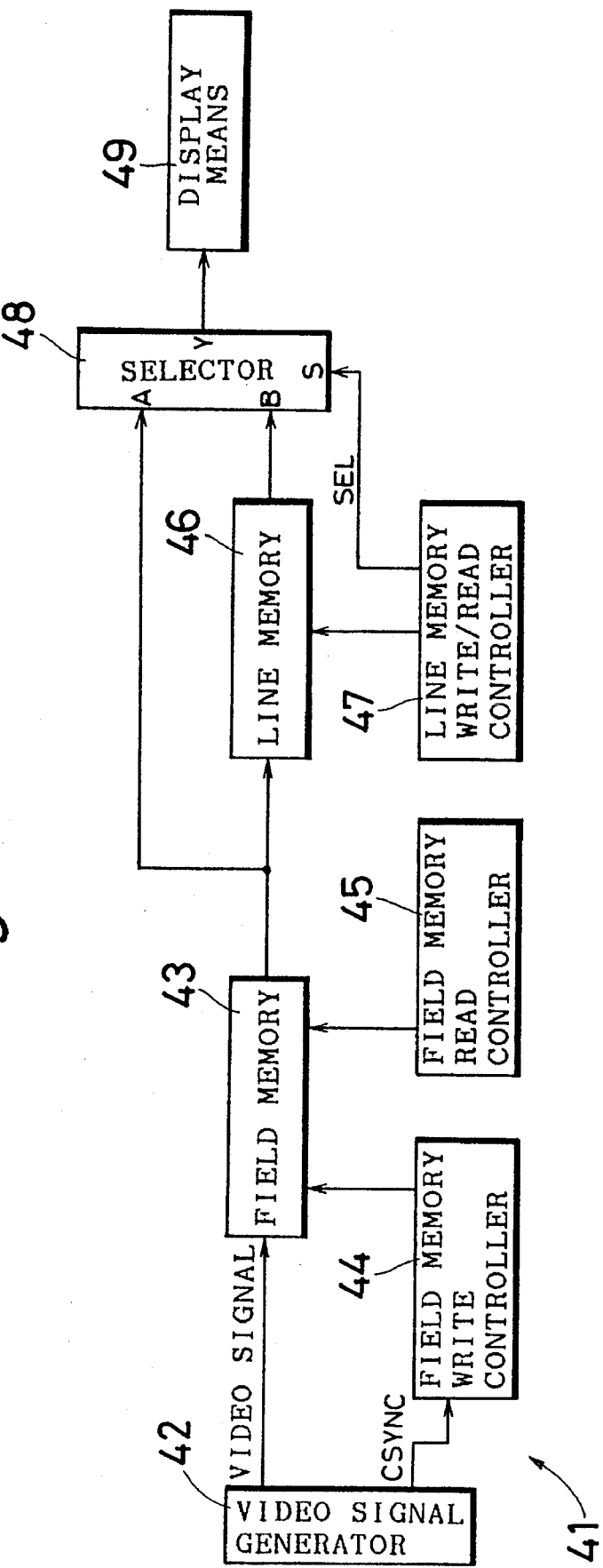
FIG. 44 is a block diagram showing a configuration of a display device 41 in an eighth embodiment of the invention.

FIG. 44 is a block diagram showing a basic configuration of the display device 41 as an eighth embodiment of the invention. The display device 41 displays the video signal of interlacing method from video signal generator 42 realized by, for example, video tape recorder, by converting into a video signal of non-interlacing method.

The display device 41 comprises a field memory 43 for storing video signals for the portion of one field, field memory write controller 44 for controlling writing of video signal in the field memory 43, field memory read controller 45 for controlling reading of video signal in the field memory 43, a line memory 46 for storing video signals for the portion of one line, line memory write/read controller 47 for controlling writing and reading of video signals in the line memory 46, a selector 48 for changing over and delivering the outputs of the field memory 43 and line memory 46, and display means 49 realized by a liquid crystal display device having a display screen of lateral 640 dots× vertical 480 lines or the like.

The video signal from the video signal generator 42 is delivered in digital signal. However, in the case of analog signal, an A/D converter, not shown, is connected between the video signal generator 42 and field memory 43, and it is digitized. The display means 49 is display means such as liquid crystal display device to be driven by a digital signal. In the case of display means driven by an analog signal, however, a D/A converter, not shown, is connected between the selector 48 and display means 49.

The display device 41 displays the video signal of interlacing method in the display means 49 by converting into a video signal of non-interlacing method, by so-called double speed conversion. For example, when a video signal of NTSC method is given from the video signal generator 42, there are 241.5 video signals in both first field and second field, and a total of 1.5 lines of the beginning and end are overcalled to be set as non-display region, while the remaining 240 video signals are written in batch into the field memory 43. After the video signals for one field are written into the field memory 43, when reading out the video signals, the video signal of one horizontal scanning line is read out once from the field memory 43 at a double speed of writing, and is given to the display means 49 through selector 48. At this time, the video signal of one horizontal scanning line read out at the same time is written into the line memory 46.

Afterwards, the video signals from the line memory 46 are read out at double speed (same speed as in writing), and given to the display means 49 through selector 48. As a result, 240×2=480 video signals are given to the display means 49, and in the display screen of the display means 49, the video signals of the first field are displayed as one screen. When the video signals of the second field are given, the same action is effected, and the video signals of the second field are displayed as one screen on the display screen of the display means 49.

In this embodiment, the case of displaying video signals having a greater number of horizontal scanning lines than the number of horizontal display lines of the display means 49 in the display device 41 is shown. In this example, PAL system video signals are displayed.

The PAL system video signal has 625/2=312.5 horizontal scanning lines per field, and the video signals as effective data are present in 575/2=287.5 horizontal scanning lines. Overscanning a total of 25.5 lines at the beginning and end to be set as non-display region, it is assumed to display the remaining 262 video signals.

When the 262 video signals are converted at double speed to obtain 524 video signals, since the number of horizontal display lines of the display means 49 is 480, it is necessary to thin 524−480=44 video signals. That is, these 44 video signals are not converted at double speed, and the remaining 262−44=218 video signals are converted at double speed to obtain 436 video signals, totaling to 480 video signals, which are displayed in the display means 49.

At this time, while converting 262/44=5.9, or about 6 video signals at double speed, one video signal is thinned. Considering the linearity of display screen in the vertical direction, it is preferable to thin uniformly in the first and second fields, and considering a set of six video signals in each field, for example, the first video signal of the six video signals of the first field is thinned, and the video signal corresponding to the video signal thinned in the first field is thinned in the second field. That is, the video signals displayed in the same horizontal display line are thinned.

Figure 45:
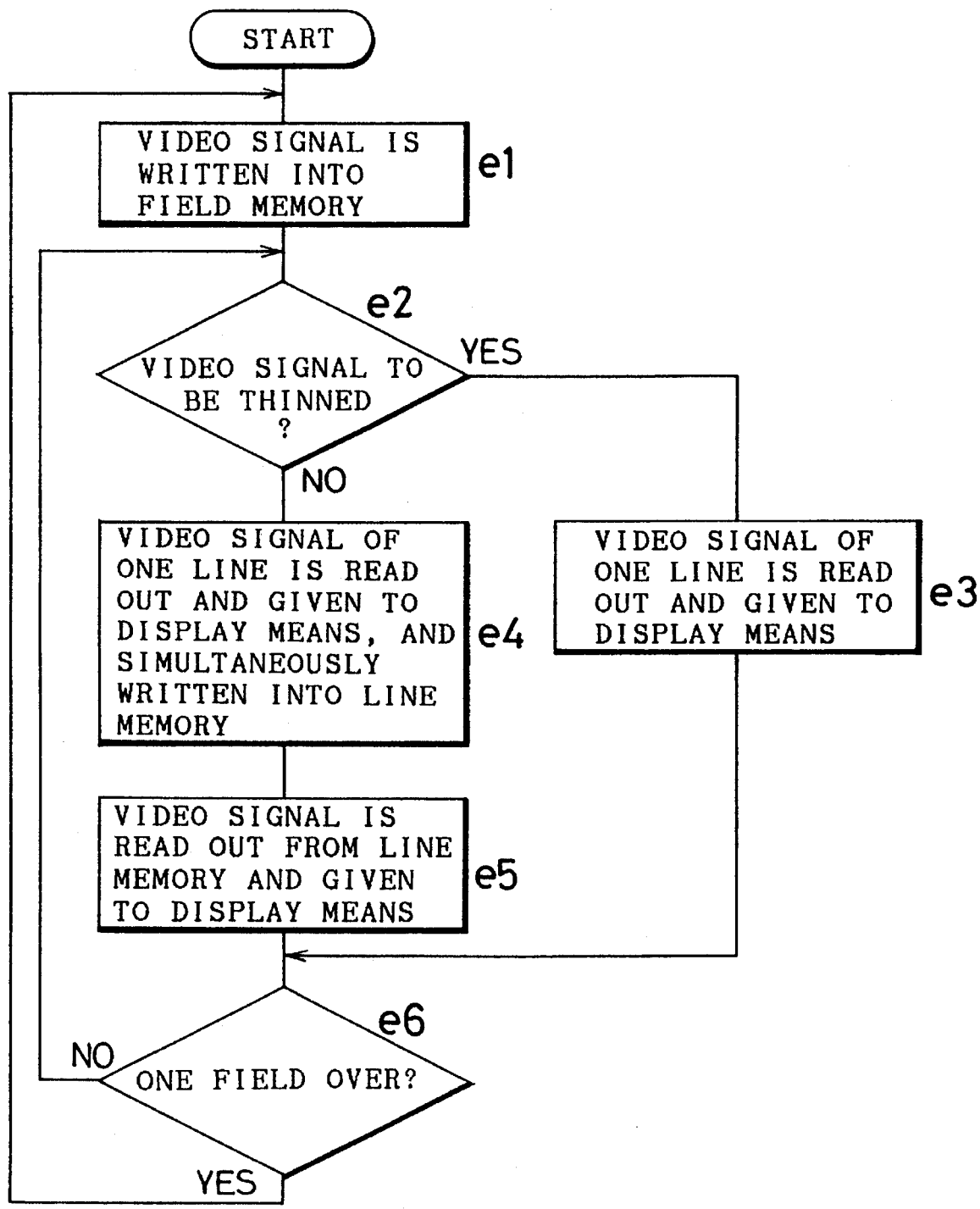
FIG. 45 is a flow chart for explaining the action of the display device 41.
Figure 48:
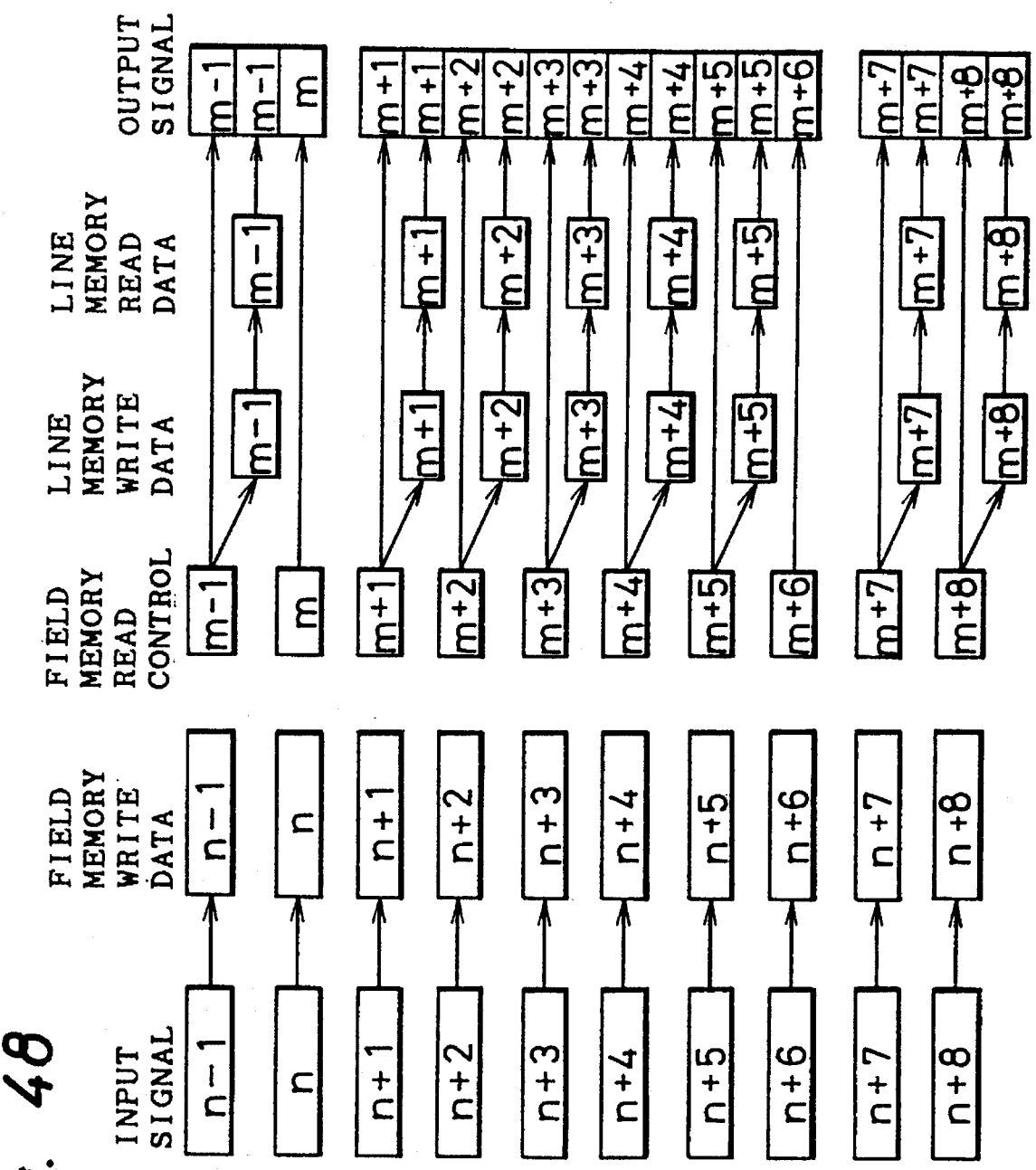
FIG. 48 is a diagram for explaining the double speed conversion of video signal in the display device 41.

FIG. 45 is a flow chart for explaining the action of the display device 41, and FIGS. 46(1)–(3) and FIGS. 47(1)–(8) are timing charts for explaining the action of the display device 41, and FIG. 48 is a diagram for explaining the action of the display device 41. In this embodiment, one field is displayed by thinning one out of six video signals. Therefore, with six video signals, 11 horizontal display lines are displayed.

In step e1, the video signals for the portion of one field given from the video signal generator 42 are written into the field memory 43. That is, as shown in FIGS. 46(1)–(3), from the video signal generator means 42, in synchronism with the composite synchronizing signal CSYNC shown in FIG.

46(1), the video signals of the first field are given by one line each as shown in FIG. 46(2). The field memory write control let 44, in synchronism with the composite synchronizing signal CSYNC, gives write control signal shown in FIG. 46(3) to the field memory 43. This high level period is selected equal to the send-out period of video signal. In the field memory 43, the video signal is written only for the period when write control signal of high level is given. Here, all video signals of the first field are sequentially written in the field memory 43 by one line each, and all write control signals in the video signal send-out period are of high level.

In step e2, it is judged whether the video signal read out from the field memory 43 is a video signal to be thinned or not, and in the case of video signal to be thinned, the operation advances to step e3, and if not to be thinned, the operation skips to step e4.

In step e4, the video signal of one line is read out from the field memory 43, and given to the display means 49 through selector 48, and the video signal of one line read out from the field memory 43 is written into the line memory 46. That is, as shown in FIG. 47(2), the field memory read controller 45, in synchronism with the synchronizing signal HSYNC (FIG. 47(1)) of double frequency of composite synchronizing signal CSYNC shown in FIG. 46(1), sends the field memory read control signal to the field memory 43, and reads out the video signal of one line (FIG. 47(3)). In FIGS. 46(1)–(3) and FIGS. 47(1)–(8), meanwhile, the data before double speed conversion is indicated by n, and the data after double speed conversion, by m.

The video signal read out from the field memory 43 is given to the line memory 46 and selector 48. In the line memory 46, the line memory write control signal shown in FIG. 47(4) is given from the line memory write/read controller 47, and the video signal of one line being read out is written in. In the selector 48, a selector signal SEL (FIG. 47(7)) of low level is given from the line memory write/read controller 47, and input A is given to the display means 49 as output Y.

Going to step e3 in the case of the video signal not to be thinned, the video signal of one line is read out from the field memory 43, and given to the display means 49 through the selector 48.

At step e6, it is judged whether reading of video signals of one field is complete or not, and if not complete, returning to step e2, the next video signal is read out.

When reading of all video signals of one field is complete at step e6, returning to step e1, the video signals of the next field are written into the field memory 43, and the same action for reading out is repeated.

In this way, as shown in FIG. 48, by not reading out the video signal to be thinned from the line memory 46, this video signal is displayed only in one line of the display means 49. By repeating this thinning action for every predetermined plurality of video signal groups, the video signals are thinned. In this embodiment, too, the same effects as in the foregoing embodiments are brought about.

In this embodiment, furthermore, as shown in FIGS. 40(1)–(7) relating to the preceding embodiment, generation of data blank time when displaying one line is prevented, and it is matched with the display timing of video signal. That is, as shown in FIGS. 47(1)–(8), whether in two-line display or in one-line display, the video signal is displayed in the display means 49 at the same timing. Therefore, when displaying the PAL system video signal in the NTSC type display device 41, the PAL signal and NTSC signal are apparently identical signals for the display means 49.

Figure 49:
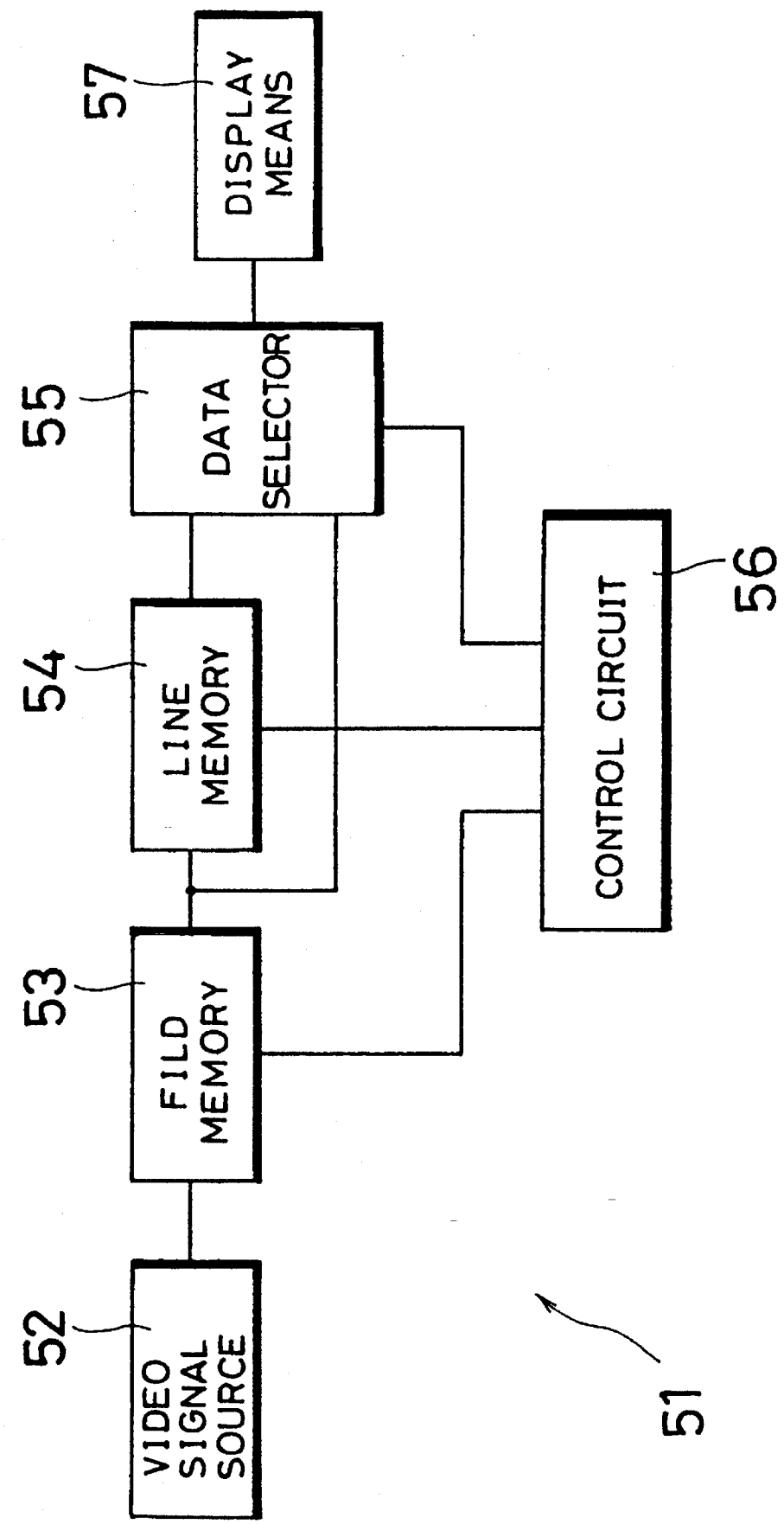
FIG. 49 is a block diagram showing a basic configuration of a display device 51 in a ninth embodiment of the invention.

FIG. 49 is a block diagram showing a basic configuration of a display device 51 in a ninth embodiment of the invention. The display means 51 displays the video signal of interlacing method from video signal source 52 realized by, for example, video tape recorder, by converting into a video signal of non-interlacing method.

The display device 51 comprises a field memory 53 for storing video signals for the portion of one field, a line memory 54 for storing video signals for the portion of one line, a data selector 55 for changing over and delivering the outputs of the field memory 53 and line memory 54, a controller 56 for controlling writing and reading of video signals in the field memory 53 and line memory 54, and controlling changeover of the data selector 55, and display means 57 realized by a liquid crystal display device or the like having a display screen of lateral 640 dots×vertical 480 lines.

The video signal from the video signal source 52 is delivered as a digital signal. In the case of an analog signal, an A/D (analog/digital) converter, not shown, is connected between the video signal source 52 and the field memory 53, and the analog signal is digitized. The display means 57 is display means such as liquid crystal display device to be driven by a digital signal. In the case of display device driving by an analog signal, however, a D/A (digital/analog) converter, not shown, is connected between the data selector 55 and display means 57.

The display device 51 displays the video signal of interlacing method in the display means 57 by converting into a video signal of non-interlacing method by so-called double speed conversion. For example, when an NTSC type video signal is given from the video signal source 52, both the first field and the second field consist of 241.5 video signals, and overscanning a total of 1.5 video signals at the beginning and end to be set as non-display region, the remaining 240 video signals are sequentially written into the field memory 52.

After the video signals are written into the field memory 53, when reading out the video signals, the data for one line are read out from the field memory 53 at a double speed of writing, and the data are given to the display means 57 through the data selector 55. At the same time, the data of one line read out from the field memory 53 are written also into the line memory 54.

After the data of one line read out from the field memory 53 are given to the display means 57, in the horizontal blanking period, the connection state of the data selector 55 is changed over by the controller 56, and the data from the line memory 54 is given to the display means 57. In succession, the written video signal is read out from the line memory 54, and given to the display means 57 through the data selector 55.

As a result, 240×2=480 video signals are given to the display means 57, and the video signals of the first field are displayed on the display screen of the display means 57 as one screen.

In this embodiment is explained a case of displaying the video signal having a greater number of horizontal scanning lines than the number of horizontal lines of the display means 57 in the display device 51. In this example, PAL system video signals are displayed.

The PAL system video signal comprises 625/2=312.5 horizontal scanning lined per field, and the video signals as effective data are present in 575/2=287.5 horizontal scanning lines. Overscanning 1.5 video signals to be set as non-display region, it is assumed to display the remaining 286 video signals.

Converting 286 video signals at double speed to obtain 572 video signals, thinning of one out of every five and thinning of one out of every six are alternately done, and as a result, video signals of $$572 \times \frac{2}{11} = 104 \text{ (lines)} \tag{10}$$

are thinning, and the number of video signals displayed in the display means 57 is $$572 - 104 = 468 \text{ (lines)} \tag{11}$$

Hence the rate of roundness is $$\frac{468}{52 \times 10^{-6} \times \frac{572}{575} \times \frac{3}{4} \times \frac{1}{82.474 \times 10^{-9}}} \times 100 = 99.94(\%) \tag{12}$$

Besides, considering the linearity of display screen in the vertical direction, it is preferable to thin uniformly in the first and second fields, and therefore, in the second field, the video signal corresponding to the video signal thinned in the first field is thinned. That is, the video signals displayed in the same horizontal display line are thinned.

Figure 50:
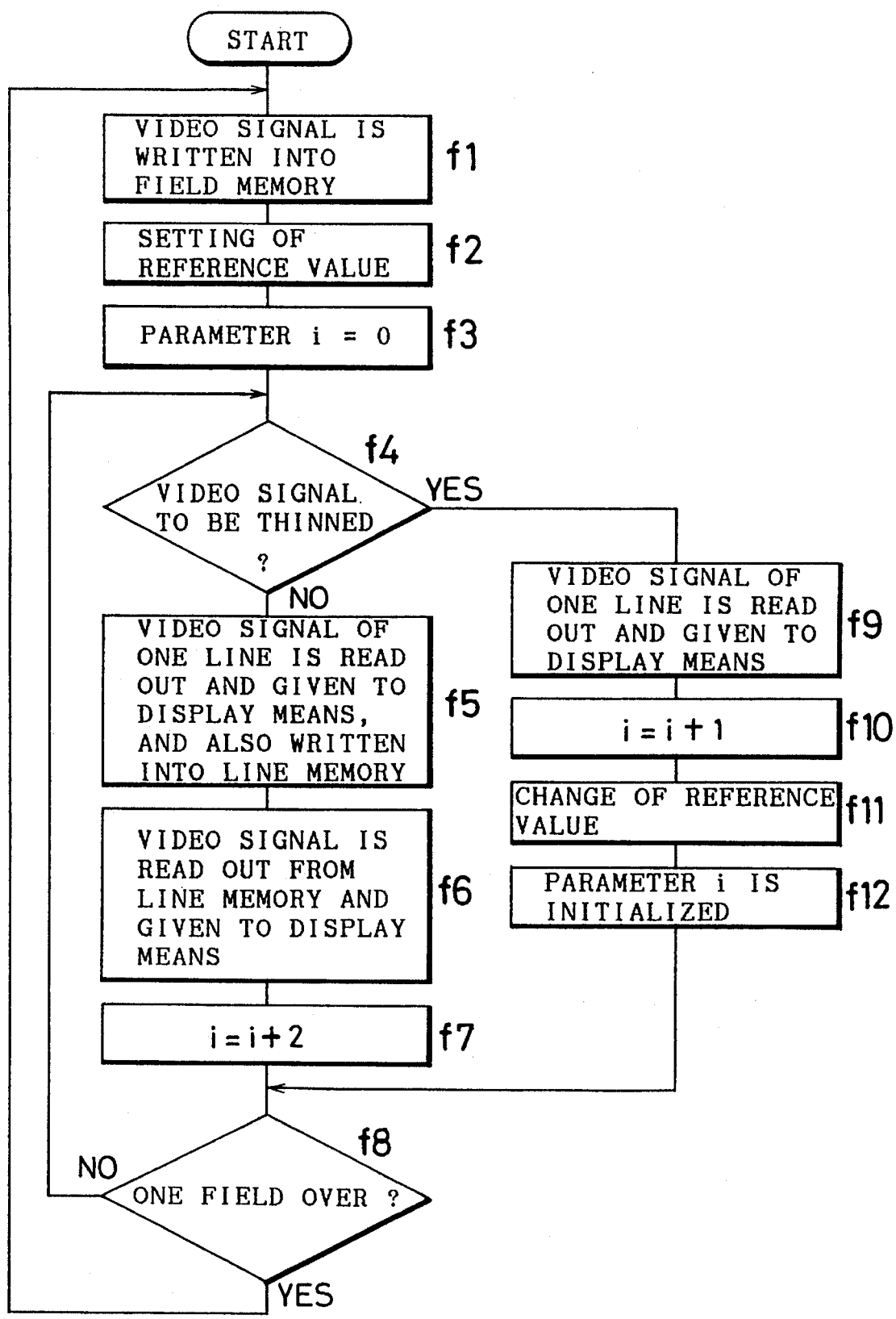
FIG. 50 is a flow chart for explaining the action of the display device 51.
Figure 53:
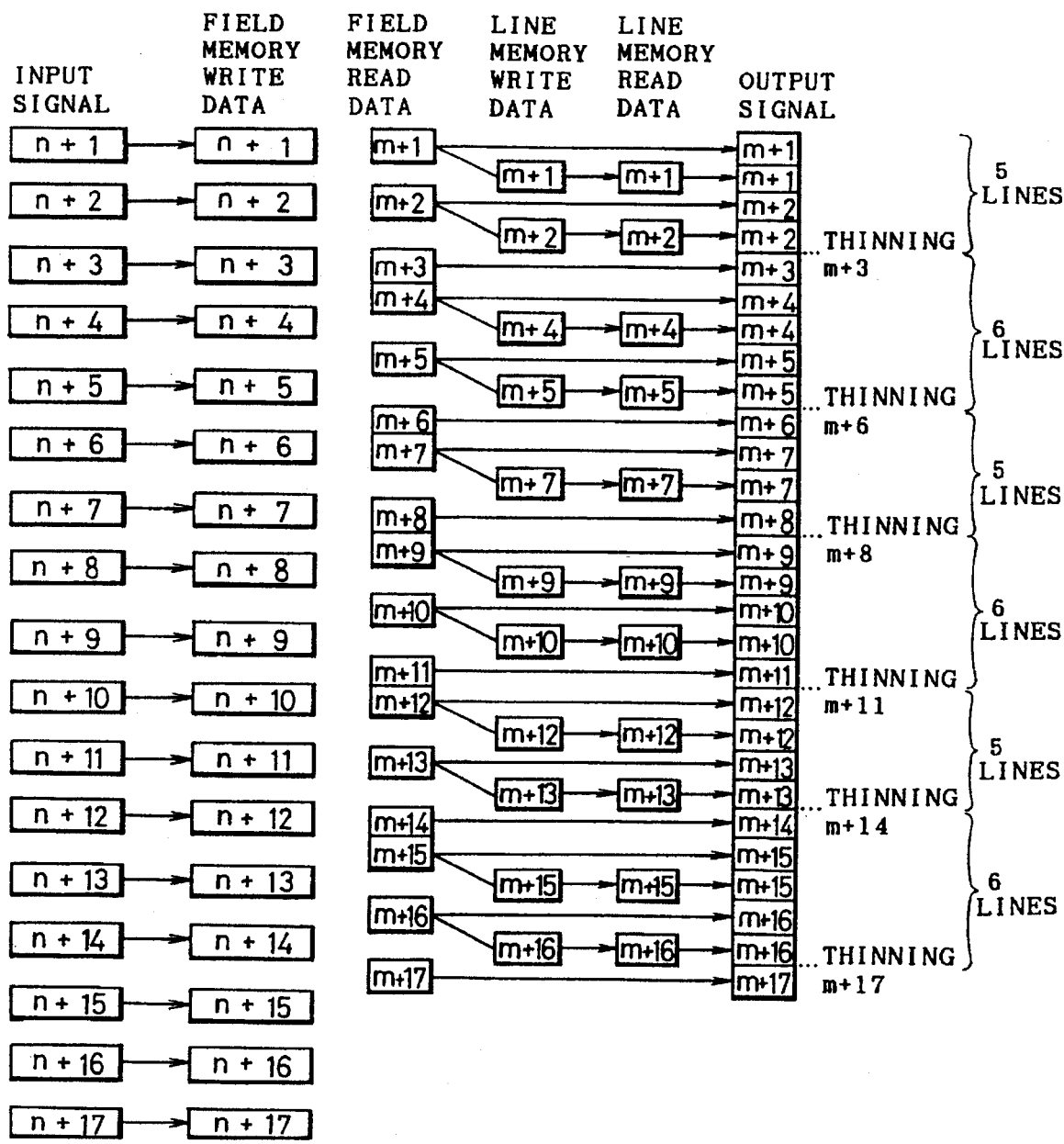
FIG. 53 is a diagram for explaining the action of the display device 51.

FIG. 50 is a flow chart for explaining the action of the display device 51, FIGS. 51(1)–(3) and FIGS. 52(1)–(9) are timing charts for explaining the action of the display device 51, and FIG. 53 is a diagram for explaining the action of the display device 51. In this embodiment, the video signals after double speed conversion in one field are thinned and displayed at a rate of one out of five or one out of six.

In step f1, the video signals for the portion of one field given from the video signal source 52 are written into the field memory 53. That is, as shown in FIGS. 51(1)–(3), from the video signal source 52, in synchronism with the composite synchronizing signal CSYNC shown in FIG. 51(1), the first field video signals are given by one line each as shown in FIG. 51(2). The controller 56, in synchronism with the composite synchronizing signal CSYNC, gives a write control signal as shown in FIG. 51(3) to the field memory 53. This high level period of the write control signal is selected equally to the video signal send-out period. In the field memory 53, video signals are written only for the period when the write control signal of high level is given. Here, all video signals of one field are written into the field memory 53 sequentially by one line each, and in the send-out period of video signals, all write control signals are at high level.

In step f2, reference value REF for judging if the video signal is to be thinned or not is set at 5. In step f3, the parameter i for counting the number of video signals given to the display means 57 is set to 0.

In step f4, it is judged whether the video signal read out from the field memory 53 is the video signal to be thinned OF not, and in the case of video signal to be thinned, the operation skips to step f9, and if not to be thinned, the operation goes to step f5. The judgment whether or not to thin depends on the judgment of parameter i≧reference value REF–2.

In step f5, reading out the video signal of one line from the field memory 53 and giving to the display means 57 through the data selector 55, the video signal of one line read out from the field memory 53 is written into the line memory 54. That is, as shown in FIG. 52(2), the controller 56, in synchronism with the synchronizing signal HSYNC (FIG. 52(1)), gives the field memory read control signal to the field memory 53, and reads the video signal of one line (FIG. 52(3)). In FIGS. 51(1)–(3) and FIG. 52(1)–(9), meanwhile, the data before double speed conversion is indicated by n, and the data after double speed conversion, by m.

The video signal read out from the field memory 53 is applied to the line memory 54 and data selector 55. In the line memory 54, the line memory write control signal shown in FIG. 52(4) is given from the controller 56, and the video signals of one line being read out are written in (FIG. 52(5)). In the data selector 55, a select signal SEL (FIE. 52(8)) of low level is given from the controller 56, and the input from the field memory 53 is given to the display means 57 as output.

In step f6, the controller 56 Elves the line memory read control signal shown in FIG. 52(6) to the line memory 54, and the data from the line memory 54 is given to the data selector 55. At the same time, the controller 56 gives the high level select signal SEL to the data selector 55, and gives the input from the line memory 54 to the display means 57 as output. At this point, two video signals are given to the display means 57, and therefore "2" is added to the parameter i at step f7, thereby advancing to step f8.

In step f9, reading out the video signal of one line from the field memory 53, it is given to the display means 57 through the data selector 55. This video signal is the video signal to be thinned, and hence writing and reading action to the line memory 54 is not effected.

At this point, since one video signal is applied to the display means 57, in step f10, "1" is added to the parameter i, and the operation goes to step f11.

In step f11, since the video signal was thinned at step f9, the reference value REF for judging whether the video signal is to be thinned or not is changed sequentially. That is, if the reference value was REF=5, it is changed to REF=6, or if it was REF=6, it is changed to REF=5.

In step f12, the parameter i is initialized. At the moment of step f10, if parameter i=reference value REF, the parameter i is set to 1, and in the case of parameter i= reference value REF–1, the parameter i is set to 0. That is, in the case of i=REF, it is counted as the first video signal as in data m+3 in FIG. 53, and it is necessary to set as i=1, and in the case of i=REF–1, it must be counted as the final (fourth or fifth) video signal as in data m+8 in FIG. 53, so that it is necessary to set as i= 0.

In step f8, it is judged if reading of video signals of one field is complete or not, and if not complete, returning to step f4, the next video signal is read out.

If all reading of one field is complete in step f8, returning to step f1, the video signals of the next one field are written into the field memory 53, and the same reading action is continued.

In this way, as shown in FIG. 53, by not writing the video signal to be thinned into the line memory 54, this video signal is displayed only in one line of the display means 57. Thinning of one out of every five and one out of every six is alternately repeated, and the video signals are thinned.

By thus repeating alternately thinning of one out of every five and thinning of one out of every six after double speed conversion, the initial 22 output signals are reduced to 18, and the entire video signals become 468.

As comparative examples, the roundness of the image by thinning of one out of every five and the roundness of the image by thinning of one out of every six are calculated.

In the case of thinning of video signals at a rate of one out of every five, if overscanning five out of 575 horizontal scanning lines, the video signals are thinned by $$\frac{575 - 5}{5} = 114 \text{ (lines)} \tag{13}$$

and the displayed video signals are 570–114=456 lines. On the other hand, the position (dot) Dv5 for displaying ¾ portion of the data on one horizontal line is $$Dv5 = 52 \times 10^{-6} \times \frac{570}{575} \times \frac{3}{4} \times \frac{1}{82.474 \times 10^{-9}} \quad (14)$$

and in the vertical direction there are 456 dots. Hence, the rate of roundness is $$\frac{456}{Dv5} \times 100 = 97.28(\%) \quad (15)$$

When thinning the video signals at a rate of one out of every six, overscanning 11 out of 575 horizontal scanning lines, the video signals are thinned by $$\frac{575 - 11}{6} = 94 \text{ (lines)} \quad (16)$$

and the displayed video signals are 564−94=470 lines. On the other hand, the position (dot) Dv6 for displaying ¾ portion of the data on one line is $$Dv6 = 52 \times 10^{-6} \times \frac{564}{575} \times \frac{3}{4} \times \frac{1}{82.74 \times 10^{-9}} \quad (17)$$

and in the vertical direction there are 470 dots. Hence, the rate of roundness is $$\frac{470}{Dv6} \times 100 = 101.33(\%) \quad (18)$$

As mentioned above, the rate of roundness in this embodiment is 99.49%, and as compared with these two comparative examples, the value closer to 100% is realized. Hence, when displaying the video signals, effects of thinning on the entire display screen are reduced, and more natural display screen may be realized.

In this embodiment, the video signal of interlacing method is explained, but it may be similarly applied to the video signal of non-interlacing method.

Meanwhile, the combination of rate of thinning may be properly changed depending on the number of horizontal scanning lines of the video signal and the number of horizontal display lines of the display means.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A display device for display video signals where interlaced video signals are converted into non-interlaced video signals by dividing the interlaced video signals into a first field composed of odd-numbered horizontal scanning lines and a second field composed of even-numbered horizontal scanning lines, comprising:

a display having fewer horizontal display lines than a predetermined number of horizontal scanning lines for composing one screen of video information, a memory for storing interlaced video signals, each interlaced video signal corresponding to a portion of one display line, and a memory controller for writing the video signals into the memory in synchronism with a horizontal synchronizing signal provided with the interlaced video signals, dividing the horizontal scanning lines into consecutive groups, selecting one scanning line to be thinned from every group, and consecutively reading out from the memory the same video signal twice in synchronism with a read-out signal having a frequency twice that of the horizontal synchronizing signal but reading the video signal corresponding to the selected scanning line to be thinned from every group only once in accordance with the horizontal synchronizing signal, and applying the read out video signals to the display.

2. The display device according to claim 1, wherein each group includes seven display lines.

3. The display device according to claim 1, wherein the memory includes first and second field memories with both memories storing a portion of video information for one display line.

4. The display device according to claim 1, wherein the display includes a number of horizontal display lines for accommodating video signals scanned according to a method prescribed by a National Television Standard Committee (NTSC) television system and the one screen of video information includes a number of horizontal scanning lines generated in accordance with a method prescribed by a Phase Alteration Line (PAL) television system such that PAL video information may be displayed substantially free of distortion on the display.

5. A display device for display video signals where interlaced video signals are converted into non-interlaced video signals by dividing the interlaced signals into a first field composed of odd-numbered horizontal scanning lines and a second field composed of even-numbered horizontal scanning lines, comprising:

a display having fewer horizontal display lines than a number of horizontal scanning lines for composing one screen of video information, a line memory for storing video signals that contain a portion of one horizontal scanning line, a field memory for storing one field of interlaced video signals, and a memory control means including:
means for writing one field of interlaced video signals into the field memory in synchronism with a horizontal synchronizing signal provided with the interlaced video signals;
means for reading out and displaying video signals from the field memory in synchronization with a read-out control signal having a frequency twice that of the horizontal synchronizing signal;
means for writing the read-out video signals into the line memory;
means for selecting a video signal to be thinned from consecutive groups of video signals; and
means for reading out and displaying video signals from the line memory except for selected video signals which are not read out and displayed in synchronism with the read-out control signal or a selection signal.

6. The display device according to claim 5, wherein the memory control means achieves a rate of roundness of the displayed video screen defined as $[(V \cdot y)/(H \cdot x)] \cdot 100\%$ of substantially 100%, where V is a number of vertical pixels in the video screen, H is a number of horizontal pixels in the display, y is a pixel pitch in a vertical direction, and x is a pixel pitch in a horizontal direction.

* * * * *